United States Patent
Choi et al.

(10) Patent No.: US 10,045,021 B2
(45) Date of Patent: Aug. 7, 2018

(54) MULTI-LAYER VIDEO CODING METHOD FOR RANDOM ACCESS AND DEVICE THEREFOR, AND MULTI-LAYER VIDEO DECODING METHOD FOR RANDOM ACCESS AND DEVICE THEREFOR

(71) Applicant: SAMSUNG ELECTRONICS CO., LTD., Suwon-si (KR)

(72) Inventors: Byeong-doo Choi, Suwon-si (KR); Min-woo Park, Hwaseong-si (KR); Ho-cheon Wey, Seongnam-si (KR); Jae-won Yoon, Seoul (KR); Jin-young Lee, Hwaseong-si (KR); Yong-jin Cho, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 155 days.

(21) Appl. No.: 14/782,559

(22) PCT Filed: Apr. 7, 2014

(86) PCT No.: PCT/KR2014/003012
§ 371 (c)(1),
(2) Date: Oct. 5, 2015

(87) PCT Pub. No.: WO2014/163467
PCT Pub. Date: Oct. 9, 2014

(65) Prior Publication Data
US 2016/0044309 A1 Feb. 11, 2016

Related U.S. Application Data

(60) Provisional application No. 61/808,740, filed on Apr. 5, 2013.

(51) Int. Cl.
*H04N 19/107* (2014.01)
*H04N 19/50* (2014.01)
(Continued)

(52) U.S. Cl.
CPC ......... *H04N 19/107* (2014.11); *H04N 19/172* (2014.11); *H04N 19/187* (2014.11);
(Continued)

(58) Field of Classification Search
CPC .................. H04N 19/30; H04N 19/70; H04N 21/234327; H04N 19/187; H04N 19/33;
(Continued)

(56) References Cited

U.S. PATENT DOCUMENTS 8,078,644 B2 * 12/2011 Hannuksela ...... G06F 17/30017
707/802
8,619,860 B2 12/2013 Chen et al.
(Continued)

FOREIGN PATENT DOCUMENTS

CN 101542926 A 9/2009
CN 102342103 A 2/2012
(Continued)

OTHER PUBLICATIONS

Communication dated Sep. 21, 2016, issued by the European Patent Office in counterpart European Application No. 14778702.2.
(Continued)

*Primary Examiner* — Dave Czekaj
*Assistant Examiner* — Kehinde O Abimbola
(74) *Attorney, Agent, or Firm* — Sughrue Mion, PLLC

(57) ABSTRACT

Provided is a method of reconstructing multilayer images including obtaining RAP picture information of a plurality of layers including a base layer and an enhancement layer, independently decoding a RAP picture of the base layer by using RAP picture information, and independently decoding a RAP picture of the enhancement layer by using RAP picture information.

14 Claims, 31 Drawing Sheets

(51) Int. Cl.
*H04N 19/172* (2014.01)
*H04N 19/61* (2014.01)
*H04N 19/187* (2014.01)
*H04N 19/33* (2014.01)

(52) U.S. Cl.
CPC ............. *H04N 19/33* (2014.11); *H04N 19/50* (2014.11); *H04N 19/61* (2014.11)

(58) Field of Classification Search
CPC .. H04N 21/4384; H04N 19/597; H04N 19/46; H04N 19/107; H04N 19/61; H04N 19/513; H04N 19/44; H04N 19/52; H04N 19/105; H04N 19/176; H04N 19/186; H04N 19/172; H04N 19/59; H04N 19/593; H04N 19/117; H04N 19/159; H04N 19/103; H04N 21/23424; H04N 19/58

See application file for complete search history.

(56) References Cited

U.S. PATENT DOCUMENTS

| | | | |
|---|---|---|---|
| 2003/0146855 A1 | 8/2003 | Sullivan et al. | |
| 2007/0071405 A1 | 3/2007 | Choi | |
| 2008/0165848 A1* | 7/2008 | Ye | H04N 19/105 375/240.13 |
| 2008/0275905 A1* | 11/2008 | Hannuksela | G06F 17/30017 |
| 2009/0290644 A1* | 11/2009 | Gordon | H04N 21/234327 375/240.25 |
| 2011/0081133 A1* | 4/2011 | Chen | G11B 27/005 386/356 |
| 2011/0119396 A1 | 5/2011 | Kwon et al. | |
| 2011/0153858 A1 | 6/2011 | Bae et al. | |
| 2012/0189065 A1* | 7/2012 | Gordon | H04N 21/234327 375/240.25 |
| 2012/0233345 A1* | 9/2012 | Hannuksela | H04N 21/26258 709/231 |
| 2014/0003489 A1* | 1/2014 | Hannuksela | H04N 19/70 375/240.02 |
| 2014/0218473 A1* | 8/2014 | Hannuksela | H04N 19/597 348/43 |
| 2014/0219346 A1* | 8/2014 | Ugur | H04N 19/00575 375/240.12 |

FOREIGN PATENT DOCUMENTS

| | | |
|---|---|---|
| KR | 10-2004-0077765 A | 9/2004 |
| KR | 10-2007-0035724 A | 4/2007 |
| KR | 10-2010-0028156 A | 3/2010 |
| KR | 10-2011-0053177 A | 5/2011 |
| KR | 10-2011-0127175 A | 11/2011 |
| WO | 2010/014123 A1 | 2/2010 |
| WO | 2010/100089 A1 | 9/2010 |
| WO | 2015103224 A1 | 7/2015 |

OTHER PUBLICATIONS

Editor: Thomas Kernen: "tm-avc0422rev1 : Random Access Point Considerations for SVC—Annex X (informative): Random Access Point Considerations for SVC", DVB, Digital Video Broadcasting, C/O EBU—17A Ancienne Route—CH—1218 Grand Saconnex, Geneva—Switzerland, Mar. 5, 2009, XP017803929, Total 5 pages.
Rickard Sjoberg et al., "Overview of HEVC high-level syntax and reference picture management", IEEE Transactions on Circuits and Systems for Video Technology, Jan. 1, 2012, Total 14 pages, XP055045360.
Byeongdoo Choi et al., "AHG7: On Random access point pictures and picture order counts for MV-HEVC", Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013, Document: JCT3V-00081, Total 3 pages, XP030056374.
Ye-Kui Wang et al., "AHG9: On RAP Pictures", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, Document: JCTVC-J0107, Total 7 pages, XP030112469.
Byeongdoo Choi et al., "AHG7: On Random access point pictures and picture order counts for MV-HEVC", Joint Collaborative Team on 3D Video Coding Extension Development of ITU-T SG 16 WP 3 and ISO/IEC JTC 1/SC 29/WG 11, 3rd Meeting: Geneva, CH, Jan. 17-23, 2013, Document: JCT3V-00081, Total 3 pages, XP030130497.
Communication dated Oct. 7, 2015 issued in International Application No. PCT/KR2014/003012 (PCT/IB/306).
Communication dated Oct. 6, 2015 issued in International Application No. PCT/KR2014/003012 (PCT/IB/373).
Communication dated Jul. 8, 2014 issued by the International Searching Authority in counterpart International Application No. PCT/KR2014/003012 (PCT/ISA/237/210/220).
Communication dated Oct. 31, 2017, from the State Intellectual Property Office of People's Republic of China in counterpart Application No. 201480032604.2.
Rickard Sjoberg et al., "Overview of HEVC High-Level Syntax and Reference Picture Management", IEEE Transactions on Circuits and Systems for Video Technology, vol. 22, No. 12, December 2012, (pp. 1858-1870, 13 Pages Total).

* cited by examiner

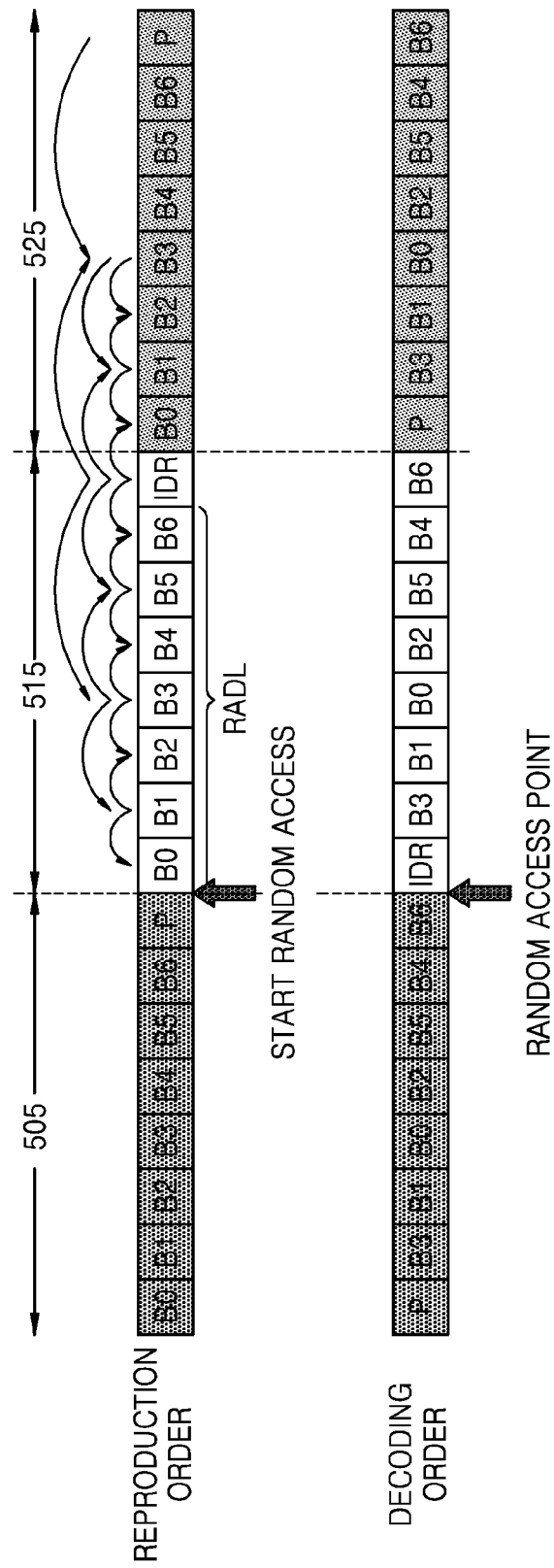

CODING UNIT (1010)

MULTI-LAYER VIDEO CODING METHOD FOR RANDOM ACCESS AND DEVICE THEREFOR, AND MULTI-LAYER VIDEO DECODING METHOD FOR RANDOM ACCESS AND DEVICE THEREFOR

CROSS-REFERENCE TO RELATED APPLICATIONS

This application is a National Stage Entry of International Application No. PCT/KR2014/003012, which claims the benefit of U.S. Provisional Application No. 61/808,740, filed on Apr. 5, 2013, at the U.S. Patent and Trademark Office, the disclosures of which are incorporated herein in their entireties by reference.

BACKGROUND

1. Field

Exemplary embodiments consistent with the application relate to encoding and decoding of a video, in which a multilayer prediction structure based on inter prediction, intra prediction, and interlayer prediction is used.

2. Description of the Related Art

As hardware for reproducing and storing high resolution or high quality video content is being developed and supplied, a need for a video codec for effectively encoding or decoding the high resolution or high quality video content is increasing. According to a conventional video codec, a video is encoded according to a limited encoding method based on a macroblock having a predetermined size.

Image data of a spatial region is transformed into coefficients of a frequency domain via frequency transformation. According to a video codec, an image is split into blocks having a predetermined size, discrete cosine transformation (DCT) is performed on each block, and frequency coefficients are encoded in block units, for rapid maximum coding utilization of frequency transformation. Compared with image data of a spatial region, coefficients of a frequency domain are easily compressed. In particular, since an image pixel value of a spatial region is expressed according to a prediction error via inter prediction or intra prediction of a video codec, when frequency transformation is performed on the prediction error, a large amount of data may be transformed to 0. According to a video codec, an amount of data may be reduced by replacing data that is consecutively and repeatedly generated, with small-sized data.

A multilayer video codec encodes and decodes a base layer video and at least one enhancement layer video. Amounts of data of the base layer video and the enhancement layer video may be reduced by removing temporal/spatial redundancy and layer redundancy of the base layer video and the enhancement layer video.

A highly efficient video compressing method is required.

SUMMARY

According to an aspect of the exemplary embodiments concept, there is provided a video decoding method performed by a video decoding apparatus, the method including: obtaining RAP picture information of a plurality of layers including a base layer and an enhancement layer, from a bitstream; independently decoding a RAP picture of the base layer by using the RAP picture information; and independently decoding a RAP picture of the enhancement layer by using the RAP picture information, wherein the independent decoding is performed by decoding a RAP picture only with respect to a layer having the RAP picture at a random access point.

According to the encoding and decoding methods of an exemplary embodiment, a video compressing efficiency may be improved.

According to an aspect, there is provided a video decoding method performed by a video decoding apparatus, the method including: obtaining RAP picture information of a plurality of layers including a base layer and an enhancement layer, from a bitstream; independently decoding a RAP picture of the base layer by using the RAP picture information; and independently decoding a RAP picture of the enhancement layer by using the RAP picture information, wherein the independent decoding is performed by decoding a RAP picture only with respect to a layer having the RAP picture at a random access point.

The independently decoding a RAP picture of the enhancement layer by using the RAP picture information may include, when a picture of the enhancement layer at a POC which is a random access point is a non-RAP picture, decoding a RAP picture that occurs after the non-RAP picture in a POC order.

The obtaining RAP picture information of a plurality of layers including a base layer and an enhancement layer, from a bitstream, may include obtaining an indicator indicating whether a RAP picture is located at a same POC (Picture Order Count) of the plurality of layers.

The obtaining RAP picture information of a plurality of layers including a base layer and an enhancement layer, from a bitstream, may further include obtaining an identifier indicating a type of a RAP picture existing at a same POC of the plurality of layers.

The RAP picture information may be included in one of a parameter set, an AUD (Access Unit Delimiter), and SEI (Supplemental Enhancement Information).

The independently decoding a RAP picture of the enhancement layer by using the RAP picture information may include, when a RASL (Random Access Skip Leading) picture of a reference layer is not decoded, not decoding a picture that refers to the RASL picture.

A temporal identifier (temporal_id) of a picture included in the enhancement layer may have a value greater than or equal to a temporal identifier (temporal_id) of a reference picture included in the base layer.

At least one of IDR (Instantaneous Decoding Refresh), CRA (Clean Random Access), and BLA (Broken Link Access) pictures of the base layer may be used as a RAP picture.

At least one of IDR, CRA, and BLA pictures of the enhancement layer may be used as at least one of a bit stream extraction point picture and a layer switching point picture.

The method may further include splicing one of the plurality of layers independently from other layers.

According to another aspect, there is provided a video encoding method, including: encoding pictures constituting an image sequence to a plurality of layers including a base layer and an enhancement layer to generate RAP (Random Access Point) picture information about the plurality of layers; and generating a bitstream by using the RAP picture information, wherein the plurality of layers each include a RAP picture so that a RAP picture is independently decoded by decoding the RAP picture only with respect to layers having the RAP picture at a random access point.

The RAP picture information may include an indicator indicating whether a RAP picture is located at a same POC (Picture Order Count) of the plurality of layers.

The RAP picture information may include an identifier indicating a type of a RAP picture existing at a same POC of the plurality of layers.

The generating a bitstream by using the RAP picture information may include: generating a data unit by using the RAP picture information; and generating a bitstream by using the data unit, wherein the data unit may be one of a parameter set, an AUD (Access Unit Delimiter), and SEI (Supplemental Enhancement Information).

A temporal identifier (temporal_id) of a picture included in the enhancement layer may have a value greater than or equal to a temporal identifier (temporal_id) of a reference picture included in the base layer.

According to another aspect, there is provided a video decoding apparatus, including: a receiver configured to receive a bitstream; and an decoder configured to independently decode a RAP picture of a base layer by using RAP picture information of a plurality of layers including the base layer and an enhancement layer obtained from the bitstream and independently decode a RAP picture of the enhancement layer by using the RAP picture information, wherein the independent decoding is performed by decoding a RAP picture only with respect to a layer having the RAP picture at a random access point.

According to another aspect, there is provided a video encoding apparatus, including: an encoder configured to encode pictures constituting an image sequence to a plurality of layers including a base layer and an enhancement layer to generate RAP (Random Access Point) picture information about the plurality of layers; and an output unit configured to generate a bitstream by using the RAP picture information, wherein the plurality of layers each include a RAP picture so that a RAP picture is independently decoded by decoding the RAP picture only with respect to a layer having the RAP picture at a random access point.

According to another aspect, there is provided a computer readable recording medium having recorded thereon a program for implementing the video encoding method according to an exemplary embodiment. According to another aspect, there is provided a computer readable recording medium having recorded thereon a program for implementing the video decoding method according to an exemplary embodiment.

BRIEF DESCRIPTION OF THE DRAWINGS

FIGS. 5A and 5B illustrate a reproduction order and a decoding order of an IDR (Instantaneous Decoding Refresh) image according to two embodiments.

DETAILED DESCRIPTION OF EXEMPLARY EMBODIMENTS

Hereinafter, a multilayer video encoding apparatus, a multilayer video decoding apparatus, a multilayer video encoding method, and a multilayer video decoding method, according to an exemplary embodiment, will be described with reference to FIGS. 1A through 7B. Also, a multilayer video encoding apparatus, a multilayer video decoding apparatus, a multilayer video encoding method, and a multilayer video decoding method, according to an exemplary embodiment, which are based on coding units according to a tree structure according to an exemplary embodiment, will be described with reference to FIGS. 8 through 20. Also, various exemplary embodiments to which a multilayer video encoding apparatus, a multilayer video decoding apparatus, a multilayer video encoding method, and a multilayer video decoding method according to an exemplary embodiment are applicable, will be described with reference to FIGS. 21 through 27. Hereinafter, an 'image' may denote a still image or a moving image of a video, or a video itself.

First, a multilayer video encoding apparatus and a multilayer encoding method and a multilayer video decoding apparatus and a multilayer video decoding method according to an exemplary embodiment will be described with reference to FIGS. 1A through 7B.

Figure 1A:
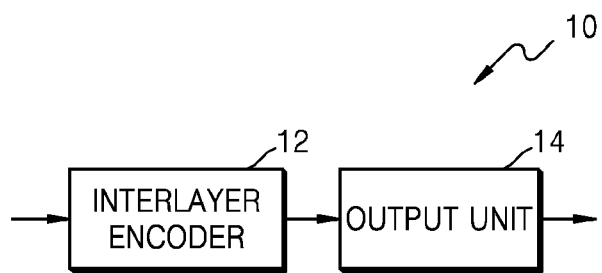
FIG. 1A is a block diagram of a multilayer video encoding apparatus according to an exemplary embodiment.
Figure 1B:
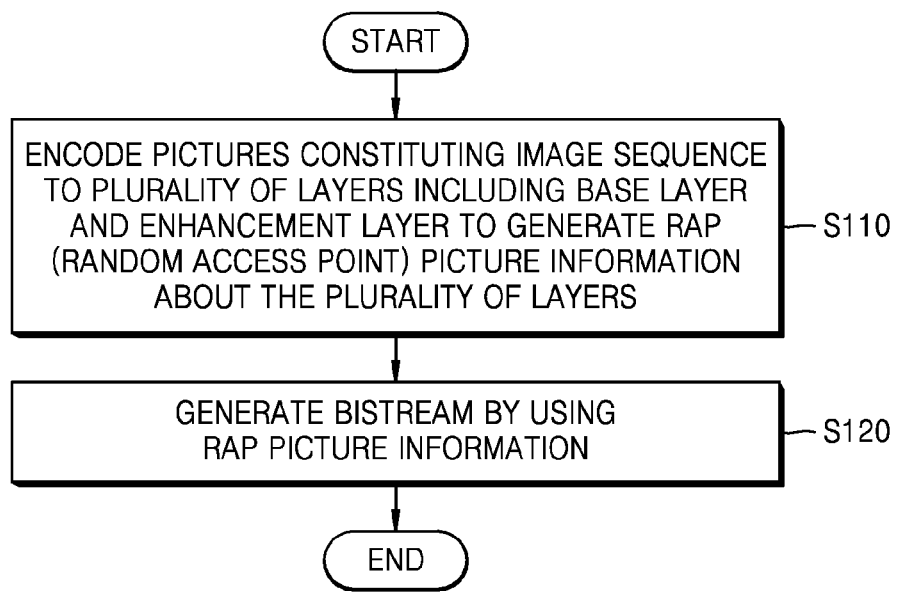
FIG. 1B is a flowchart of a multilayer video encoding method of the multilayer video encoding apparatus of FIG. 1A.

FIG. 1A is a block diagram of a multilayer video encoding apparatus 10 according to exemplary embodiment. FIG. 1B is a flowchart of a multilayer video encoding method 11 of the multilayer video encoding apparatus 10 of FIG. 1A.

The multilayer video encoding apparatus 10 according to an exemplary embodiment includes an interlayer encoder 12 and an output unit 14. In an exemplary embodiment, the interlayer encoder 12 and the output unit 14 may each be implemented in hardware including a circuit.

The multilayer video encoding apparatus 10 according to an exemplary embodiment may classify a plurality of video streams according to layers and encode each of the video streams according to a scalable video coding method. The multilayer encoding apparatus 10 according to an exemplary embodiment encodes base layer images and enhancement layer images.

For example, a multiview video may be encoded according to a scalable video coding method. Central view images, left view images, and right view images are each encoded, wherein the central view images may be encoded as base layer images, the left view images may be encoded as first enhancement layer images, and the right view images may be encoded as second enhancement layer images. An encoding result of the base layer images may be output as a base layer stream, and encoding results of the first and second enhancement layer images may be respectively output as a first enhancement layer stream and a second enhancement layer stream, by using the output unit 14.

Alternatively, a scalable video coding method may be performed according to temporal hierarchical prediction. A base layer stream including encoding information that is generated by encoding base frame rate images may be output. An enhancement layer stream including encoding information of a high speed frame rater may be output by further encoding high frame rate images by referring to base frame rate images. The scalable video coding method according to the temporal hierarchical prediction will be described later with reference to FIG. 4B.

Also, scalable video coding may be performed on a base layer and a plurality of enhancement layers. When there are at least three enhancement layers, base layer images and first through K-th enhancement layer images may be encoded. Accordingly, an encoding result of the base layer images may be output as a base layer stream, and encoding results of the first through K-th enhancement layer images may be respectively output as first through K-th enhancement layer streams.

The multilayer video encoding apparatus 10 according to an exemplary embodiment may perform encoding according to blocks of each image of a video, according to layers. A block may have a square shape, a rectangular shape, or an arbitrary geometrical shape, and is not limited to a data unit having a predetermined size. The block according to an exemplary embodiment may be a maximum coding unit, a coding unit, a prediction unit, or a transformation unit, among coding units according to a tree structure. Video encoding and decoding methods based on coding units according to a tree structure will be described later with reference to FIGS. 8 through 20.

The multilayer video encoding apparatus 10 according to an exemplary embodiment may perform inter prediction in which images of a same layer are mutually referred to in order to predict the images. By performing inter prediction, a motion vector indicating motion information between a current image and a reference image, and a residual between the current image and the reference image may be generated.

Also, the multilayer video encoding apparatus 10 according to an exemplary embodiment may perform interlayer prediction for predicting enhancement layer images are predicted by referring to base layer images. The multilayer video encoding apparatus 10 according to an exemplary embodiment may perform interlayer prediction for predicting second enhancement layer images by referring to first enhancement layer images. By performing interlayer prediction, a position difference component between a current image and a reference image of a layer different from that of the current image and a residual between the current image and the reference image of the different layer may be generated.

When the multilayer video encoding apparatus 10 according to an exemplary embodiment allows at least two enhancement layers, interlayer prediction may be performed between one base layer image and the at least two enhancement layer images according to a multilayer prediction structure.

Inter-prediction and interlayer prediction may be performed based on a data unit, such as a coding unit, a prediction unit, or a transformation unit.

The interlayer encoder 12 according to an exemplary embodiment generates a base layer stream by encoding base layer images. The base layer encoder 12 may perform inter prediction between the base layer images. The base layer encoder 12 according to an exemplary embodiment may encode random access point (RAP) images that are randomly accessible from among the base layer images, without having to refer to other images at all.

An I-type RAP image may be any one of an IDR (Instantaneous Decoding Refresh) image, a CRA (Clean Random Access) image, a BLA (Broken Link Access) image, a TSA (Temporal Sub-Layer Access) image, and a STSA (Stepwise Temporal Sub-Layer Access) image.

A POC (picture order count) is a value associated with each coded picture and indicates a corresponding picture in a CVS (Coded Video Sequence). A POC is represented by a relative temporal distance between pictures based on POCs of pictures existing in a same CVS. A POC at an instant when a certain picture is output indicates a relative output order of the picture compared to other pictures in a same VCS.

A CRA (Clean Random Access) picture is a picture including only I slices and each slice is a coded picture having nal_unit_type of 4. In regard to all encoded pictures that follow a CRA picture both in a decoding order and an output order, inter prediction may not be performed from any picture that precedes the CRA picture in one of the decoding order and the output order. Also, at least one picture preceding the CRA picture in the decoding order also precedes the CRA picture in the output order.

An IDR (Instantaneous Decoding Refresh) picture is an encoded picture having IdrPicFlag of 1, and a decoding apparatus marks all reference pictures as "not referred to" in a decoding process of the IDR picture. All encoded pictures that follow an IDR picture in a decoding order may be encoded without inter prediction from any one picture that precedes the IDR picture. A first picture of each encoded video sequence in the decoding order is an IDR picture.

A broken link means an erroneous link between two frames included in the bitstream that may cause serious visual defects. A broken link may be generated by unspecified operations performed during an encoding process.

A BLA (Broken Link Access) unit is an access unit in which an encoded picture of an access unit is a BLA picture. A BLA (Broken Link Access) picture is a random access point picture having nal_unit_type of 6 or 7. The BLA picture is a CRA picture having a broken link.

A TSA (temporal sub-layer access) picture is used to perform temporal layer uplink switching. A VCL NAL unit of a TSA has a nal_unit_type such as TSA_R or TSA_N. A STSA (step-wise temporal sub-layer access) picture is a picture used for gradual temporal uplink switching, and is an encoded picture in which each VCL NAL unit has nal_unit_type of STSA_R or STSA_N.

In addition, RAP images may be referred to by leading pictures and trailing pictures. The leading pictures and the trailing pictures are behind an RAP image in a decoding order but the leading pictures are before the RAP image in a reproduction order, and the trailing pictures are also behind the RAP image in the decoding order. The trailing pictures may also be referred to as normal pictures.

The leading pictures may be classified into a RADL (Random Access Decodable Leading) image and a RASL (Random Access Skipped Leading) image. When a random access occurs for an RAP image following a leading picture in a reproduction order, an RADL image is a decodable image but an RASL image is not decodable.

The interlayer encoder 12 according to an exemplary embodiment may perform inter prediction on non-RAP images except for a base layer RAP images from among the base layer images. Intra prediction in which peripheral pixels in an image are referred to may be performed on the base layer RAP images. The interlayer encoder 12 according to an exemplary embodiment may generate encoding data by encoding resultant data generated by performing inter prediction or intra prediction. For example, transformation, quantization, entropy encoding or the like may be performed on an image block including the resultant data generated by performing inter prediction or intra prediction.

The interlayer encoder 12 according to an exemplary embodiment may generate a base layer stream including encoding data of a base layer RAP image and encoding data of the remaining base layer images. The interlayer encoder 12 may also output motion vectors generated via inter prediction performed on the base layer images, together with the base layer stream, by using the output unit 14.

Also, the interlayer encoder 12 according to an exemplary embodiment may generate an enhancement layer stream by encoding enhancement layer images. The interlayer encoder 12 according to an exemplary embodiment generates an enhancement layer stream by encoding the enhancement layer images according to layers when encoding a plurality of enhancement layer images. Hereinafter, for convenience of description, encoding operations performed by the interlayer encoder 12 according to an exemplary embodiment to encode an enhancement layer will be described as an operation performed on enhancement layer images of one layer.

However, the operation of the interlayer encoder 12 is not performed only on enhancement layer images of one layer, but may also performed on each of enhancement layer images of other layers.

The interlayer encoder 12 according to an exemplary embodiment may perform interlayer prediction in which base layer images are referred to and inter prediction in which images of a same layer are referred to, so as to encode enhancement layer images.

Inter prediction or interlayer prediction is performed only when a referred image is pre-reconstructed. Thus, when a first image of a current layer is to be initially decoded by referring to another image of the current layer, it is not possible to decode the first image. Thus, an RAP image that is randomly accessible needs to be encoded without referring to another image of the same layer. According to an exemplary embodiment, when random access occurs in an RAP image, the RAP image may be immediately decoded and output even if there is no pre-reconstructed image of the same layer.

According to the multilayer prediction structure of the multilayer video encoding apparatus 10 according to an exemplary embodiment, second layer images may be decoded according to layer switching while decoding first layer images. For example, when a view conversion occurs in a multiview image structure or a temporal hierarchical change occurs in a temporal hierarchical prediction structure, layer switching may be performed in the multilayer prediction structure. At this time, it is not possible to perform inter prediction since pre-reconstructed images of the same layer do not exist at a layer switching point.

The interlayer encoder 12 according to an exemplary embodiment may include encoding data according to images to a NAL unit. NAL unit type information may indicate whether a current image is a trailing picture, a TSA image, an STSA image, an RADL image, an RASL image, a BLA image, an IDR image, a CRA image, or a VLA image.

The interlayer encoder 12 according to an exemplary embodiment may encode a multilayer video so that random access may be independently performed on each layer. Hereinafter, a method of encoding a multilayer video by using the interlayer encoder 12 according to an exemplary embodiment will be described.

The interlayer encoder 12 may independently encode a RAP picture with respect to a plurality of layers including a base layer and an enhancement layer. The RAP picture includes an IDR picture, a CRA picture, and a BLA picture. The interlayer encoder 12 may encode an IDR picture such that the IDR picture is aligned with respect to all layers. Hereinafter, alignment denotes that a same type picture occurs in all layers at a predetermined point in time. For example, when an IDR picture is to be encoded at a POC of a predetermined point in time in one of a plurality of layers, the interlayer encoder 12 may encode pictures with respect to all layers at the corresponding POC to IDR pictures. To this end, the interlayer encoder 12 may encode an IDR picture with respect to an enhancement layer image. For example, the interlayer encoder 12 may generate IDR pictures having an identifier (nuh_layer_id) that is greater than 0. The interlayer encoder 12 may generate an IDR picture by performing interlayer prediction even though interprediction is not allowed.

The interlayer encoder 12 may generate IDR pictures in an access unit with respect to an image with no layer or an access unit with respect to all layers. For example, an IDR-type NAL unit may be an IDR access unit in which decoding of all layers may be started.

The interlayer encoder 12 may encode a CRA picture without aligning the same in all layers. For example, there is no need to encode such that a CRA picture occurs at a POC of a predetermined point in time in all layers. The interlayer encoder 12 may generate a CRA NAL unit with respect to an enhancement layer. For example, the interlayer encoder 12 may use a CRA NAL unit type when nul_layer_id is greater than 0. The interlayer encoder 12 may perform interlayer prediction to generate a CRA picture even though inter prediction is not allowed. For example, the interlayer encoder 12 may not use inter prediction when encoding a CRA picture but may use interlayer prediction with respect to CRA NAL units having nul_layer_id that is greater than 0.

The interlayer encoder 12 does not have to align pictures such that CRA NAL units occur at the same point in time between layers when generating the CRA NAL units. One CRA NAL unit type may be used for all VCL NAL units having a predetermined nul_layer_id value. For example, one CRA NAL unit type may be used only for NAL units corresponding to a predetermined hierarchy identifier. On the other hand, other NAL unit types may be used for all VCL NAL units having a different predetermined nuh_layer_id value with respect to a same access unit. Meanwhile, when a bitstream is spliced, all CRA pictures in an access unit may be modified to BLA.

A CRA picture of a base layer may be used as a random access point of a bitstream, and a CRA of an enhancement layer may be used as a point of layer switching or bitstream extraction.

The interlayer encoder 12 may encode a BLA picture without aligning the same in all layers. For example, there is no need to encode such that a BLA picture occurs at a POC of a predetermined point in time in all layers. The interlayer encoder 12 may use a BLA NAL unit type when nuh_layer_id is greater than 0, and thus, may encode a BLA picture when encoding an enhancement layer image. Meanwhile, when a bitstream is spliced during decoding, all CRA pictures in an access unit may be modified to BLAs. When layers are switched during decoding, CRAs of related layers may be modified to BLAs. BLA may be used not only for splicing of a bitstream but also for notification of layer switching.

As described above, by independently decoding an IDR, a CRA, and a BLA with respect to each layer, the encoding apparatus may independently process random access, splicing, bitstream extraction, and layer switching according to layers. For example, an IDR or BLA picture of each layer may independently activate a SPS. The encoding apparatus may encode an IDR, CRA, and BLA picture of a base layer so that they function as a random access point, and may encode an IDR, CRA, and BLA picture of an enhancement layer so that they function as one of a point of bit extraction and layer switching.

If a RASL picture of a reference layer is not encoded, the interlayer encoder 12 according to an exemplary embodiment may also not encode a picture that refers to the RASL picture. For example, when RASL pictures of referred layers are discarded, the interlayer encoder 12 may also discard pictures that refer to the RASL pictures.

The interlayer encoder 12 may encode an enhancement layer image by using a TSA or STSA NAL unit type. For example, a TSA or STSA NAL unit type may be used when nuh_layer_id is greater than 0. The interlayer encoder 12 may encode an image by setting temporal_ids of pictures in enhancement layers to be equal to or greater than temporal_id of reference pictures in a base layer.

The interlayer encoder 12 may allow different temporal rates (temporal_rate) with respect to respective layers, and allow a non-alignment temporal layer switching point. Also, the interlayer encoder 12 may signal a flag (temporal_rate_synchronized_flag) indicating a temporal rate and whether TSA/STSA are aligned through layers, by using a parameter set such as a VPS, SPS, or PPS, or an SEI image. The table below shows a syntax signaling temporal_rate_synchronized_flag in a VPS extension.

TABLE 1

| | DESCRIPTOR |
|---|---|
| vps_extension( ) { | |
| ... | |
| for( i = 1; i <= vps_max_layers_minus1; i++ ) | |
|   for( j = 0; j < i; j++ ) | |
|     direct_dependency_flag[ i ][ j ] | u(1) |
|   temporal_rate_synchronize_all_layers_flag | u(1) |
|   if( !temporal_rate_synchronize_all_layers_flag) | |
|     for( i - 1; i <- vps_max_layers_minus1; i++ ) | |
|       temporal_rate_synchronize_flag[ i ] | u(1) |
| } | |

The interlayer encoder 12 may set temporal_rate_synchronize_all_layers_flag to 1 in order to indicate that temporal rates of all layers are identical to a temporal rate of a base layer.

The interlayer encoder 12 may set temporal_rate_synchronized_flag[i] to 1 in order to indicate that a temporal rate of an i-th layer is identical to a temporal rate of a base layer.

The interlayer encoder 12 according to an exemplary embodiment may signal to the decoding apparatus whether a RAP picture is located in all layers in an access unit at a predetermined point in time. Hereinafter, when a RAP picture is located in all layers in an access unit at a predetermined point in time, it is described that the RAP is aligned at the predetermined point in time.

For example, the interlayer encoder 12 may generate Irap_present_flag which is a flag indicating whether a RAP picture is aligned at a predetermined point in time. The interlayer encoder 12 may signal Irap_present_flag in units of access units by generating one of an AUD (Access Unit Delimiter), SEI (Supplemental Enhancement information), and a parameter set by using Irap_present_flag.

When RAP pictures are aligned at a predetermined point in time, the interlayer encoder 12 according to an exemplary embodiment may signal information about types of the RAPs aligned at the predetermined point in time, to the decoding apparatus.

For example, type information of RAP pictures of a current access unit may be included in one of an AUD (Access Unit Delimiter), SEI (Supplemental Enhancement information), and a parameter set and signaled to the decoding apparatus. The parameter set includes a video parameter set, a sequence parameter set, and a picture parameter set.

The table below shows a syntax of an AUD that signals whether a RAP picture is aligned in an access unit and a type of an aligned RAP picture. Irap_present_flag may be used as a flag indicating whether irap_type is provided in a current stream.

TABLE 2

| | DESCRIPTOR |
|---|---|
| access_unit_delimiter_rbsp( ) { | |
|   pic_type | u(3) |
|   irap_present_flag | u(1) |
|   if(irap_present_flag) { | |
|     irap_type | u(3) |
|   } | |
|   rbsp_trailing_bits( ) | |
| } | | irap_type may have values as shown in the table below. Irap_type indicates IRAP types of all NAL units of an IRAP picture in an access unit. For example, the interlayer encoder 12 may set a value of Pic_type to 0 in order to indicate that an IDR picture is located in all layers in a corresponding access unit. Similarly, the interlayer encoder 12 may set a value of Pic_type to 5 in order to indicate that a BLA picture is located in a base layer of a corresponding access unit.

TABLE 3

| irap_type | IRAP PICTURE TYPE OF NAL UNIT IN ACCESS UNIT |
|---|---|
| 0 | IDR TYPE IN ALL LAYERS |
| 1 | CRA TYPE IN ALL LAYERS |
| 2 | CRA TYPE IN BASE LAYER |
| 3 | CRA TYPE IN ENHANCEMENT LAYERS |
| 4 | BLA TYPE IN ALL LAYERS |
| 5 | BLA TYPE IN BASE LAYER |
| 6 | BLA TYPE IN ENHANCEMENT LAYERS |

The decoding apparatus may determine whether random access point types in all layers at a predetermined point in time are identical without determining NAL unit types of all layers based on information as above.

The interlayer encoder 12 may signal IRAP picture type information by using a pic_type syntax of an AUD. The table below shows a syntax indicating pic_type in an AUD.

TABLE 4

| | DESCRIPTOR |
|---|---|
| access_unit_delimiter_rbsp( ) { | |
|   pic_type | u(3) |
|   rbsp_trailing_bits( ) | |
| } | |

As pic_type is signaled as 3 bits in a current AUD, pic_type may express eight types in total. In the current pic_type, only three values are used for signaling as shown in the table below. pic_type is an identifier used to determine slice_type with respect to all slices of an encoded picture according to Table 5.

TABLE 5

| pic_type | SLICE_TYPE AVAILABLE IN ENCODED PICTURE |
|---|---|
| 0 | I |
| 1 | P, I |
| 2 | B, P, I |

Accordingly, the interlayer encoder 12 according to an exemplary embodiment may transmit configuration information of a RAP picture of a current access unit by using the five values corresponding to 3 to 7 which are the remaining values in the pic_type.

TABLE 6

| pic_type | IRAP PICTURE TYPE OF NAL UNIT IN ACCESS UNIT |
|---|---|
| 3 | IDR TYPE IN ALL LAYERS |
| 4 | CRA TYPE IN ALL LAYERS |
| 5 | CRA TYPE IN BASE LAYER |
| 6 | BLA TYPE IN ALL LAYERS |
| 7 | BLA TYPE IN BASE LAYER |

If an access unit is an IRAP access unit or NAL_unit_type includes at least one NAL unit in the range from 16 to 23, pic_type may indicate a type of an IRAP picture included in an access unit.

According to another embodiment, the interlayer encoder 12 according to an exemplary embodiment may signal whether an IRAP picture is aligned and type information of an IRAP picture by using a VUI (Video Usability information) of a VPS (Video Parameter Set) as shown in the table below.

TABLE 7

| | DESCRIPTOR |
|---|---|
| vps_vui( ){ | |
|   cross_layer_pic_type_aligned_flag | u(1) |
|   if( !cross_layer_pic_type_aligned_flag ) | |
|     cross_layer_irap_aligned_flag | u(1) |
|     if( cross_layer_irap_aligned_flag ) | |
|       all_layers_idr_aligned_flag | u(1) |
|   .... | |
| } | | cross_layer_pic_type_aligned_flag indicates whether all VCL NAL units belonging to one access unit have an identical NAL unit type. If cross_layer_pic_type_aligned_flag is 1, all VCL NAL units belonging to one access unit are determined to have an identical NAL unit type. cross_layer_pic_type_aligned_flag of 0 indicates that all VCL NAL units belonging to one access unit may not have an identical NAL unit type.

cross_layer_irap_aligned_flag indicates whether an IRAP picture is aligned through layers. cross_layer_irap_aligned_flag of 1 indicates that, when picture A of layer A is an IRAP picture in one access unit, each of pictures in a same access unit belonging to a direct reference layer of layer A or to a layer that has layer A as a direct reference layer is an IRAP picture, and VCL NAL units of picture B have an identical value to a value of a NAL unit type of picture A. cross_layer_irap_aligned_flag of 0 indicate that the above limitation does not apply. If cross_layer_irap_aligned_flag is not provided, a value of cross_layer_irap_aligned_flag may be set to the same value as that of vps_vui_present_flag.

all_layers_idr_aligned_flag of 1 indicates that, when a picture in each access unit with respect to a VCL NAL unit that refers to a VPS is an IRAP picture, all pictures in the same access unit are IDR pictures and have the same NAL unit type. all_layers_idr_aligned_flag of 0 indicates that such limitation may not apply. If all_layers_idr_aligned_flag is not provided, a value of all_layers_idr_aligned_flag is set to 0.

FIG. 1B is a flowchart of a multilayer video encoding method according to an exemplary embodiment. The multilayer video encoding apparatus according to an exemplary embodiment first encodes pictures constituting an image sequence to a plurality of layers including a base layer and an enhancement layer so as to generate random access point (RAP) picture information about the plurality of layers (S110).

Next, the encoding apparatus generates a bitstream by using the RAP picture information (S120). The encoding apparatus may independently encode the plurality of layers such that the plurality of layers each include a RAP picture so that a RAP picture is independently decoded by decoding the RAP picture only with respect to a layer having the RAP picture at a random access point.

The encoding apparatus may generate RAP picture information such that the RAP picture information includes an indicator indicating where a RAP picture is located in a plurality of layers at a same POC (Picture Order Count). For example, RAP picture information may include Irap_present_flag which is a flag indicating whether a RAP picture is located in all layers in an access unit at a predetermined point in time.

The encoding apparatus may generate RAP picture information such that the RAP picture information includes an identifier indicating a type of a RAP picture existing at a same POC of a plurality of layers. For example, RAP picture information may include an Irap_type identifier indicating IRAP types of all NAL units of an IRAP picture in an access unit.

The encoding apparatus may generate a data unit of one of a parameter set, an AUD (Access Unit Delimiter), and SEI (Supplemental Enhancement Information) by using RAP picture information, and generate a bitstream by using the generated data unit.

The encoding apparatus may set a temporal identifier (temporal_id) of a picture included in an enhancement layer to a value greater than or equal to a temporal identifier (temporal_id) of a reference picture included in a base layer.

Figure 2A:
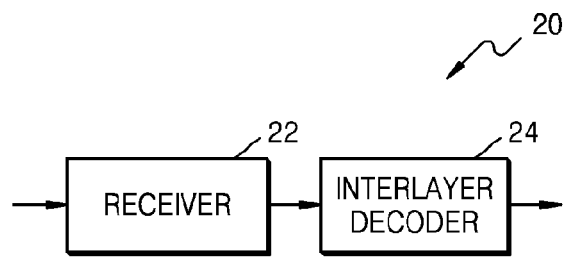
FIG. 2A is a block diagram of a multilayer video decoding apparatus according to an exemplary embodiment.

FIG. 2A is a block diagram of a multilayer video decoding apparatus according to an exemplary embodiment. The multilayer video decoding apparatus 20 according to an exemplary embodiment includes a receiver 22 and an interlayer decoder 24. In an exemplary embodiment, the receiver 22 and the interlayer decoder 24 may each be implemented in hardware including a circuit.

The multilayer video decoding apparatus 20 according to an exemplary embodiment receives a base layer stream and an enhancement layer stream. The multilayer video decoding apparatus 20 may receive, according to a scalable video coding method, a base layer stream including encoding data of base layer images, as a base layer stream, and receive an enhancement layer stream including encoding data of enhancement layer images, as an enhancement layer stream.

The multilayer video decoding apparatus 20 according to an exemplary embodiment may decode a plurality of layer streams according to a scalable video coding method. The multilayer video decoding apparatus 20 according to an exemplary embodiment may reconstruct base layer images by decoding a base layer streams, and may reconstruct enhancement layer images by decoding a enhancement layer stream.

For example, a multiview video may be encoded according to a scalable video coding method. For example, central view images may be reconstructed by decoding a base layer stream. By further decoding a first enhancement layer stream in addition to the base layer stream, leftview images may be reconstructed. By further decoding a second enhancement layer stream in addition to the base layer stream, rightview images may be reconstructed.

Alternatively, a scalable video coding method may be performed according to temporal hierarchical prediction. By decoding a base layer stream, images of a base frame rate may be reconstructed. By further decoding an enhancement layer stream in addition to the base layer stream, images of a high speed frame rate may be reconstructed.

Also, if three or more enhancement layers are included, first enhancement layer images with respect to a first enhancement layer may be reconstructed from a first enhancement layer stream, and when a second enhancement layer stream is further decoded, second enhancement layer images may be further reconstructed. By further decoding a K-th enhancement layer stream in addition to the first enhancement layer stream, K-th enhancement layer images may be further reconstructed.

The multilayer video decoding apparatus 20 according to an exemplary embodiment decodes according to blocks of respective images of a video. A block according to an exemplary embodiment may be, from among coding units according to a tree structure, for example, a maximum coding unit, a coding unit, a prediction unit, or a transformation unit.

The multilayer video decoding apparatus 20 according to an exemplary embodiment may obtain encoded data of base layer images and enhancement layer images from a base layer stream and an enhancement layer stream, and may further obtain a motion vector generated by inter prediction and disparity information generated by interlayer prediction.

For example, the multilayer video decoding apparatus 20 according to an exemplary embodiment may decode inter predicted data according to layers, and may decode interlayer-predicted data between multiple layers. Reconstruction based on motion compensation and interlayer decoding may also be performed in units of coding units or prediction units according to an exemplary embodiment.

Images may be reconstructed by performing motion compensation in which images predicted by inter prediction of a same layer are mutually are referred to, with respect to each layer stream. Motion compensation refers to an operation of reconstructing a reconstruction image of a current image by synthesizing a reference image determined by using a motion vector of the current image and a residual of the current image.

Also, the multilayer video decoding apparatus 20 according to an exemplary embodiment may perform interlayer decoding by referring to base layer images in order to reconstruct an enhancement layer image predicted by interlayer prediction. Interlayer decoding refers to an operation of reconstructing a reconstruction image of a current image by synthesizing a reference image of a different layer determined by using disparity information of the current image and a residual of the current image.

The multilayer video decoding apparatus 20 according to an exemplary embodiment may perform interlayer decoding for reconstructing second enhancement layer images predicted by referring to first enhancement layer images.

According to an exemplary embodiment, base layer images and enhancement layer images may include RAP images which are randomly accessible points.

The interlayer decoder 24 reconstructs base layer images by decoding a received base layer stream. In detail, a residual of the base layer images may be reconstructed by performing entropy decoding, inverse quantization, inverse transformation on symbols extracted by parsing the base layer stream.

The interlayer decoder 24 may receive a bitstream of quantized transformation coefficients of base layer images via the receiver 22. As a result of performing inverse quantization and inverse transformation on the quantized transformation coefficients, a residual of the base layer images may be reconstructed. The interlayer decoder 24 may reconstruct the base layer images through motion compensation in which the base layer images are mutually referred to.

The interlayer decoder 24 may reconstruct a base layer RAP image by decoding a quantized transformation coefficient of the base layer RAP image of an I-type, from a base layer stream. The interlayer decoder 24 according to an exemplary embodiment may reconstruct base layer RAP images, which are an I-type, from among base layer images, without referring to other base layer image. The interlayer decoder 24 according to an exemplary embodiment may reconstruct pixels of blocks of a base layer RAP image which is an I-type, via intra prediction in which peripheral pixels of a current block are used within a same picture.

In addition, the interlayer decoder 24 may reconstruct base layer images via motion compensation in which other base layer images are referred to, with respect to base layer images except a base layer RAP image from among the base layer images. The interlayer decoder 24 may reconstruct a residual of base layer images except the base layer RAP image, and determine a reference image from among the base layer images to compensate the reference image for the residual, thereby reconstructing the base layer images.

The interlayer decoder 24 according to an exemplary embodiment reconstructs enhancement layer images by decoding an enhancement layer stream. In detail, a residual of respective blocks may be reconstructed by performing entropy encoding, inverse quantization, and inverse transformation on symbols extracted by parsing an enhancement layer stream. The interlayer decoder 24 may directly receive a bitstream of a quantized transformation coefficient of a residual, and a residual may be reconstructed by performing inverse quantization and inverse transformation on the bitstream.

In order to reconstruct an enhancement layer stream, the interlayer decoder 24 according to an exemplary embodiment may reconstruct enhancement layer images via motion compensation in which base layer images reconstructed from a base layer stream are referred to and interlayer decoding in which images of a same layer are referred to.

The interlayer decoder 24 according to an exemplary embodiment may reconstruct enhancement layer images via interlayer decoding in which base layer images reconstructed by using the interlayer decoder 24 are referred to. With respect to a predetermined enhancement layer, current enhancement layer images may be reconstructed via interlayer decoding in which not only base layer images but also images of another enhancement layer which is not a current enhancement layer are referred to.

Motion compensation or interlayer decoding is performed only when a referred image is pre-reconstructed. However, a RAP image that is randomly accessible does not refer to other images of the same layer. Accordingly, when a random access occurs in a RAP image according to an exemplary embodiment, even though no pre-reconstructed images are available in the same layer, the RAP image may be immediately decoded. In a multilayer prediction structure according to an exemplary embodiment, when a RAP image exists among base layer images, an enhancement layer RAP image corresponding to a base layer RAP image may be reconstructed from among enhancement layer images.

In addition, the interlayer decoder 24 may reconstruct enhancement layer images by performing motion compensation in which enhancement layer images of the same layer are referred to. In particular, the interlayer decoder 24 according to an exemplary embodiment may reconstruct enhancement layer images via motion compensation in which an enhancement layer RAP image of the same layer is referred to.

For enhancement layer images which are not a RAP image, the interlayer decoder 24 may reconstruct enhancement layer images via motion compensation in which same layer images as those of interlayer decoding, in which other layer images are referred to, are referred to.

In detail, the interlayer decoder 24 may obtain a motion vector and a residual of enhancement layer images except an enhancement layer RAP image by decoding an enhancement layer stream. The interlayer decoder 24 may determine a reference image from among same layer images by using the motion vector, and reconstruct the enhancement layer images by compensating the reference image for the residual. A reference block may be determined from among the reference image by using a motion vector of a current block of a current image.

In detail, the interlayer decoder 24 may obtain disparity information and a residual of enhancement layer images except an enhancement layer RAP image, by decoding an enhancement layer stream. The interlayer decoder 24 may determine a reference image from among other layer images by using the disparity information, and may reconstruct the enhancement layer images by compensating the reference image for the residual.

When decoding a plurality of enhancement layer streams, the interlayer decoder 24 according to an exemplary embodiment may reconstruct enhancement layer images according to layers by decoding an enhancement layer stream according to layers. Hereinafter, for convenience of description, a decoding operation on an enhancement layer stream, performed by the interlayer decoder 24 according to an exemplary embodiment, will be described as an operation performed on an enhancement layer stream of one layer. However, an operation of the interlayer decoder 24 is not performed only on an enhancement layer stream of one layer but the same operation may also be performed on each of other layer streams.

In order to reconstruct an enhancement layer image, the interlayer decoder 24 according to an exemplary embodiment may perform interlayer decoding, in which base layer images are referred to, and motion compensation, in which reconstructed images of the same layer are referred to.

While a first layer stream is being decoded according to a multilayer prediction structure of the multilayer video decoding apparatus 20 according to an exemplary embodiment, a second layer stream may be decoded according to layer switching. For example, when a view change occurs in a multiview image structure or a change of a temporal layer occurs in a temporal hierarchical prediction structure, layer switching may be performed in the multilayer prediction structure. In this case, also, since there are no pre-reconstructed images of a same layer at a layer switching point, inter prediction is not possible.

The interlayer decoder 24 may obtain encoding data of each image for each NAL unit. Whether a current image is a trailing picture, a TSA image, a STSA image, a RADL image, a RASL image, a BLA image, an IDR image, a CRA image, or a VLA image may be determined by parsing NAL unit type information.

The interlayer decoder 24 according to an exemplary embodiment may independently perform random access according to respective layers. Hereinafter, a method of independently performing random access according to respective layers, performed by the interlayer decoder 24, will be described.

The interlayer decoder 24 may independently encode a RAP picture with respect to encoding images of a plurality of layers including a base layer and an enhancement layer. A RAP picture includes an IDR picture, a CRA picture, and a BLA picture. In a multilayer encoding image, IDR pictures are aligned. Alignment denotes that types of pictures occurring at a POC of a predetermined point in time in all layers are identical. IDR pictures may have nuh_layer_id that is greater than 0, and thus may occur in an enhancement layer encoding image, and may be interlayer predicted. IDR pictures may occur in an access unit including no layer or an access unit with respect to all layers. For example, an IDR type NAL unit may indicate a complete IDR access unit in which decoding of all layers may be started.

In a multilayer encoding image, CRA pictures may not be aligned in all layers. A CRA NAL unit type may be used when nuh_layer_id is greater than 0, and thus, a CRA NAL unit may occur in an enhancement layer. CRA pictures may not be inter predicted, but interlayer prediction may be performed on CRA NAL units of an enhancement layer having nuh_layer_id that is greater than 0.

There is no need for CRA NAL units to be aligned between layers. For example, one CRA NAL unit type may be used with respect to all VCL NAL units having a predetermined nuh_layer_id value. When a bitstream is spliced, all CRA pictures in an access unit are modified to BLA. A CRA picture of a base layer may be used as a random access point of a bitstream, and a CRA picture of an enhancement layer may be used as a point of layer switching or bitstream extraction.

In a multilayer encoding image, a BLA picture may not be aligned in all layers. A BLA NAL unit type may be used when nuh_layer_id is greater than 0, and thus, a BLA NAL unit may occur in an enhancement layer. When a bitstream is spliced, all CRA pictures in an access unit are modified to BLAs, and when layers are switched, CRAs of related layers are modified to BLA. A BLA picture may be used not only for splicing of a bitstream but also for notification of layer switching.

The interlayer decoder 24 may perform decoding by receiving a multilayer encoding image, in which an IDR picture is aligned in all layers. Alignment means that a picture of a same type is located at a POC of a predetermined point in time in all layers. For example, if an IDR picture is located at a POC of a predetermined point in time in one of a plurality of layers, the interlayer decoder 24 may determine that pictures with respect to all layers at the POC are all IDR pictures and perform decoding. Even though inter prediction is not allowed, the interlayer decoder 24 may decode the IDR pictures by performing interlayer prediction.

The interlayer decoder 24 may independently decode an enhancement layer encoding image by using a CRA NAL unit in an enhancement layer. Inter prediction may not be performed on CRA pictures, but CRA pictures of the enhancement layer may be interlayer predicted.

The interlayer decoder 24 may use one CRA NAL unit type with respect to all VCL NAL units having a predetermined nuh_layer_id value. When a bitstream is spliced, the interlayer decoder 24 modifies all CRA pictures in an access unit to BLA. The interlayer decoder 24 may use a CRA picture of a base layer as a random access point of a bitstream. The interlayer decoder 24 may use a CRA picture of an enhancement layer as a point of layer switching or bitstream extraction.

A BLA NAL unit may occur in an enhancement layer. When a bitstream is spliced, the interlayer decoder 24 modifies all CRA pictures in an access unit to BLAs, and when layers are switched, the interlayer decoder 24 modifies CRAs of related layers to BLAs. BLA may be used not only for splicing of a bitstream but also for notification of layer switching.

As described above, the interlayer decoder 24 may independently process random access, splicing, bitstream extraction, and layer switching according to layers by using IDR, CRA, and BLA that are independently included in each layer. For example, the interlayer decoder 24 may perform decoding by independently activating a SPS (Sequence Parameter Set) by using an IDR or BLA picture of each layer. The decoding apparatus may use an IDR, CRA, or BLA picture of a base layer as a random access point, and use an IDR, CRA, or BLA picture of an enhancement layer as one of a point of bitstream extraction and layer switching.

The interlayer decoder 24 converts all CRA pictures included in an access unit of a point where random access or splicing has occurred, to BLA. The interlayer decoder 24 converts CRA pictures of layers that are newly transmitted after bitstream extraction and layer switching have occurred, to BLA, at a point where bitstream extraction and layer switching have occurred. The interlayer decoder 24 may independently splice each layer.

Figure 2B:
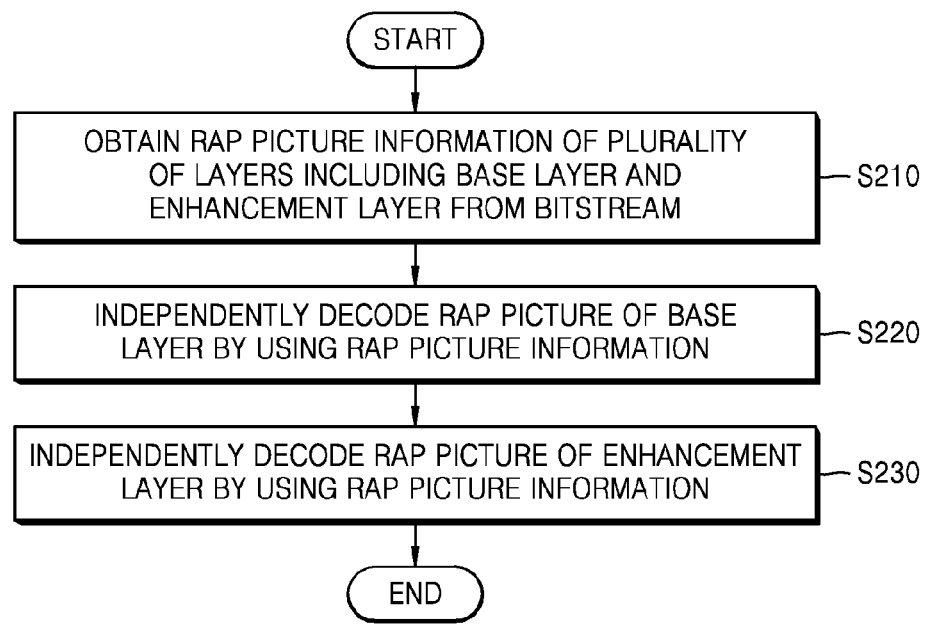
FIG. 2B is a flowchart of an interlayer video decoding method of the interlayer video decoding apparatus of FIG. 2A.
Figure 2C:
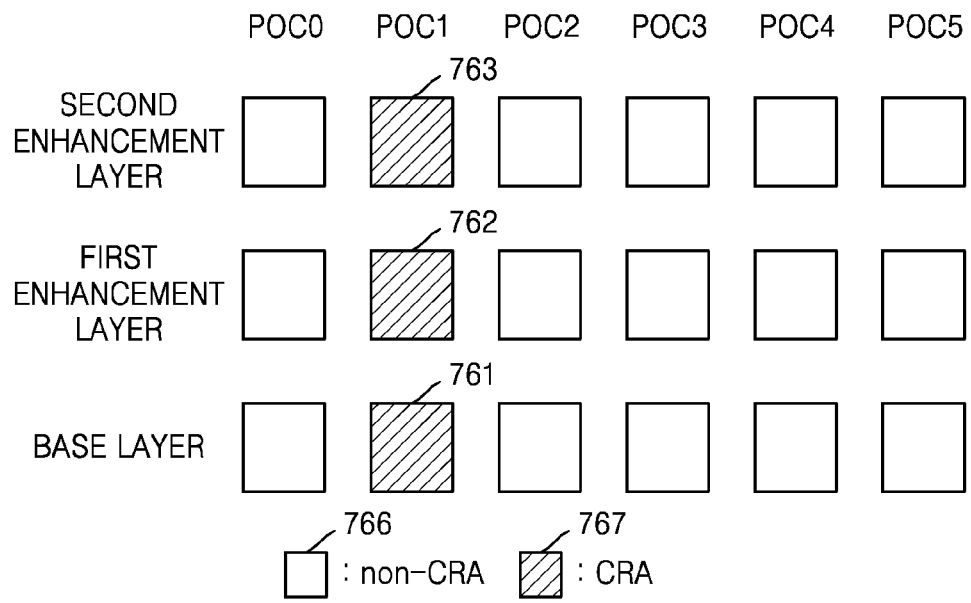
FIGS. 2C and 2D illustrate types of pictures of a plurality of layers included in an access unit according to an output point of time.
Figure 2D:
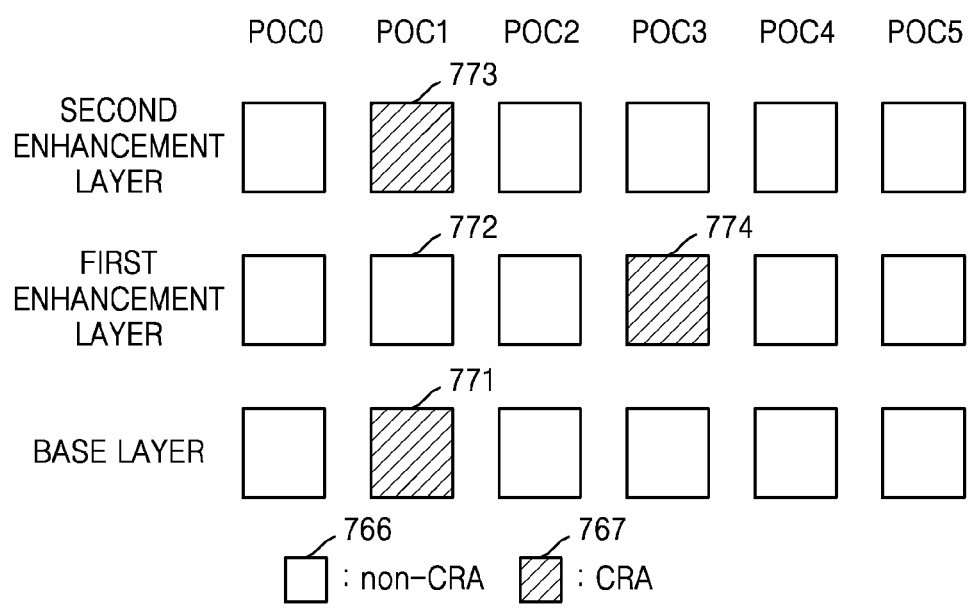

FIGS. 2C and 2D illustrate types of pictures of a plurality of layers included in an access unit according to an output point of time. FIG. 2C illustrates an access unit in which CRA pictures 761, 762, and 763 of all layers are aligned at POC1. As illustrated in FIG. 2C, the interlayer decoder 24 converts all CRAs to BLA when a picture type of all layers included in one access unit at a point of splicing or at a random access point is CRA. When the interlayer decoder 24 performs random access on POC1 in the example of FIG. 2C, the interlayer decoder 24 converts the CRA pictures 761, 762, and 763 of all layers corresponding to POC1 to BLA and performs a random access.

FIG. 2D illustrates an access unit in which CRA pictures of all layers are not aligned. If a picture type of some enhancement layers in an access unit is not a CRA picture, the interlayer decoder 24 converts CRA pictures to BLA, and skips non-CRA layers without encoding all pictures thereof until a next RAP occurs. In the example of FIG. 2D, a picture of a first enhancement layer at POC1 is not a CRA picture. When performing a random access at a point of POC1 in the example of FIG. 2D, the interlayer decoder 24 modifies CRA pictures 771 and 773 of a base layer and a second enhancement layer to BLA to thereby independently perform a random access, but skips all pictures of the first enhancement layer until a next CRA picture 774 occurs, and independently performs a random access by decoding the next CRA picture 774.

The interlayer decoder 24 according to an exemplary embodiment may receive, from the encoding apparatus, a signaling regarding whether a RAP picture is located in all layers in an access unit at a predetermined point in time as in the example illustrated in FIG. 2C. Hereinafter, when a RAP picture is located in all layers in an access unit at a predetermined point in time, it is described that the RAP is aligned at the predetermined point in time.

For example, the interlayer decoder 24 may receive, from the encoding apparatus, Irap_present_flag which is a flag indicating whether a RAP picture is aligned at a predetermined point in time. The interlayer decoder 24 may determine whether a RAP picture is aligned at a predetermined point in time based on a value of Irap_present_flag included in one of an AUD (Access Unit Delimiter), a SEI (Supplemental Enhancement information) message, and a parameter set received from the encoding apparatus. The interlayer decoder 24 may not have to check one by one whether a picture in each layer is a RAP picture by receiving a signal regarding whether a RAP picture is aligned as described above.

When a RAP picture is aligned at a predetermined point in time, the interlayer decoder 24 may receive information about a type of RAPs aligned at a predetermined point in time, from the encoding apparatus. For example, type information of RAP pictures of a current access unit may be received from one of an AUD (Access Unit Delimiter), SEI (Supplemental Enhancement information) message, and a parameter set. The parameter set includes a video parameter set, a sequence parameter set, and a picture parameter set.

This will be described with reference to Table 2 described above. Table 2 shows a syntax of an AUD that signals whether a RAP picture is aligned in an access unit and a type of an aligned RAP picture. Irap_present_flag may be used as a flag indicating whether irap_type is provided. By receiving a signal regarding what RAP picture type is aligned, as described above, the interlayer decoder 24 does not have to check one by one what RAP picture type a picture of each layer is.

irap_type may have a syntax as shown in Table 3 described above. Irap_type indicates IRAP types of all NAL units of an IRAP picture in an access unit. For example, if Pic_type is 0, the interlayer decoder 24 may determine that an IDR picture is located in all layers in a corresponding access unit. If Pic_type is 5, the interlayer decoder 24 may determine that a BLA picture is located in a base layer in a corresponding access unit.

The decoding apparatus may check whether random access point types in all layers at a predetermined point in time are identical without checking a NAL unit type of all layers based on irap_present_flag and irap_type information as described above.

The interlayer decoder 24 may determine IRAP picture type information by using a pic_type syntax of an AUD. Table 4 described above is a syntax indicating pic_type in an AUD.

As pic_type is signaled as 3 bits in a current AUD, pic_type may express eight types in total. In the current pic_type, only three values are used for signaling as in Table 5 described above.

Accordingly, the interlayer decoder 24 according to an exemplary embodiment may determine configuration information of a RAP picture of a current access unit by using the five values corresponding to 3 to 7 which are the remaining values in the pic_type.

Pic_type indicates a slice_type value with respect to all slices of an encoded picture based on given values of pic_type as shown in Table 5 described above. If an access unit is an IRAP access unit, or NaI_unit_type includes at least one NAL unit in the range from 16 to 23, pic_type may indicate a type of an IRAP picture included in an access unit.

When a RASL picture of a reference layer is not decoded, the interlayer decoder 24 according to an exemplary embodiment may also not decode a picture that refers to the RASL picture. For example, when RASL pictures of referred layers are discarded, the interlayer decoder 24 may also discard pictures that refer to the RASL pictures.

According to another embodiment, the interlayer decoder 24 according to an exemplary embodiment may receive information regarding whether an IRAP picture is aligned and type information of an IRAP picture from the encoding apparatus by using a VUI (Video Usability information) of a VPS (Video Parameter Set) as in Table 7 described above.

Semantics regarding a syntax element about Table 7 is described with reference to the encoding apparatus.

The interlayer decoder 24 may decode an image by performing temporal uplink switching by using TSA and STSA in enhancement layers in the same manner as they are used in a base layer. The interlayer decoder 24 may decode an image in an enhancement layer by using TSA or STSA NAL unit type. For example, TSA or STSA NAL unit type may be used when nuh_layer_id is greater than 0. The interlayer decoder 24 may decode an image by setting temporal_ids of pictures in enhancement layers to a value equal to or greater than temporal_id of reference pictures in a base layer.

The interlayer decoder 24 may allow different temporal rates (temporal_rate) with respect to respective layers, and allow a non-alignment temporal layer switching point. Also, the interlayer decoder 24 may obtain a flag (temporal_rate_synchronized_flag) indicating a temporal rate and whether TSA/STSAs are aligned through layers, from a parameter set such as VPS, SPS, or PPS, or a SEI message. Table 1 described above denotes a syntax that signals temporal_rate_synchronized_flag in a VPS extension.

The interlayer decoder 24 may determine that temporal rates of all layers are identical to a temporal rate of a base layer when a value of temporal_rate_synchronize_all_layers_flag is 1. When a value of temporal_rate_synchronized_flag[i] is 1, the interlayer decoder 24 may determine that a temporal rate of an i-th layer is identical to a temporal rate of a base layer.

FIG. 2B is a flowchart of a multilayer video decoding method performed by a multilayer video decoding apparatus according to an exemplary embodiment. First, the decoding apparatus obtains RAP picture information of a plurality of layers including a base layer and an enhancement layer from a bitstream (S210).

The decoding apparatus may obtain an indicator indicating whether a RAP picture is located at a same POC (Picture Order Count) in all layers, as RAP picture information.

The decoding apparatus may obtain an identifier indicating a type of a RAP picture existing at a same POC of all layers, as RAP picture information.

The decoding apparatus may obtain RAP picture information from one of a parameter set, an AUD (Access Unit Delimiter), and SEI (Supplemental Enhancement Information).

Next, the decoding apparatus independently decodes a RAP picture of a base layer by using RAP picture information (S220). Next, the decoding apparatus independently decodes a RAP picture of an enhancement layer by using RAP picture information (S230).

The decoding apparatus may perform independent decoding by decoding a RAP picture with respect to only a layer having the RAP picture at a random access point. For example, if only a base layer has a RAP picture at a random access point, the decoding apparatus may perform independent decoding by decoding the RAP picture of the base layer only, at the corresponding random access point. Similarly, if only one of enhancement layers has a RAP picture at a random access point, the decoding apparatus may perform independent decoding by decoding the RAP picture of the corresponding layer only at the corresponding random access point.

If a picture of an enhancement layer at a POC which is a random access point is a non-RAP picture, the decoding apparatus may decode a RAP picture that occurs after the non-RAP picture in a POC order. For example, the decoding apparatus independently performs random access by decoding a RAP picture with respect to enhancement layers having a RAP picture at a POC i, which is a random access point, and skips pictures that are not RAP pictures until a RAP picture occurs in a POC order if a picture of a j-th enhancement layer is not a RAP picture. When a RAP picture occurs, the decoding apparatus independently performs random access with respect to the j-th enhancement layer by decoding a RAP picture of the j-th enhancement layer.

If a RASL (Random Access Skip Leading) picture of a reference layer is not decoded, the decoding apparatus may also not decode a picture that refers to the RASL picture.

A temporal identifier (temporal_id) of a picture included in an enhancement layer may have a value greater than or equal to a temporal identifier (temporal_id) of a reference picture included in a base layer.

The decoding apparatus may use at least one of IDR (Instantaneous Decoding Refresh), CRA (Clean Random Access), and BLA (Broken Link Access) pictures as a RAP picture. The decoding apparatus may use at least one of IDR, CRA, and BLA pictures as at least one of a bitstream extraction point picture and a layer switching point picture. The decoding apparatus may splice any one of a plurality of layers independently from other layers.

Figure 3:
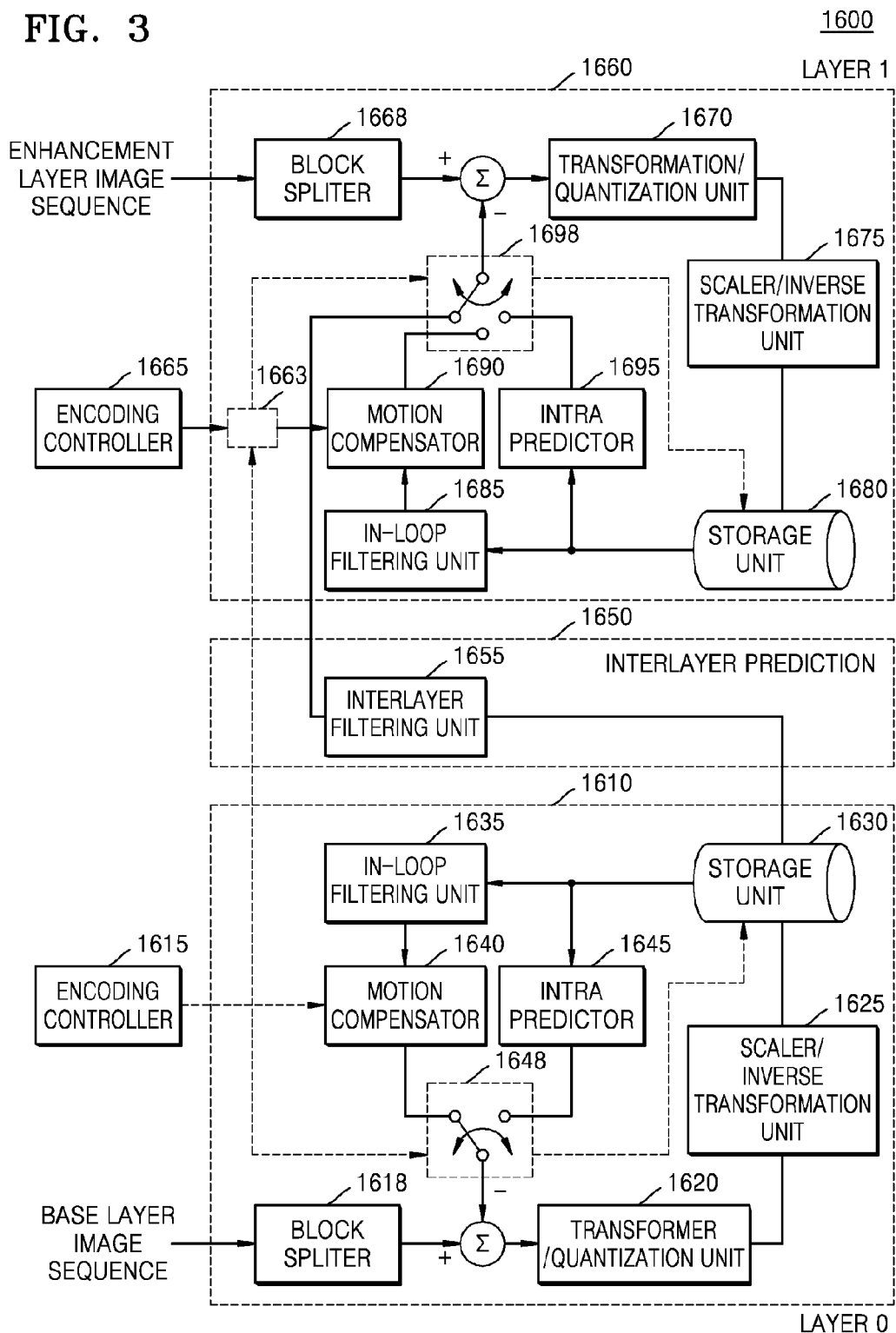
FIG. 3 is a diagram of an interlayer prediction structure according to an exemplary embodiment.

FIG. 3 is a diagram of an interlayer prediction structure according to an exemplary embodiment.

An interlayer encoding system 1600 includes a base layer encoder 1610, an enhancement layer encoder 1660, and an interlayer predictor 1650 between the base layer encoder 1610 and the enhancement layer encoder 1660. The base layer encoder 1610 and the enhancement layer encoder 1660 may respectively show detailed structures of a base layer encoder 1410 and an enhancement layer encoder 1420. In an exemplary embodiment, the individual elements of the interlayer encoding system 1600 maybe implemented in hardware including a circuit.

The base layer encoder 1610 receives and encodes a base layer image sequence according to images. The enhancement layer encoder 1660 receives and encodes an enhancement layer image sequence according to images. Overlapping operations of the base layer encoder 1610 and the enhancement layer encoder 1660 will be simultaneously described later.

An input image (a low resolution image or a high resolution image) is split into a maximum coding unit, a coding unit, a prediction unit, or a transformation unit through a block splitter 1618 or 1668. In order to encode a coding unit output from the block splitter 1618 or 1668, intra prediction or inter prediction may be preformed according to prediction units of the coding unit. A prediction switch 1648 or 1698 may enable inter prediction to be performed by referring to a pre-reconstructed image output from a motion compensator 1640 or 1690 or intra prediction to be performed by using a neighboring prediction unit of a current prediction unit in a current input image output from an intra predictor 1645 or 1695, based on whether a prediction mode of a prediction unit is an intra prediction mode or an inter prediction mode. Residual information may be generated according to prediction units via inter prediction.

Residual information between a prediction unit and an adjacent image is input to a transformation/quantization unit 1620 or 1670 according to prediction units of a coding unit. The transformation/quantization unit 1620 or 1670 may output a quantized transformation coefficient by performing transformation and quantization according to transformation units, based on a transformation unit of a coding unit.

A scaling/inverse transformation unit 1625 or 1675 may generate residual information of a spatial domain by again performing scaling and inverse transformation on the quantized transformation coefficient according to transformation units of a coding unit. When the prediction switch 1648 or 1698 is controlled to point at an inter mode, a reconstructed image including a current prediction unit may be generated as the residual information is composed with a pre-reconstructed image or a neighboring prediction unit, and the reconstructed image may be stored in a storage unit 1630 or 1680. The reconstructed image may be transmitted to the intra predictor 1645 or 1695 or the motion compensator 1640 or 1690 according to a prediction mode of a prediction unit that is encoded next.

In detail, in an inter mode, an in-loop filtering unit 1635 or 1685 may perform, on a reconstructed image stored in the storage unit 1630 or 1680, at least one of deblocking filtering and sample adaptive offset (SAO) filtering according to coding units. At least one of deblocking filtering and SAO filtering may be performed on a coding unit and at least one of a prediction unit and a transformation unit included in the coding unit.

Deblocking filtering is filtering for easing a blocking phenomenon of a data unit, and SAO filtering is filtering for compensating for a pixel value that is transformed according to data encoding and decoding. Data filtered by the in-loop filtering unit 1635 or 1685 may be transmitted to the motion compensator 1640 or 1690 according to prediction units. Then, in order to encode a following coding unit output from the block splitter 1618 or 1668, residual information between a current reconstructed image and a following coding unit output from the motion compensator 1640 or 1690 and the block splitter 1618 or 1668 may be generated.

As such, the above encoding operation may be repeated according to coding units of an input image.

Also, for interlayer prediction, the enhancement layer encoder 1660 may refer to a reconstructed image stored in the storage unit 1630 of the base layer encoder 1610. An encoding controller 1615 of the base layer encoder 1610 may control the storage unit 1630 of the base layer encoder 1610 to transmit a reconstructed image of the base layer encoder 1610 to the enhancement layer encoder 1660. In the interlayer predictor 1650, an in-loop filtering unit 1655 may perform at least one of deblocking filtering, SAO filtering, and ALF filtering on a base layer reconstructed image output from the storage unit 1630 of the base layer encoder 1610. When resolution of a base layer image and resolution of an enhancement layer image are different from each other, the interlayer predictor 1650 may up-sample the base layer reconstructed image and then transmitting the base layer reconstructed image to the enhancement layer encoder 1660. When interlayer prediction is performed according to control of the switch 1698 of the enhancement layer encoder 1660, interlayer prediction may be performed on an enhancement layer image by referring to the base layer reconstructed image transmitted through the interlayer predictor 1650.

In order to encode an image, various encoding modes may be set for a coding unit, a prediction unit, and a transformation unit. For example, a depth or split information (split flag) may be set as an encoding mode of a coding unit. A prediction mode, a partition type, intra direction information, or reference list information may be set as an encoding mode of a prediction unit. A transformation depth or split information may be set as an encoding mode of a transformation unit.

The base layer encoder 1610 may determine a coded depth, a prediction mode, a partition type, an intra direction/reference list, and a transformation depth, which have highest encoding efficiency, based on results of performing encoding by applying various depths for a coding unit, various prediction modes, various partition types, various intra directions, and various reference lists for a prediction unit, and various transformation depths for a transformation unit. The encoding mode determined by the base layer encoder 1610 is not limited thereto.

The encoding controller 1615 of the base layer encoder 1610 may control each component such that one of various encoding modes is suitably applied thereto. Also, the encoding controller 1615 may control the enhancement layer encoder 1660 to determine an encoding mode or residual information by referring to an encoding result of the base layer encoder 1610, for interlayer encoding of the enhancement layer encoder 1660.

For example, the enhancement layer encoder 1660 may use an encoding mode of the base layer encoder 1610 as an encoding mode for an enhancement layer image, or may determine an encoding mode for an enhancement layer image by referring to an encoding mode of the base layer encoder 1610. The encoding controller 1615 of the base layer encoder 1610 may control a control signal of an encoding controller 1665 of the enhancement layer encoder 1660 of the base layer encoder 1610 to use a current encoding mode of the base layer encoder 1610 in order to determine a current encoding mode of the enhancement layer encoder 1660.

An interlayer decoding system according to an interlayer prediction method may be realized similarly to the interlayer encoding system 1600 of FIG. 3 according to the interlayer prediction method. In other words, the interlayer decoding system of a multilayer video may receive a base layer bitstream and an enhancement layer bitstream. A base layer decoder of the interlayer decoding system may reconstruct base layer images by decoding the base layer bitstream. An enhancement layer decoder of the interlayer decoding system may reconstruct enhancement layer images by decoding the enhancement layer bitstream by using a base layer reconstructed image and parsed encoding information.

Figure 4A:
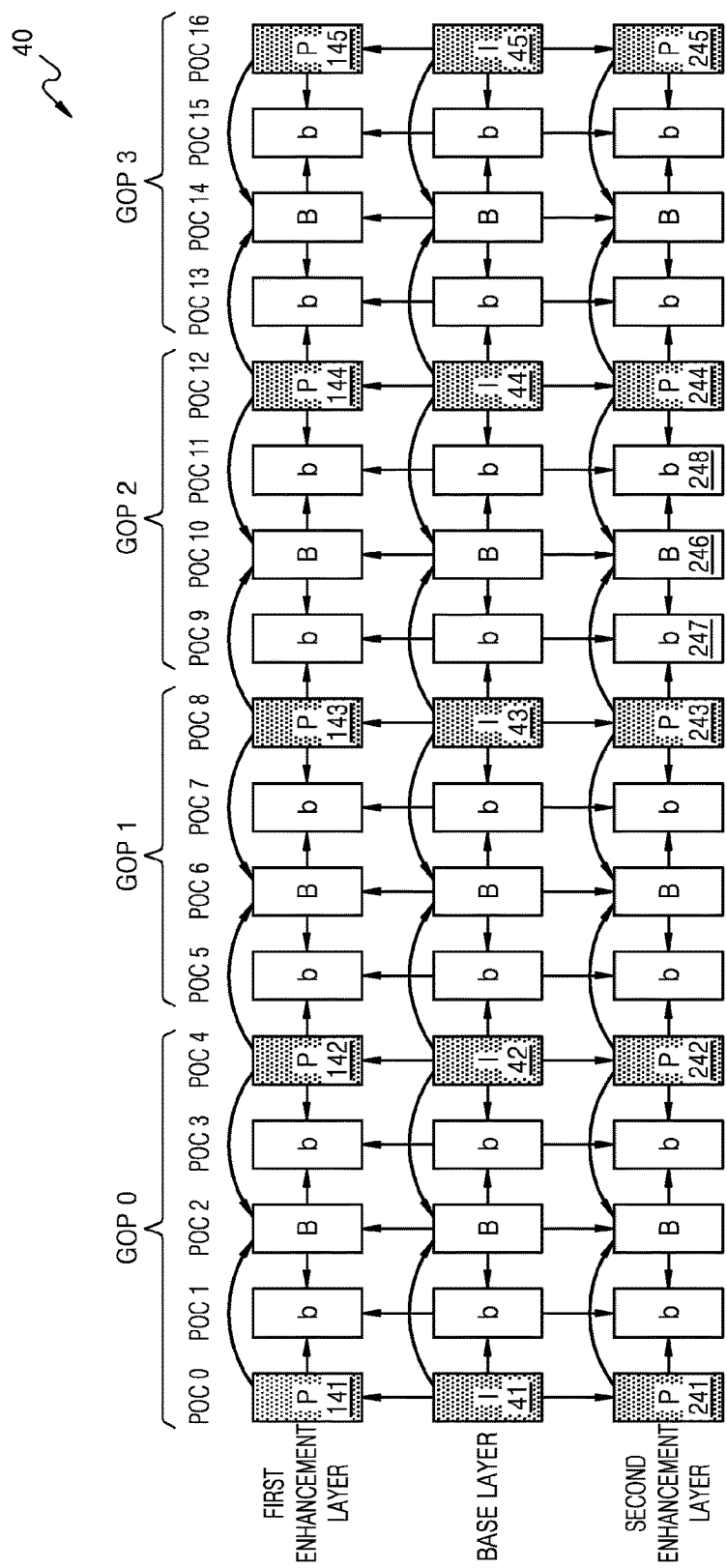
FIG. 4A is a diagram of a multilayer prediction structure of multilayer images.

FIG. 4A is a diagram of a multilayer prediction structure 40 of multilayer images.

In the multilayer prediction structure 40 of FIG. 4A, images are arranged in a reproduction order POC. According to a reproduction order and a decoding order of the multilayer prediction structure 40, images of the same layer are arranged in a horizontal direction.

Also, images having a same POC value are arranged vertically. A POC value of an image indicates a reproduction order of images constituting a video. 'POC X' marked in the multilayer prediction structure 40 indicates a reproduction order of images located in its corresponding column, and the smaller X is, the earlier is the reproduction order, and the greater X is, the later is the reproduction order.

Thus, according to the reproduction order of the multilayer prediction structure 40, images of each layer are arranged in the horizontal direction according to POC values (reproduction order). Also, first and second enhancement layer images located on the same column as a base layer image have the same POC value (reproduction order).

Four consecutive images constitute a single group of pictures (GOP) for each layer. Each GOP includes images between consecutive anchor pictures and a single anchor picture.

The anchor picture is a random access point, and in this regard, when a predetermined reproduction position is selected from images that are arranged according to a reproduction order of video, that is, according to a POC, an anchor picture of which a POC is closest to the reproduction position is reproduced. Base layer images include base layer anchor pictures 41, 42, 43, 44, and 45, first enhancement layer images include first enhancement layer anchor pictures 141, 142, 143, 144, and 145, and second enhancement layer images include second enhancement layer anchor pictures 241, 242, 243, 244, and 245.

Multilayer images may be reproduced and predicted (reconstructed) in a GOP order. First, according to a reproduction order and a decoding order of the multilayer prediction structure 40 of FIG. 4A, for each layer, images included in GOP 0 may be reconstructed and reproduced, and then images included in GOP 1 may be reconstructed and reproduced. That is, images included in respective GOPs may be reconstructed and reproduced in an order of GOP 0, GOP 1, GOP 2, and GOP 3.

According to the reproduction order and the decoding order of the multilayer prediction structure 40, interlayer prediction and inter prediction are performed on the images. In the multilayer prediction structure 40, an image from which an arrow starts is a reference image, and an image where the arrow ends is an image predicted by using the reference image.

In particular, in the decoding order of the multilayer prediction structure 40, images are horizontally arranged according to a prediction (reconstruction) order of each image. That is, images located relatively on the left are predicted (reconstructed) relatively earlier, and images located relatively on the right are predicted (reconstructed) relatively later. As subsequent images are predicted (reconstructed) by referring to images reconstructed relatively earlier, arrows, which indicate a prediction direction, between images of the same layer in the decoding order of the multilayer prediction structure 40 are all in a direction from the images relatively on the left to the images relatively on the right.

A prediction result of the base layer images may be encoded and then output as a base layer image stream. Also, a prediction encoding result of the first enhancement layer images may be output as a first enhancement layer stream, and a prediction encoding result of the second enhancement layer images may be output as a second enhancement layer stream.

Only inter-prediction is performed on the base layer images. In other words, the anchor pictures 41 through 45 of an I-type are not predicted by referring to other images, but images of B- and b-types are predicted by referring to other base layer images. Images of a B-type are predicted by referring to an anchor picture of an I-type, which precedes the images of a B-type according to a POC value, and a following anchor picture of an I-type. Images of a b-type are predicted by referring to an anchor picture of an I-type, which precedes the image of a b-picture type according a POC value, and a following image of a B-type, or by referring to an image of a B-type, which precedes the images of a b-picture type according to a POC value, and a following anchor picture of an I-type.

Interlayer prediction that refers to base layer images, and inter prediction that refers to images of the same viewpoint are performed on the first and second enhancement layer images.

Like the base layer images, inter prediction is performed on the first enhancement layer images and inter prediction is performed on the second enhancement layer images. The first and second enhancement layer anchor pictures 141 through 145 and 241 through 245 of the first and second enhancement layer images do not refer to images of the same layer, but the remaining images are predicted by referring to the images of the same layer.

However, the first and second enhancement layer anchor pictures 141 through 145 and 241 through 245 of the first and second enhancement layer images are also images of a P-type, which refer to the base layer anchor pictures 41 through 45 having the same POC value.

Since not only inter prediction, but also interlayer prediction that refers to base layer images having the same POC may be performed on the first and second enhancement layer images excluding the first and second enhancement layer anchor pictures 141 through 145 and 241 through 245, the first and second enhancement layer images excluding the first and second enhancement layer anchor pictures 141 through 145 and 241 through 245 are images of a B- or b-type.

Reconstruction processes for reproducing images are similar to prediction processes. However, each image may be reconstructed by using a reconstructed reference image only after a reference image of each image is reconstructed.

First, the base layer images may be reconstructed via inter-motion compensation. When the base layer anchor pictures 41 through 45 of an I-type are reconstructed, base layer images of a B-type may be reconstructed via inter-motion compensation that refers to the base layer anchor pictures 41 through 45. Also, base layer images of a b-type may be reconstructed via inter-motion compensation that refers to base layer reconstructed images of an I- or B-type.

The first and second enhancement layer images are respectively encoded via interlayer prediction that refers to the base layer images and inter prediction that refers to the images of the same layer.

In other words, for a reconstruction process of a first enhancement layer image, the first enhancement layer images may be reconstructed via interlayer disparity compensation that refers to base layer images reconstructed after reference images of a base viewpoint are reconstructed. Also, after a reference image of a first enhancement layer is reconstructed, the first enhancement layer images may be reconstructed via motion compensation that refers to the reconstructed reference image of the first enhancement layer.

Also, after the reference image of the base viewpoint is reconstructed, the second enhancement layer images may be reconstructed via interlayer disparity compensation that refers to the reference image of the base viewpoint. After a reference image of a second enhancement layer is reconstructed, the second enhancement layer images may be reconstructed via motion compensation that refers to the reconstructed reference image of the second enhancement layer.

Figure 4B:
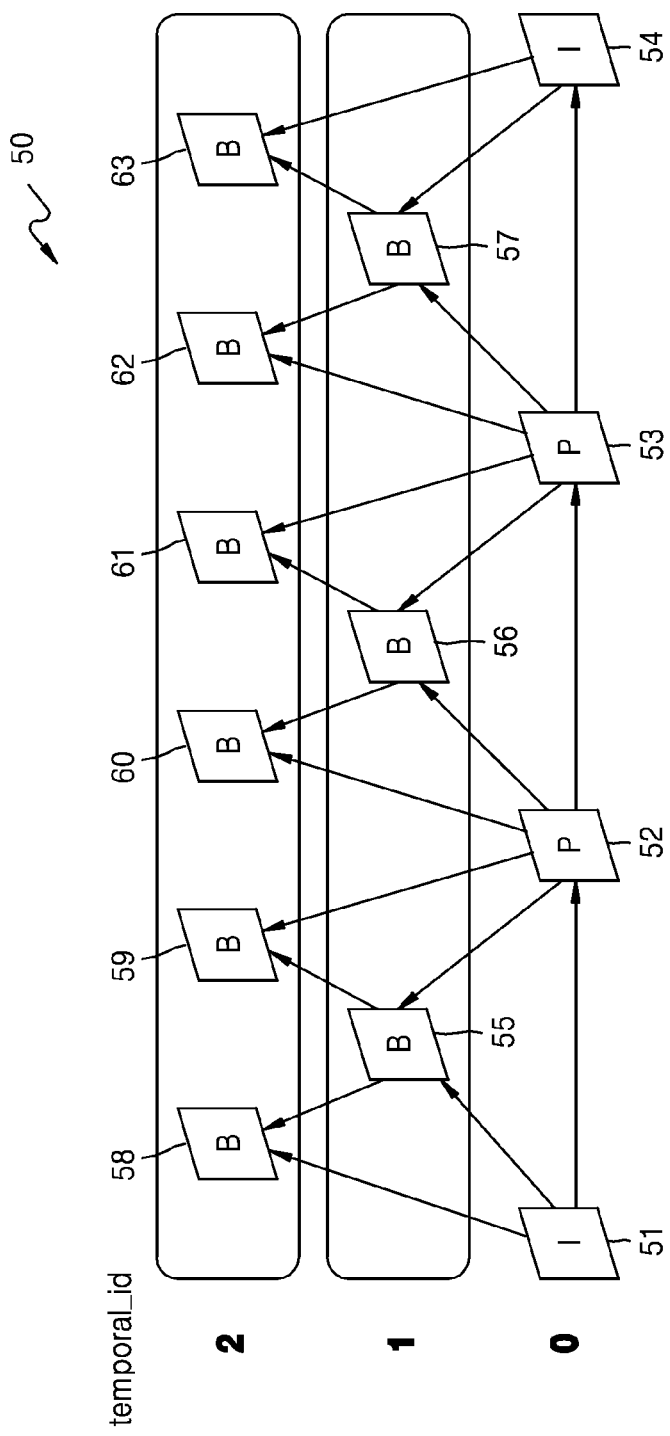
FIG. 4B is a diagram of a multilayer prediction structure according to a temporal hierarchical encoding and decoding method.

FIG. 4B is a diagram of a multilayer prediction structure according to a temporal hierarchical encoding and decoding method.

A scalable video coding method may be performed according to a temporal hierarchical prediction structure 40. The temporal hierarchical prediction structure 40 includes a prediction structure of hierarchical B type images 55, 56, 57, 58, 59, 60, 61, 62, and 63. In a level 0 prediction structure, inter prediction of I type images 51 and 54 and inter prediction of P type images 52 and 53 are performed. In a level 1 prediction structure, inter prediction of B type images 55, 56, and 57 referring to the I and P type images 51, 52, 53, and 54 is performed. In a level 2 prediction structure, inter prediction where the I and P type images 51, 52, 53, and 54 and the B type images 55, 56, and 57 of level 1 are referred to is performed.

'temporal_id' is a number for identifying a prediction level, and a frame rate may increase as respective images are output. For example, level 0 images 51, 52, 53, and 54 may be decoded and output at a frame rate of 15 Hz, and even level 1 images 55, 56, and 57 are decoded and output, the frame rate increases to 30 Hz, and even level 2 images 58, 59, 60, 61, 62, and 63 are further decoded and output, the frame rate may increase to 60 Hz.

According to an exemplary embodiment, when the temporal hierarchical prediction structure 50 is implemented using a SVC method, the level 0 images are encoded as basic layer images, and the level 1 images may be encoded as first enhancement layer images, and the level 2 images may be encoded as second enhancement layer images.

During a decoding process of a multilayer prediction structure of FIGS. 4A and 4B, in order to reconstruct images via motion compensation or interlayer decoding, pre-reconstructed base layer images may be used or pre-reconstructed enhancement layer images may be used. However, when a layer switching occurs or a random access request is generated, an image preceding a current RAP image in a decoding order may not be pre-reconstructed. In this case, images predicted by referring to the image preceding the current RAP image in a decoding order are unable to be reconstructed.

Hereinafter, decoding operations performed when a random access request is generated according to types of an RAP image will be described with reference to FIGS. 5A through 7B.

Figure 5B:
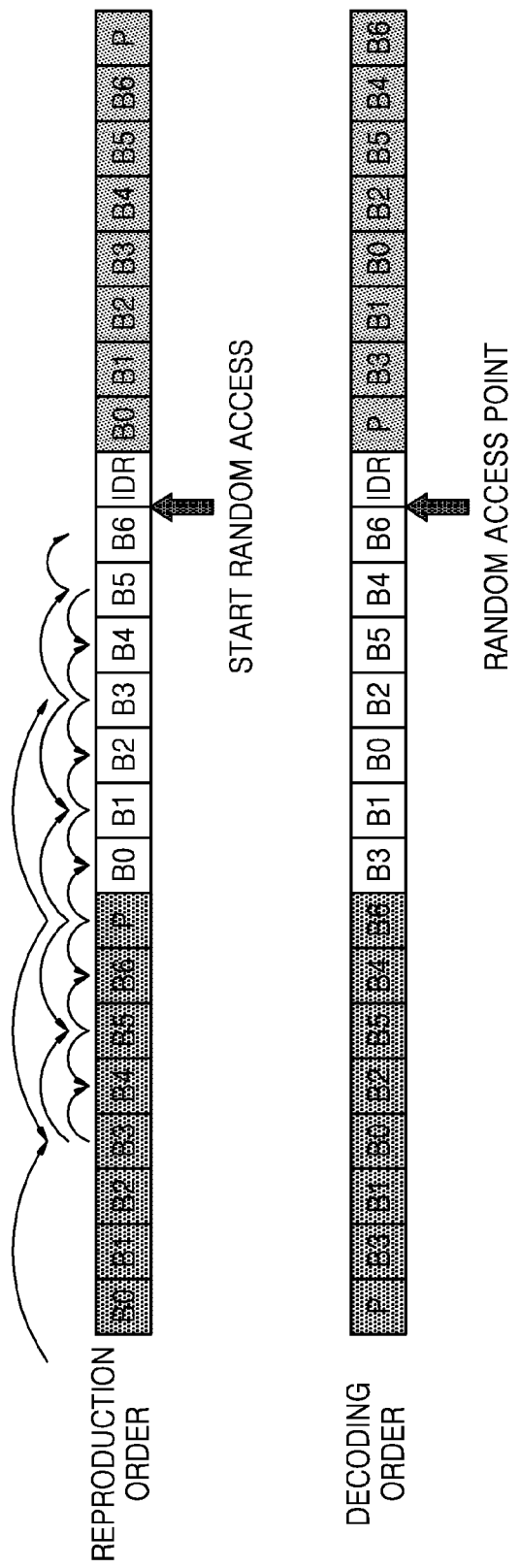

FIGS. 5A and 5B illustrate a reproduction order and a decoding order of an IDR image according to two embodiments.

In FIG. 5A, a size of each of GOPs 505, 515, and 525 is 8. B0 through B6 indicate identification numbers of B-type images in the same GOP arranged according a reproduction order.

An IDR image is an image that is independently encoded. While decoding an IDR image, reconstructed images may all be displayed as "unused for reference". Images following an IDR image in a decoding order may be reconstructed without having to perform inter prediction that uses images preceding the IDR image in a reconstructing order. A picture type of the first image of an encoded video sequence according to a decoding order is an IDR picture.

For example, B-type images of the GOP 515 may precede an IDR image in a reproduction order but follow the IDR image in a decoding order. Also, the B-type images of the GOP 515 do not refer to other images preceding the IDR image in a decoding order. B-type images of the GOP 525 following the IDR image in a decoding order and a reproduction order, and do not refer to other images preceding the IDR image in a decoding order.

When a random access occurs, images preceding a random access in a decoding order point are unable to be reconstructed. In FIG. 5A, the B-type images of the GOP 515 preceding the IDR image in a decoding order, but may be reconstructed by referring to the IDR image that is pre-reconstructed. In this case, since the B-type images of the GOP 515 may be all decoded and output, the B-type images of the GOP 515 may be RADL images. Accordingly, the B-type images of the GOP 515 may all be reproduced, and thus the random access point and a point where random access reproduction starts may match each other.

In FIG. 5B, since the B-type images of the GOP 515 are not required to be decoded based on a reproduction order from the random access point, the B-type images of the GOP 525 are reproduced as the random access starts from the IDR image.

When the IDR image is used, all images according to a reproduction order may be naturally reconstructed without a lost image from the random access point, but encoding efficiency may be decreased.

Figure 6A:
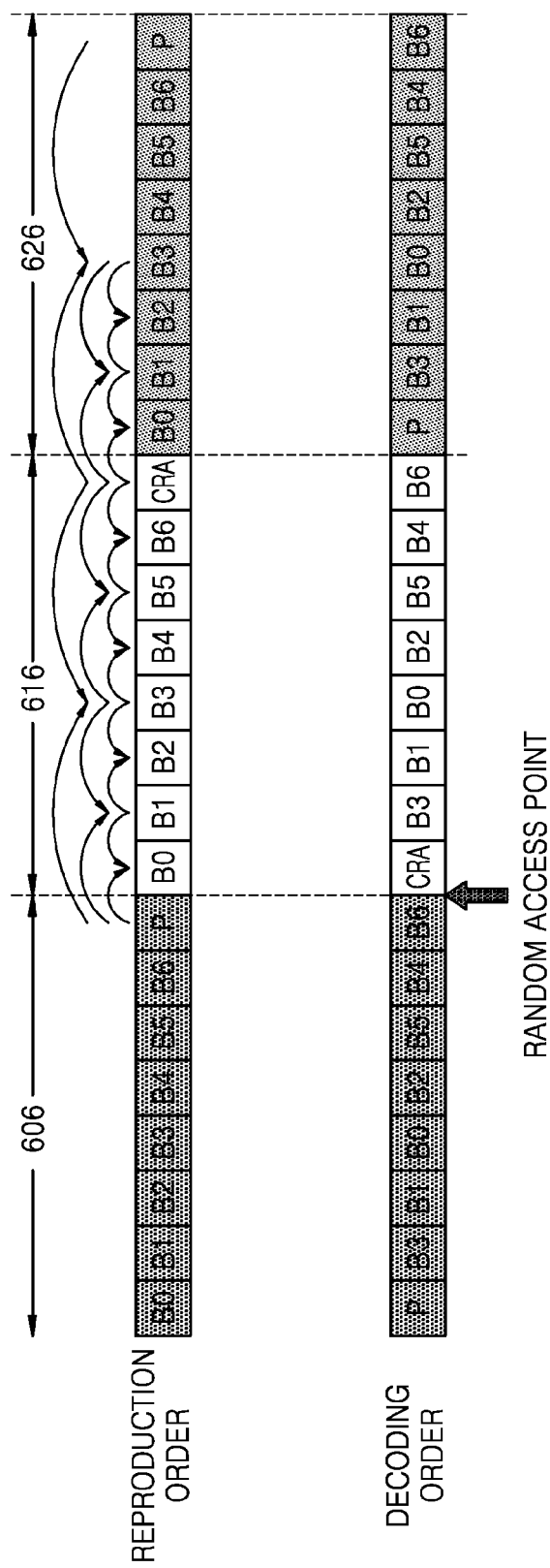
FIGS. 6A and 6B illustrate a reproduction order and a decoding order of a CRA (Clear Random Access) image according to two embodiments.
Figure 6B:
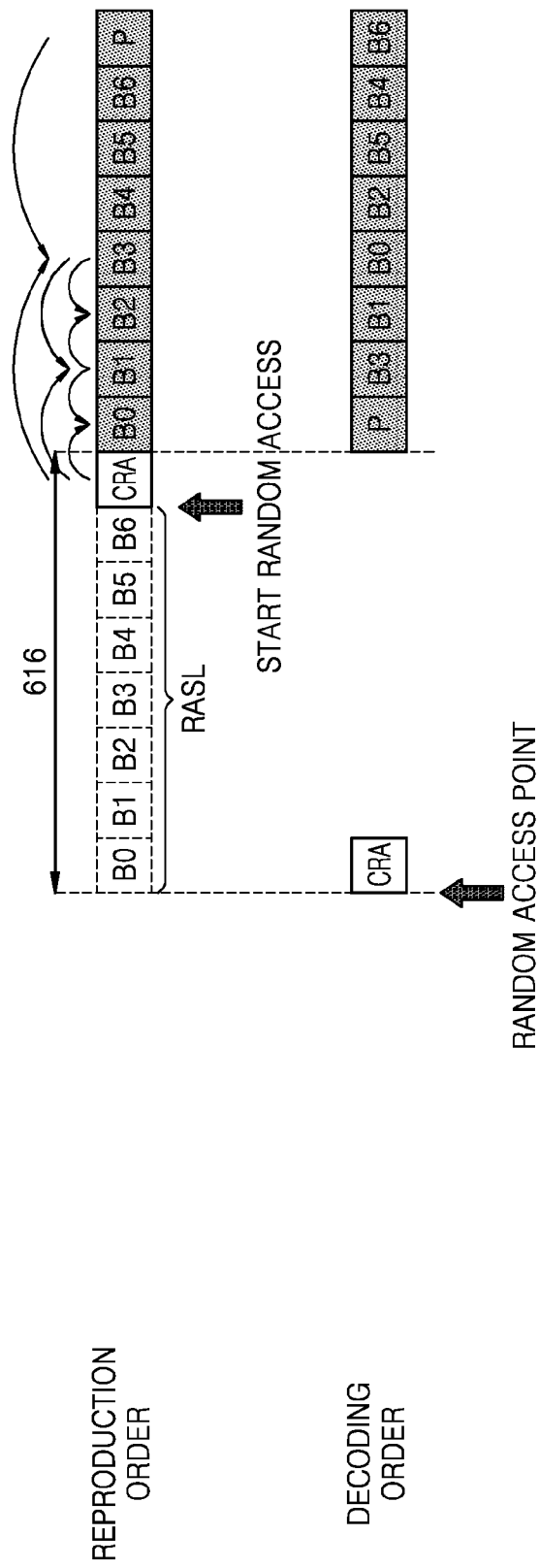

FIGS. 6A and 6B illustrate a reproduction order and a decoding order of a CRA image according to two embodiments.

A CRA image is an image including only I-type slices. While decoding a CRA image, reconstructed images stored in a decoded picture buffer (DPB) may be displayed as "unused for reference." Images subsequent to a CRA image in a decoding order and a reproduction order may be reconstructed without having to perform inter prediction that uses images preceding an IDR image in a decoding order and a reproduction order. An image preceding a CRA image in a decoding order also precedes the CRA image in a reproduction order.

An image following a CRA image in a decoding order and a reproduction order may be a normal picture. Thus, a normal picture may use at least one image from among other normal pictures in the same GOP as the CRA image.

A CRA picture may be the first image of an encoded video sequence according to a decoding order. However, the CRA picture may be positioned in the middle of a bitstream according to general reproduction in which a random access does not occur.

For example, in FIG. 6A, B-type images of a GOP 615 precedes a CRA image in a reproduction order but follows a CRA image in a decoding order. B-type images of a GOP 625 are normal pictures following the CRA image in a decoding order and a reproduction order, and do not refer to other images preceding an IDR image in a decoding order. However, some of the B-type images of the GOP 615 may refer to other images preceding the CRA image in a decoding order.

At a random access point of FIG. 6B, the B-type images of the GOP 615 are unable to be reconstructed as they refer to an image before a random access point. The B-type images of the GOP 615 are RASL images that are skipped during a reconstruction process. Accordingly, the B-type images of the GOP 625 may be immediately reconstructed and reproduced as random access reproduction starts from the CRA image.

Figure 7A:
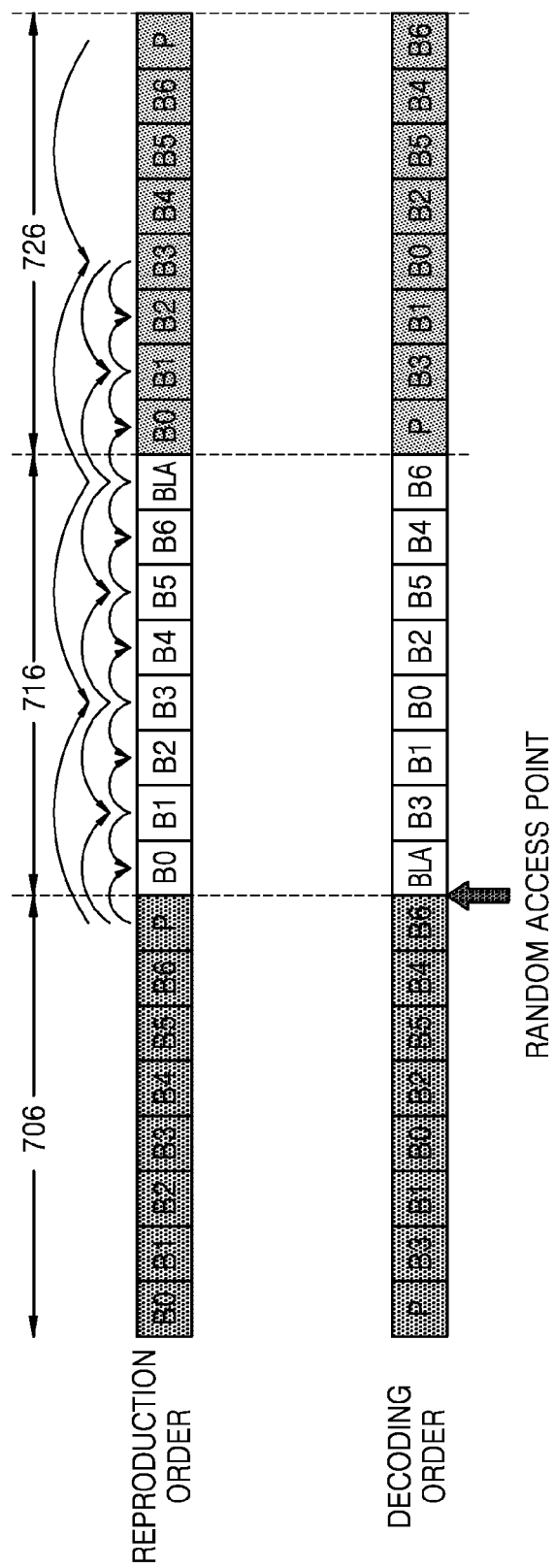
FIGS. 7A and 7B illustrate a reproduction order and a decoding order of a BLA (Broken Link Access) image according to two embodiments.
Figure 7B:
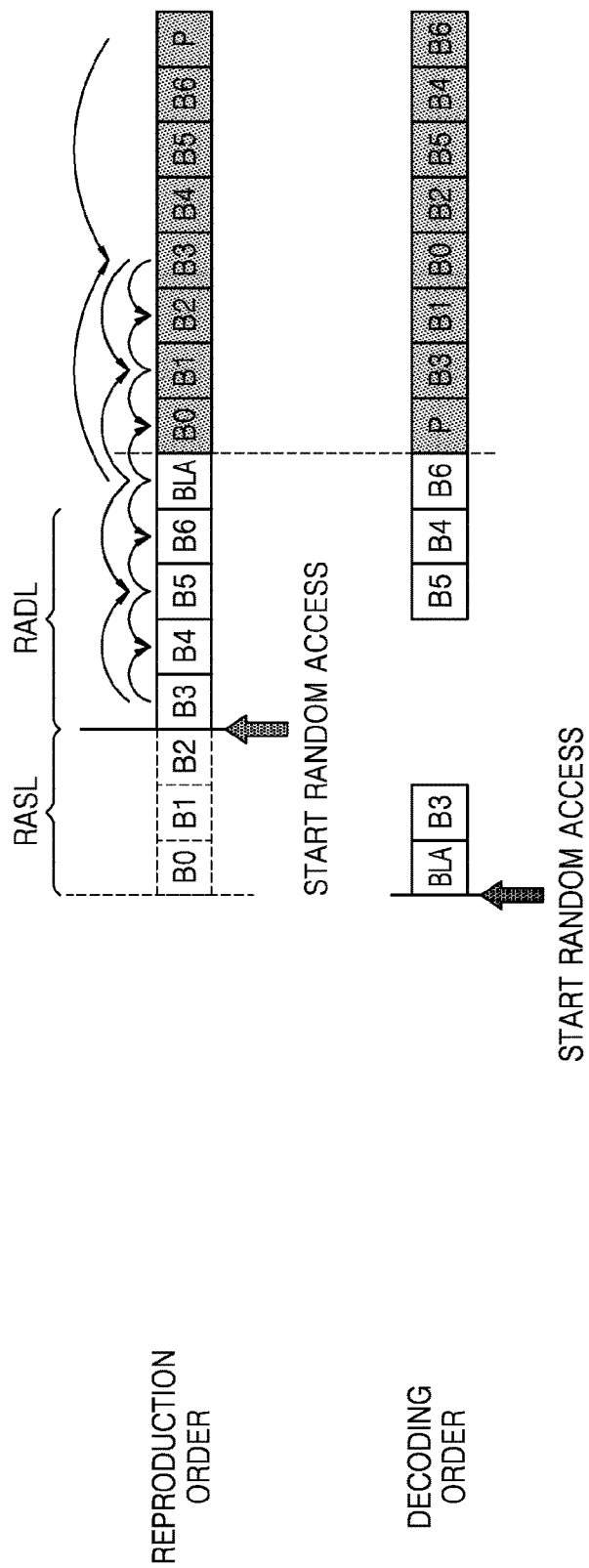

FIGS. 7A and 7B illustrate a reproduction order and a decoding order of a BLA image according to two embodiments.

Bitstream slicing is an operation of connecting another bitstream to a location of an RAP image of a current bitstream. A point where the other bitstream is connected is referred to as a 'broken link'. A NAL unit type of the RAP image at the location capable of bitstream slicing is indicated as a BLA image.

For example, referring to FIG. 7A, a BLA image has a reproduction order and a decoding order similar to those of a CRA image. The BLA image follows B-type images of a GOP 716, which are leading pictures, in a reproduction order. The BLA image precedes B-type images of a GOP 726, which are normal pictures, in a reproduction order. The leading pictures and the normal pictures follow the BLA image in a decoding order.

B3 through B6 from among the leading pictures are RASL images that refer to the BLA image and other images of the GOP 716. However, B0 through B2 from among the leading pictures are RADL images that refer to images of a GOP 706 that precede the BLA image in a decoding order.

Accordingly, when a random access occurs in the BLA image in FIG. 7B, B0 through B2 that are RASL images may be skipped from reconstruction, and B3 through B6 that are RADL images may be reconstructed. Accordingly, the RADL images may be output from B3 according to a reproduction order.

Since a temporal hierarchical change or layer switching occurs in the hierarchical prediction structure described above with reference to FIG. 4B, a TSA image may be used as a location where a layer switching is possible. A TSA image is similar to a CRA image. A layer switching that reconstructs upper layer images from a TSA image while reconstructing lower layer images is possible. For example, a layer having a lower value of 'temporal_id' is a lower layer. Images following a TLA image in a decoding order on the same layer or upper layer images of the TLA image are unable to refer to images of the same or upper layer of a previous TLA image preceding the TLA image in a decoding order. Since the TLA image is not a lowermost layer image, 'temporal_id' of the TLA image is not 0.

Hereinabove, RAP types for random access are described with reference to FIGS. 4B through 7B. When a random access request is generated or a layer switching occurs while reconstructing a video stream in a single layer, images may be reconstructed from an RAP image. However, when a random access occurs in a certain layer of a multilayer and images of the certain layer are reconstructed, images of other layers, which correspond to the images of the certain layer, need to be accurately reconstructed. Also, when a layer switching occurs or a random access request is generated in a certain layer, but an image to be referred to does not exist in a DPB and thus reconstruction of an RASL image is skipped, reconstruction of images of other layers, which correspond to the RASL image, may also be skipped.

Accordingly, the multilayer video encoding apparatus 10 according to an exemplary embodiment may arrange an RAP image of the same NAL unit type at a random access point or a layer switching point according to layers, and may also arrange RASL or RSDL images on the same location according to layers. Also, the multilayer video decoding apparatus 20 may reconstruct the RPA image of the same NAL unit type at the random access point or the layer switching point according to layers. Also, the multilayer video decoding apparatus 20 may reconstruct the RSDL images at the same location according to layers, and reconstruct the RASL images. When a random access occurs in a certain layer, the RPA images and the RSDL images at the same location may be reconstructed according to layers, and reconstruction of the RASL images at the same location may be skipped.

For example, an enhancement layer IDR image at a location corresponding to a base layer IDR image may be reconstructed. An enhancement layer CRA image at a location corresponding to a base layer CRA image may also be reconstructed. An enhancement layer BLA image at a location corresponding to a base layer BLA image may also be reconstructed.

Alternatively, the multilayer video encoding apparatus 10 may arrange a CRA image, an RSDL/RASL image, or a normal picture of an enhancement layer corresponding to a base layer normal picture. The multilayer video decoding apparatus 20 according to an exemplary embodiment may reconstruct the CRA image, the RSDL/RASL image, or the normal picture of the enhancement layer corresponding to the base layer normal picture.

Also, temporal hierarchical numbers of enhancement layer images are higher than temporal hierarchical numbers, i.e., 'temporal_id', of base layer images.

According to the multilayer video encoding apparatus 10 and the multilayer video decoding apparatus 20 according to an exemplary embodiment, even when a random access or a layer switching occurs in a multilayer prediction structure, images at the same location may be reconstructed or ignored according to layers. Accordingly, a reference image for interlayer prediction may be obtained, and output images of each layer may be accurately aligned.

The multilayer video encoding apparatus 10 of FIG. 1A may generate samples by performing intra prediction, inter prediction, interlayer prediction, transformation, and quantization according to image blocks, and output a bitstream by performing entropy-encoding on the samples. In order to output a video encoding result, i.e., a base layer image stream and an enhancement layer image stream, the multilayer video encoding apparatus 10 according to an exemplary embodiment may operate in cooperation with an internal video encoding processor installed therein or an external video encoding processor so as to perform video encoding operations including transformation and quantization. The internal video encoding processor of the multilayer video encoding apparatus 10 according to an exemplary embodiment may be a separate processor, or alternatively, a video encoding apparatus, a central processing apparatus, or a graphic processing apparatus may include a video encoding processing module to perform the video encoding operations.

Also, the multilayer video decoding apparatus 20 of FIG. 2A decodes a received base layer image stream and a received enhancement layer image stream. In other words, inverse quantization, inverse transformation, intra prediction, and motion compensation (inter-motion compensation and interlayer disparity compensation) are performed according to image blocks with respect to the base layer image stream and the enhancement layer image stream to reconstruct samples of base layer images from the base layer image stream and samples of enhancement layer images from the enhancement layer image stream. In order to output a reconstructed image generated as a decoding result, the multilayer video decoding apparatus 20 according to an exemplary embodiment may operate in cooperation with an internal video decoding processor installed therein or an external video decoding processor so as to perform video reconstruction operations including inverse quantization, inverse transformation, and prediction/compensation. The internal video decoding processor of the multilayer video decoding apparatus 20 according to an exemplary embodiment may be a separate processor, or alternatively, a video decoding apparatus, a central processing apparatus, or a graphic processing apparatus may include a video decoding processing module to perform the video reconstruction operations.

As described above, the multilayer video encoding apparatus 10 according to an exemplary embodiment and the multilayer video decoding apparatus 20 according to an exemplary embodiment may spilt blocks of video data into coding units according to a tree structure, and coding units, prediction units, and transformation units may be used for interlayer prediction or inter prediction of coding units. Hereinafter, a video encoding method, a video encoding apparatus, a video decoding method, and a video decoding apparatus based on coding units according to a tree structure and transformation units will be described with reference to FIGS. 8 through 20.

In principle, during encoding and decoding processes for a multilayer video, encoding and decoding processes for base layer images and encoding and decoding processes for enhancement layer images are separately performed. In other words, when interlayer prediction is performed on a multilayer video, encoding and decoding results of single-layer videos may be mutually referred to, but separate encoding and decoding processes are performed according to single-layer videos.

Accordingly, since video encoding and decoding processes based on coding units according to a tree structure as described below with reference to FIGS. 8 through 20 are video encoding and decoding processes for processing a single-layer video, only inter prediction and motion compensation are performed. However, as described above with reference to FIGS. 1A through 7B, in order to encode and decode a multilayer video, interlayer prediction and interlayer compensation are performed on base layer images and enhancement layer images.

Figure 8:
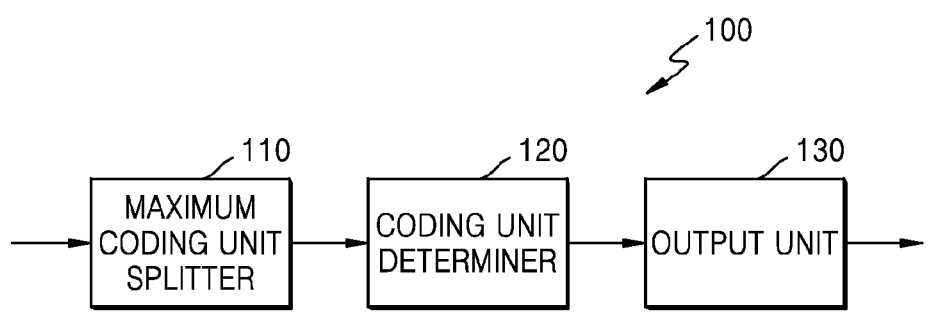
FIG. 8 is a block diagram of a video encoding apparatus based on coding units according to a tree structure, according to an exemplary embodiment.

Accordingly, in order for the multilayer video encoding apparatus 10 according to an exemplary embodiment to encode a multilayer video based on coding units according to a tree structure, the multilayer video encoding apparatus 10 according to an exemplary embodiment may include as many video encoding apparatuses 100 of FIG. 8 as the number of layers of the multilayer video so as to perform video encoding according to each single-layer video, thereby controlling each video encoding apparatus 100 to encode an assigned single-layer video. Also, the multilayer video encoding apparatus 10 may perform inter-view prediction by using an encoding result of individual single viewpoints of each video encoding apparatus 100. Accordingly, the multilayer video encoding apparatus 10 may generate a base layer image stream and an enhancement layer image stream, which include encoding results according to layers. In an exemplary embodiment, the video encoding apparatus 100 and the individual elements therein may be implemented in hardware including a circuit.

Figure 9:
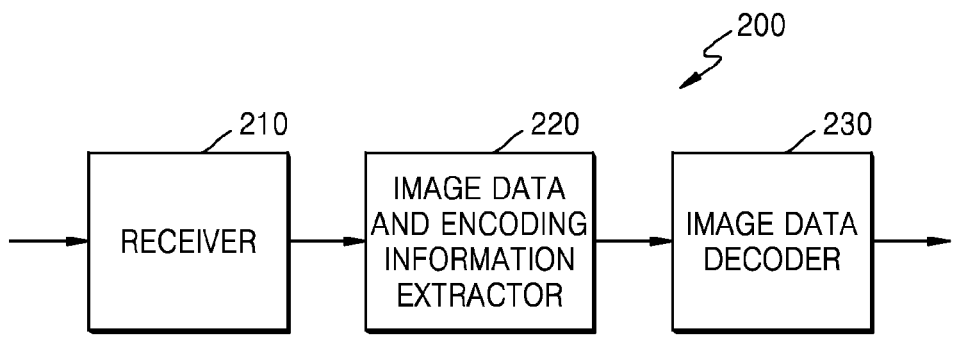
FIG. 9 is a block diagram of a video decoding apparatus based on coding units according to a tree structure, according to an exemplary embodiment.

Similarly, in order for the multilayer video decoding apparatus 20 according to an exemplary embodiment to decode a multilayer video based on coding units according to a tree structure, the multilayer video decoding apparatus 10 may include as many video decoding apparatuses 200 of FIG. 9 as the number of layers of the multilayer video so as to perform video decoding according to layers with respect to a received base layer image stream and a received enhancement layer image stream, thereby controlling each video decoding apparatus 200 to decode an assigned single-layer video. Also, the multilayer video decoding apparatus 200 may perform interlayer compensation by using a decoding result of individual single layer of each video decoding apparatus 200. Accordingly, the multilayer video decoding apparatus 20 may generate base layer images and enhancement layer images, which are reconstructed according to layers. In an exemplary embodiment, the multilayer video decoding apparatus 200 and the individual elements therein may be implemented in hardware including a circuit.

FIG. 8 is a block diagram of the video encoding apparatus 100 based on coding units according to a tree structure, according to an exemplary embodiment.

The video encoding apparatus 100 according to an exemplary embodiment involving video prediction based on coding units according to a tree structure includes a coding unit determiner 120 and an output unit 130. Hereinafter, for convenience of description, the video encoding apparatus 10 according to an exemplary embodiment involving video prediction based on coding units according to a tree structure will be abbreviated to the 'video encoding apparatus 100'.

The coding unit determiner 120 may split a current picture based on a maximum coding unit that is a coding unit having a maximum size for a current picture of an image. If the current picture is larger than the maximum coding unit, image data of the current picture may be split into the at least one maximum coding unit. The maximum coding unit according to an exemplary embodiment may be a data unit having a size of 32×32, 64×64, 128×128, 256×256, etc., wherein a shape of the data unit is a square having a width and length in squares of 2.

A coding unit according to an exemplary embodiment may be characterized by a maximum size and a depth. The depth denotes the number of times the coding unit is spatially split from the maximum coding unit, and as the depth deepens, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit deepens, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an exemplary embodiment is split according to depths, the image data of a spatial domain included in the maximum coding unit may be hierarchically classified according to depths.

A maximum depth and a maximum size of a coding unit, which limit the total number of times a height and a width of the maximum coding unit are hierarchically split, may be predetermined.

The coding unit determiner 120 encodes at least one split region obtained by splitting a region of the maximum coding unit according to depths, and determines a depth to output a finally encoded image data according to the at least one split region. In other words, the coding unit determiner 120 determines a coded depth by encoding the image data in the deeper coding units according to depths, according to the maximum coding unit of the current picture, and selecting a depth having the least encoding error. The determined coded depth and the encoded image data according to the determined coded depth are output to the output unit 130.

The image data in the maximum coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one coded depth may be selected for each maximum coding unit.

The size of the maximum coding unit is split as a coding unit is hierarchically split according to depths, and as the number of coding units increases. Also, even if coding units correspond to the same depth in one maximum coding unit, it is determined whether to split each of the coding units corresponding to the same depth to a lower depth by measuring an encoding error of the image data of the each coding unit, separately. Accordingly, even when image data is included in one maximum coding unit, the encoding errors may differ according to regions in the one maximum coding unit, and thus the coded depths may differ according to regions in the image data. Thus, one or more coded depths may be determined in one maximum coding unit, and the image data of the maximum coding unit may be divided according to coding units of at least one coded depth.

Accordingly, the coding unit determiner 120 according to an exemplary embodiment may determine coding units according to a tree structure included in the maximum coding unit. The 'coding units according to a tree structure' according to an exemplary embodiment include coding units corresponding to a depth determined to be the coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an exemplary embodiment is an index related to the number of splitting times from a maximum coding unit to a minimum coding unit. A first maximum depth according to an exemplary embodiment may denote the total number of splitting times from the maximum coding unit to the minimum coding unit. A second maximum depth according to an exemplary embodiment may denote the total number of depth levels from the maximum coding unit to the minimum coding unit. For example, when a depth of the maximum coding unit is 0, a depth of a coding unit, in which the maximum coding unit is split once, may be set to 1, and a depth of a coding unit, in which the maximum coding unit is split twice, may be set to 2. Here, if the minimum coding unit is a coding unit in which the maximum coding unit is split four times, depth levels of depths 0, 1, 2, 3, and 4 exist, and thus the first maximum depth may be set to 4, and the second maximum depth may be set to 5.

Prediction encoding and transformation may be performed according to the maximum coding unit. The prediction encoding and the transformation are also performed based on the deeper coding units according to a depth equal to or depths less than the maximum depth, according to the maximum coding unit.

Since the number of deeper coding units increases whenever the maximum coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a maximum coding unit.

The video encoding apparatus 100 according to an exemplary embodiment may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth according to an exemplary embodiment, i.e., based on a coding unit that is no longer split to coding units corresponding to a lower depth. Hereinafter, the coding unit that is no longer split and becomes a basis unit for prediction encoding will now be referred to as a 'prediction unit'. A partition obtained by splitting the prediction unit may include a prediction unit or a data unit obtained by splitting at least one of a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split, the coding unit becomes a prediction unit of 2N×2N, and a size of a partition may be 2N×2N, 2N×N, N×2N, or N×N. Examples of a partition type according to an exemplary embodiment include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 100 according to an exemplary embodiment may also perform the transformation on the image data in a coding unit based not only on the coding unit for encoding the image data, but also based on a data unit that is different from the coding unit. In order to perform the transformation in the coding unit, the transformation may be performed based on a transformation unit having a size smaller than or equal to the coding unit. For example, the transformation unit may include a data unit for an intra mode and a transformation unit for an inter mode.

The transformation unit in the coding unit may be recursively split into smaller sized regions in the similar manner as the coding unit according to the tree structure. Thus, residual data of the coding unit may be divided according to the transformation unit having the tree structure according to transformation depths.

A transformation depth indicating the number of splitting times to reach the transformation unit by splitting the height and width of the coding unit may also be set in the transformation unit according to an exemplary embodiment. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, the transformation unit having the tree structure may be set according to the transformation depths.

Encoding information according to coding units corresponding to a coded depth requires not only information about the coded depth, but also about information related to prediction and transformation. Accordingly, the coding unit determiner 120 not only determines a coded depth having a least encoding error, but also determines a partition type in a prediction unit, a prediction mode according to prediction units, and a size of a transformation unit for transformation.

Coding units according to a tree structure in a maximum coding unit and methods of determining a prediction unit/partition, and a transformation unit, according to embodiments, will be described in detail later with reference to FIGS. 10 through 20.

The coding unit determiner 120 may measure an encoding error of deeper coding units according to depths by using Rate-Distortion Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to depth may include information about the coded depth, about the partition type in the prediction unit, the prediction mode, and the size of the transformation unit.

The information about the coded depth may be defined by using splitting information according to depths, which indicates whether encoding is performed on coding units of a lower depth instead of a current depth. If the current depth of the current coding unit is the depth, image data in the current coding unit is encoded and output, and thus the splitting information may be defined not to split the current coding unit to a lower depth. On the contrary, if the current depth of the current coding unit is not the coded depth, the encoding is performed on the coding unit of the lower depth, and thus the splitting information of the current depth may be defined to split the current coding unit into the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units according to a tree structure are determined for one maximum coding unit, and information about at least one encoding mode is determined for a coding unit of a coded depth, information about at least one encoding mode may be determined for one maximum coding unit. Also, a coded depth of data of the maximum coding unit may be different according to locations since the data is hierarchically split according to depths, and thus information about a coded depth and an encoding mode may be set for the data.

Accordingly, the outputter 130 according to an exemplary embodiment may assign encoding information about a corresponding coded depth and a corresponding encoding mode to at least one of the coding unit, the prediction unit, and a minimum unit included in the maximum coding unit.

The minimum unit according to an exemplary embodiment is a square data unit obtained by splitting the minimum coding unit constituting the lowermost depth by 4. The minimum unit according to an exemplary embodiment may be a maximum square data unit that may be included in all of the coding units, prediction units, partition units, and transformation units included in the maximum coding unit.

For example, the encoding information output by the outputter 130 may be classified into encoding information according to deeper coding units, and encoding information according to prediction units. The encoding information according to the deeper coding units may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The outputter 130 may encode and output reference information related to prediction, prediction information, slice type information or the like.

In the video encoding apparatus 100 according to an exemplary embodiment, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, the coding unit with the current depth having a size of 2N×2N may include a maximum of 4 of the coding units with the lower depth.

Accordingly, the video encoding apparatus 100 may form the coding units having the tree structure by determining coding units having an optimum shape and an optimum size for each maximum coding unit, based on the size of the maximum coding unit and the maximum depth determined considering characteristics of the current picture. Also, since encoding may be performed on each maximum coding unit by using any one of various prediction modes and transformation methods, an optimum encoding mode may be determined considering characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to an exemplary embodiment, image compression efficiency may be increased since a coding unit is adjusted while considering characteristics of an image while increasing a maximum size of a coding unit while considering a size of the image.

The multilayer video encoding apparatus 10 described above with reference to FIG. 1A may include as many video encoding apparatuses 100 as the number of layers, in order to encode single-layer images according to layers of a multilayer video. For example, the base layer encoder 12 may include one video encoding apparatus 100 and the enhancement layer encoder 14 may include as many video encoding apparatuses 100 as the number of enhancement layers.

When the video encoding apparatus 100 encodes base layer images, the coding unit determiner 120 may determine, for each maximum coding unit, a prediction unit for inter-prediction according to coding units according to a tree structure, and perform inter-prediction according to prediction units.

Even when the video encoding apparatus 100 encodes enhancement layer images, the coding unit determiner 120 may determine, for each maximum coding unit, coding units and prediction units according to a tree structure, and perform inter-prediction according to prediction units.

When the coding unit determiner 120 encodes base layer images, RPA images that are randomly accessible may be assigned and intra prediction may be performed on base layer RPA images. When a random access or a layer switching occurs, an RPA image may be reconstructed even if a pre-reconstructed image does not exist.

When the coding unit determiner 120 encodes an enhancement layer stream, an RPA image of the same RPA type as a base layer RAP image at a location corresponding to an RPA image of a base layer stream may be encoded. The coding unit determiner 120 may perform intra prediction on enhancement layer RPA images.

The coding unit determiner 120 may perform inter prediction on a non-RPA image by referring to at least one of an RPA image and another non-RPA image. Enhancement layer images at locations corresponding to base layer RASL images are also RASL images, and may refer to a following RPA image and a preceding RPA image. Enhancement layer images at locations corresponding to RADL images of the base layer stream are also RADL images, and may refer to only a following RPA image. An enhancement layer image corresponding to a base layer normal picture may be encoded as a CRA image, an RADL/RASL image, or a normal picture.

FIG. 9 is a block diagram of the video decoding apparatus 200 based on coding units according to a tree structure, according to an exemplary embodiment.

The video decoding apparatus 200 according to an exemplary embodiment that involves video prediction based on coding units according to a tree structure includes a receiver 210, an image data and encoding information extractor 220, and an image data decoder 230. For convenience of description, the video decoding apparatus 200 according to an exemplary embodiment that involves video prediction based on coding units according to a tree structure will be abbreviated to the 'video decoding apparatus 200'.

Definitions of various terms, such as a coding unit, a depth, a prediction unit, a transformation unit, and information about various encoding modes, for decoding operations of the video decoding apparatus 200 according to an exemplary embodiment are identical to those described with reference to FIG. 8 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture, a sequence parameter set, or a picture parameter set.

Also, the image data and encoding information extractor 220 extracts information about a coded depth and an encoding mode for the coding units according to a tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coding unit corresponding to the coded depth, and information about an encoding mode corresponding to the coded depth may include information about a partition type of a corresponding coding unit, about a prediction mode, and a size of a transformation unit. Also, splitting information according to depths may be extracted as the information about the coded depth.

The information about the coded depth and the encoding mode according to each maximum coding unit extracted by the image data and encoding information extractor 220 is information about a coded depth and an encoding mode determined to generate a minimum encoding error when an encoder, such as the video encoding apparatus 100 according to an exemplary embodiment, repeatedly performs encoding for each deeper coding unit according to depths according to each maximum coding unit. Accordingly, the video decoding apparatus 200 may reconstruct an image by decoding data according to an encoding mode that generates the minimum encoding error.

Since encoding information according to an exemplary embodiment about the coded depth and the encoding mode may be assigned to a predetermined data unit from among a corresponding coding unit, a prediction unit, and a minimum unit, the image data and encoding information extractor 220 may extract the information about the coded depth and the encoding mode according to the predetermined data units. If information about a coded depth and an encoding mode of a corresponding maximum coding unit is recorded according to predetermined data units, the predetermined data units to which the same information about the coded depth and the encoding mode is assigned may be inferred to be the data units included in the same maximum coding unit.

The image data decoder 230 may reconstruct the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include a prediction including intra prediction and motion compensation, and an inverse transformation.

The image data decoder 230 may perform intra prediction or motion compensation according to a partition and a prediction mode of each coding unit, based on the information about the partition type and the prediction mode of the prediction unit of the coding unit according to coded depths.

In addition, the image data decoder 230 may read information about a transformation unit according to a tree structure for each coding unit so as to perform inverse transformation based on transformation units for each coding unit, for inverse transformation for each maximum coding unit. Via the inverse transformation, a pixel value of a spatial domain of the coding unit may be reconstructed.

The image data decoder 230 may determine a coded depth of a current maximum coding unit by using split information according to depths. If the split information indicates that image data is no longer split in the current depth, the current depth is a coded depth. Accordingly, the image data decoder 230 may decode image data in the current maximum coding unit by using the information about the partition type of the prediction unit, the prediction mode, and the size of the transformation unit for each coding unit corresponding to the current depth.

In other words, data units containing the encoding information including the same splitting information may be gathered by observing the encoding information set for the predetermined data unit from among the coding unit, the prediction unit, and the minimum unit, and the gathered data units may be considered to be one data unit to be decoded by the image data decoder 230 in the same encoding mode. As such, the current coding unit may be decoded by obtaining the information about the encoding mode for each coding unit.

The multilayer video encoding apparatus 10 described above with reference to FIG. 1A may include as many image data decoders 230 as the number of layers in the video decoding apparatus 200, so as to generate a reference image for inter prediction according to layers of a multilayer video. For example, the base layer encoder 12 may include one image data decoder 230, and the enhancement layer encoder 14 may include as many video decoding apparatuses 200 as the number of enhancement layers.

Also, the multilayer video decoding apparatus 20 described above with reference to FIGS. 2A and 3A may include the number of video decoding apparatuses 200 as many as the number of views, so as to reconstruct base layer images and enhancement layer images by decoding a received base layer image stream and a received enhancement layer image stream. For example, the base layer image decoder 22 may include one video decoding apparatus 200, and the enhancement layer decoder 24 may include video decoding apparatuses 200 as many as the number of enhancement layers.

When the base layer image stream is received, the image data decoder 230 of the video decoding apparatus 200 may split samples of base layer images extracted from the base layer image stream by the image data and encoding information extractor 220 into coding units according to a tree structure of a maximum coding unit. The image data decoder 230 may reconstruct the base layer images by performing motion compensation according to prediction units for inter prediction, on the coding units having the tree structure of the samples of the base layer images.

When the enhancement layer image stream is received, the image data decoder 230 of the video decoding apparatus 200 may split samples of enhancement layer images extracted from the enhancement layer image stream by the extractor 220 into coding units according to a tree structure. The image data decoder 230 may reconstruct the enhancement layer images by performing motion compensation according to prediction units for inter prediction, on the coding units of the samples of the enhancement layer images.

When the image data decoder 230 decodes a base layer stream, RPA images may be reconstructed based on an NAL unit type. When a random access or a layer switching occurs, an RPA image may be reconstructed even when a pre-reconstructed image does not exist.

When the image data decoder 230 decodes an enhancement layer stream, an RPA image of the same RPA type as a base layer RAP image at a location corresponding to an RPA image of a base layer stream may be reconstructed. The image data decoder 230 may perform intra prediction on enhancement layer RPA images.

The image data decoder 230 may perform motion compensation on a non-RPA image by referring to at least one of an RPA image and another non-RPA image. Enhancement layer images at locations corresponding to base layer RASL images are also RASL images, and may refer to a following RPA image and a preceding RPA image. Enhancement layer images at locations corresponding to RADL images of a base layer stream are also RADL images, and may refer to only a following RPA image. An enhancement layer image corresponding to a base layer normal picture may be reconstructed as a CRA image, an RADL/RASL image, or a normal picture.

Thus, the video decoding apparatus 200 may obtain information about at least one coding unit that generates the minimum encoding error when encoding is recursively performed for each maximum coding unit, and may use the information to decode the current picture. In other words, image data of the coding units having the tree structure determined to be the optimum coding units in each maximum coding unit may be decoded.

Accordingly, even if image data has high resolution and a large amount of data, the image data may be efficiently decoded and reconstructed by using a size of a coding unit and an encoding mode, which are adaptively determined according to characteristics of the image data, by using information about an optimum encoding mode received from an encoder.

Figure 10:
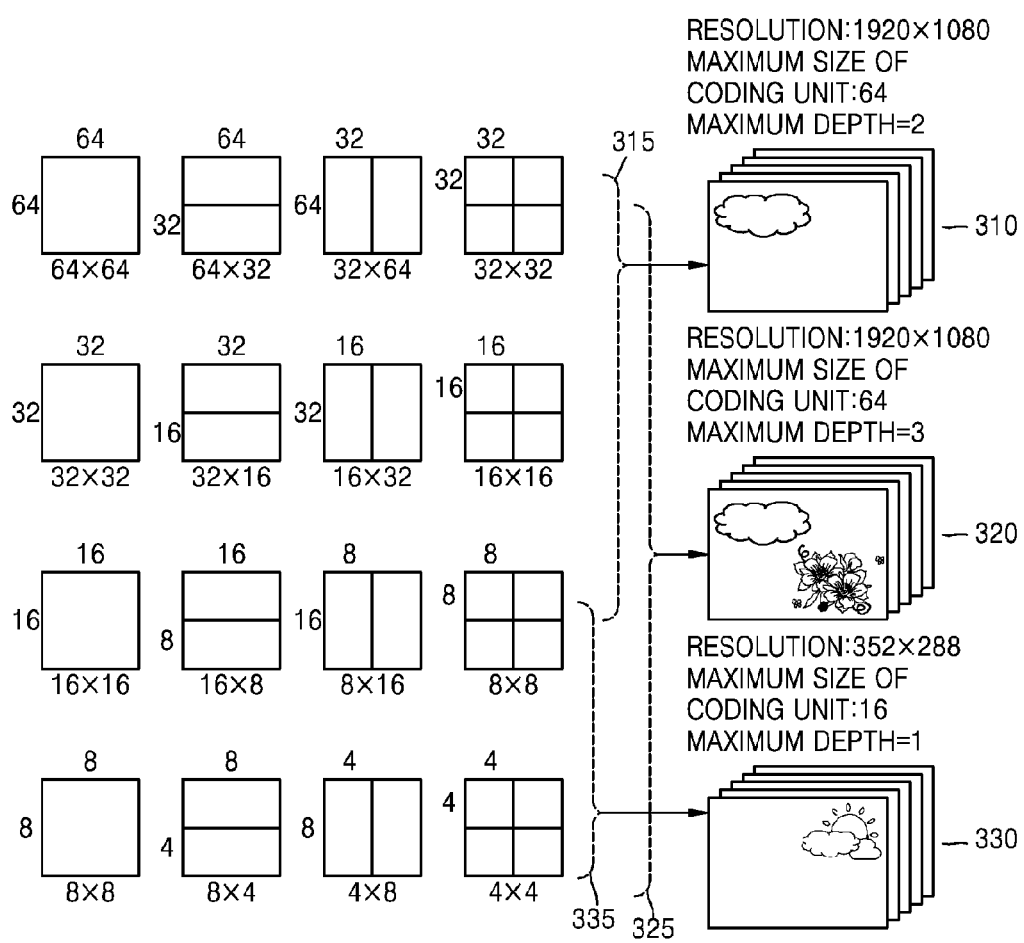
FIG. 10 is a diagram for describing a concept of coding units according to an exemplary embodiment.

FIG. 10 is a diagram for describing a concept of coding units according to an exemplary embodiment.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is 1920×1080, a maximum size of a coding unit is 64, and a maximum depth is 2. In video data 320, a resolution is 1920×1080, a maximum size of a coding unit is 64, and a maximum depth is 3. In video data 330, a resolution is 352×288, a maximum size of a coding unit is 16, and a maximum depth is 1. The maximum depth shown in FIG. 10 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having a higher resolution than the video data 330 may be 64.

Since the maximum depth of the video data 310 is 2, coding units 315 of the vide data 310 may include a maximum coding unit having a long axis size of 64, and coding units having long axis sizes of 32 and 16 since depths are deepened to two layers by splitting the maximum coding unit twice. Since the maximum depth of the video data 330 is 1, coding units 335 of the video data 330 may include a maximum coding unit having a long axis size of 16, and coding units having a long axis size of 8 since depths are deepened to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are deepened to 3 layers by splitting the maximum coding unit three times. As a depth deepens, detailed information may be precisely expressed.

Figure 11:
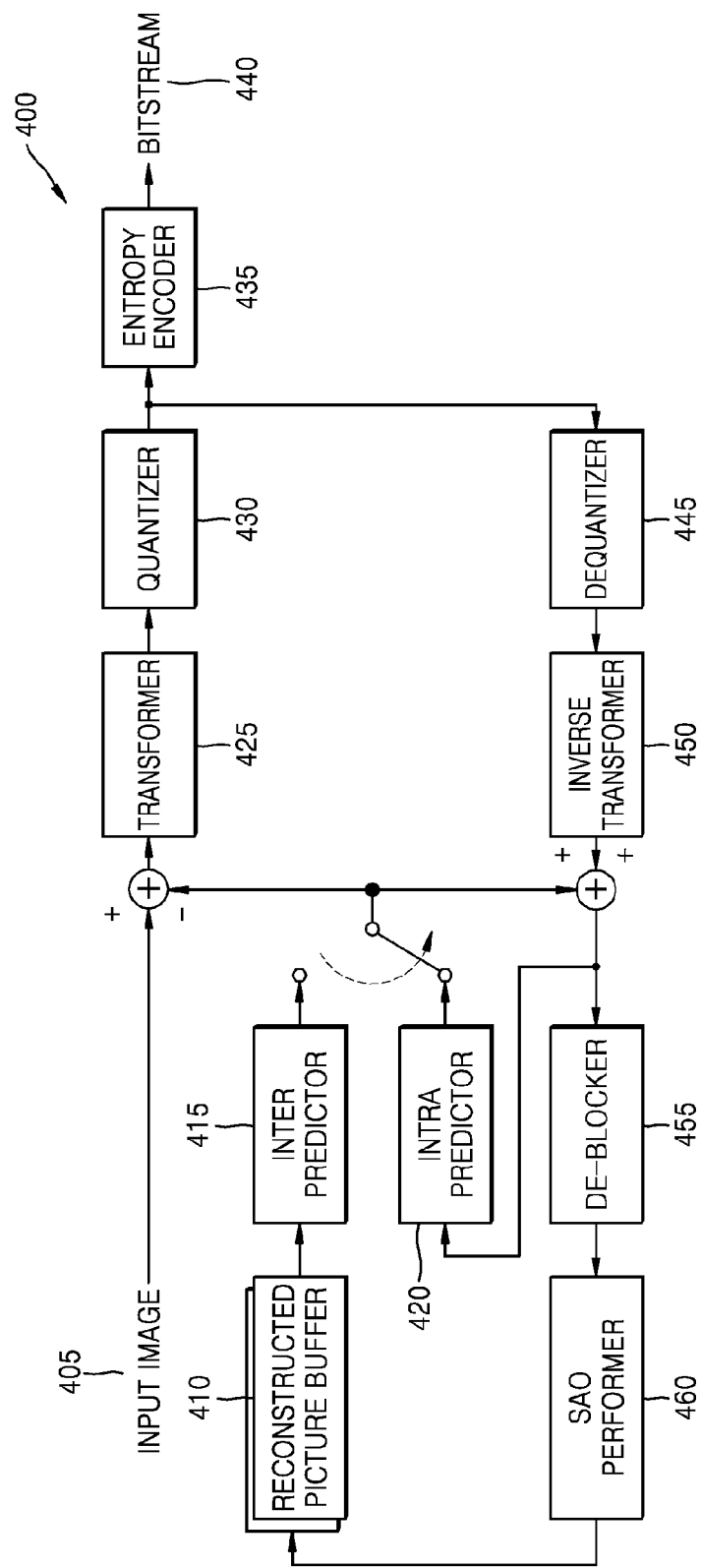
FIG. 11 is a block diagram of an image encoder based on coding units, according to an exemplary embodiment.

FIG. 11 is a block diagram of an image encoder 400 based on coding units, according to an exemplary embodiment. In an exemplary embodiment, the image encoder 400 and the individual elements therein maybe implemented in hardware including a circuit.

The image encoder 400 performs operations necessary for encoding image data in the coding unit determiner 120 of the video encoding apparatus 100. In other words, an intra predictor 420 performs intra prediction on coding units in an intra mode according to prediction units, from among a current frame 405, and an inter predictor 415 performs inter prediction on coding units in an inter mode by using a current image 405 and a reference image obtained from a reconstructed picture buffer 410 according to prediction units. The current image 405 may be split into maximum coding units and then the maximum coding units may be sequentially encoded. In this regard, the maximum coding units that are to be split into coding units according to a tree structure may be encoded.

Residue data is generated by removing prediction data regarding coding units of each mode that is output from the intra predictor 420 or the inter predictor 415 from data regarding encoded coding units of the current image 405, and is output as a quantized transformation coefficient according to transformation units through a transformer 425 and a quantizer 430. The quantized transformation coefficient is reconstructed as the residue data in a spatial domain through a dequantizer 445 and an inverse transformer 450. The reconstructed residue data in the spatial domain is added to prediction data for coding units of each mode that is output from the intra predictor 420 or the inter predictor and thus is reconstructed as data in a spatial domain for coding units of the current image 405. The reconstructed data in the spatial domain is generated as reconstructed images through a de-blocker 455 and an SAO performer 460. The generated reconstructed images are stored in the reconstructed picture buffer 410. The reconstructed images stored in the reconstructed picture buffer 410 may be used as reference images for inter prediction of another image. The transformation coefficient quantized by the transformer 425 and the quantizer 430 may be output as a bitstream 440 through an entropy encoder 435.

In order for the image encoder 400 to be applied in the video encoding apparatus 100, all elements of the image encoder 400, i.e., the inter predictor 415, the intra predictor 420, the transformer 425, the quantizer 430, the entropy encoder 435, the dequantizer 445, the inverse transformer 450, the de-blocker 455, and the SAO performer 460, perform operations based on each coding unit among coding units according to a tree structure according to each maximum coding unit.

Specifically, the intra predictor 420 and the inter predictor 415 may determine a partition mode and a prediction mode of each coding unit among the coding units having a tree structure in consideration of a maximum size and a maximum depth of a current maximum coding unit, and the transformer 425 may determine whether to split a transformation unit having a quad tree structure in each coding unit among the coding units having a tree structure.

Figure 12:
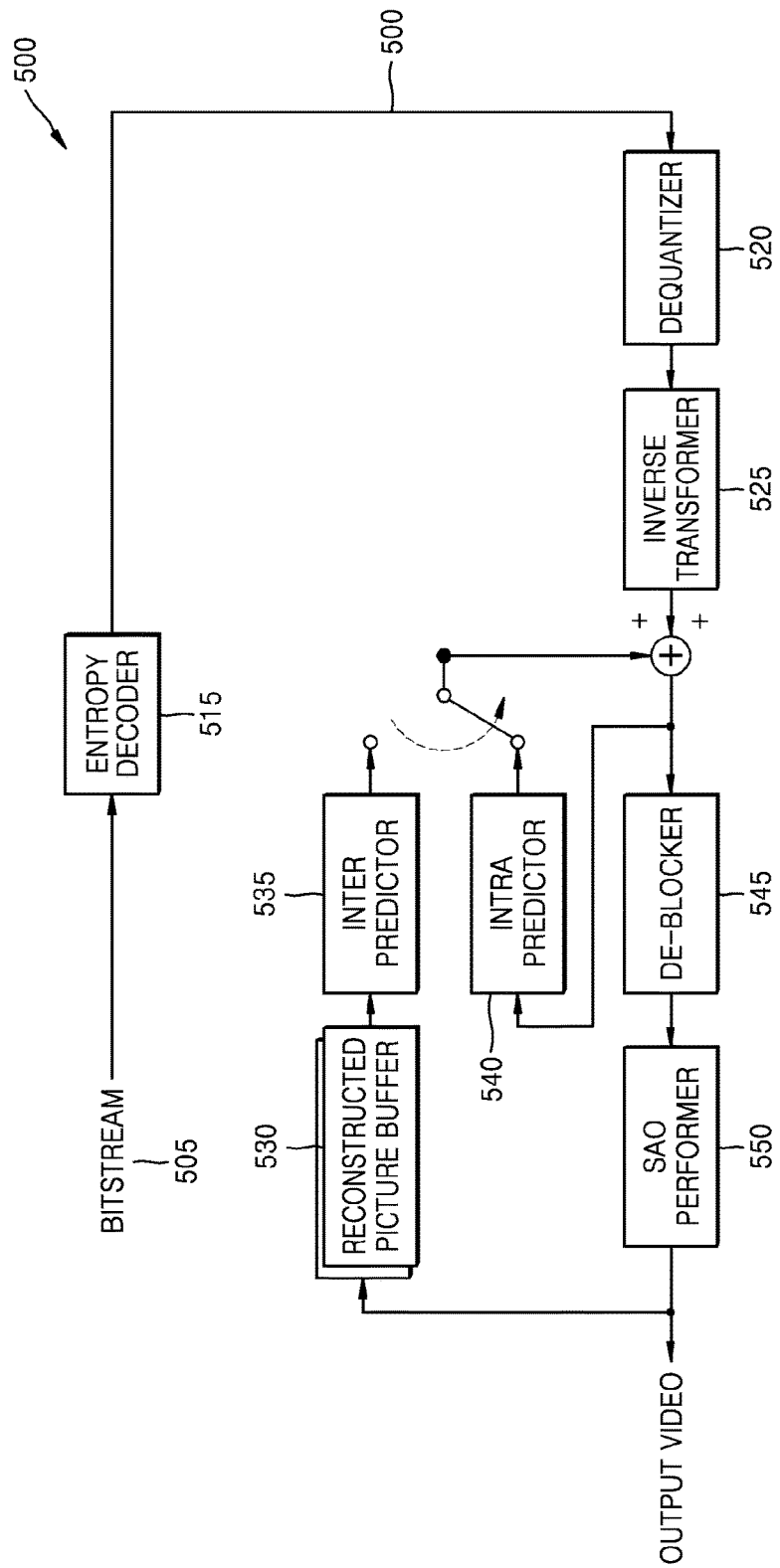
FIG. 12 is a block diagram of an image decoder based on coding units, according to an exemplary embodiment.

FIG. 12 is a block diagram of an image decoder 500 based on coding units, according to an exemplary embodiment. In an exemplary embodiment, the image decoder 500 and the individual elements therein maybe implemented in hardware including a circuit.

An entropy decoder 515 parses encoded image data to be decoded and information about encoding required for decoding from a bitstream 505. The encoded image data is a quantized transformation coefficient from which residue data is reconstructed by a dequantizer 520 and an inverse transformer 525.

An intra predictor 540 performs intra prediction on coding units in an intra mode according to each prediction unit. An inter predictor 535 performs inter prediction on coding units in an inter mode from among the current image 405 for each prediction unit by using a reference image obtained from a reconstructed picture buffer 530.

Prediction data and residue data regarding coding units of each mode, which passed through the intra predictor 540 or the inter predictor 535, are summed, and thus data in a spatial domain regarding coding units of the current image 405 may be reconstructed, and the reconstructed data in the spatial domain may be output as a reconstructed image 560 through a de-blocker 545 and an SAO performer 550. Reconstructed images stored in the reconstructed picture buffer 530 may be output as reference images.

In order to decode the image data in the image data decoder 230 of the video decoding apparatus 200, operations after the entropy decoder 515 of the image decoder 500 according to an exemplary embodiment may be performed.

In order for the image decoder 500 to be applied in the video decoding apparatus 200 according to an exemplary embodiment, elements of the image decoder 500, i.e., the entropy decoder 515, the dequantizer 520, the inverse transformer 525, the inter predictor 535, the de-blocker 545, and the SAO performer 550 may perform operations based on each of coding units according to a tree structure for each maximum coding unit.

In particular, the intra predictor 540 and the inter predictor 535 may determine a partition mode and a prediction mode for each of the coding units according to a tree structure, and the inverse transformer 525 may determine whether to split a transformation unit having a quad tree structure for each of the coding units.

The encoding operation of FIG. 11 and the decoding operation of FIG. 12 are respectively described as an encoding operation and a decoding operation on a video stream in a single layer. Thus, if the encoder 12 of FIG. 1A encodes a video stream of two or more layers, the image encoder 400 may be included for each layer. Similarly, if the decoder 26 of FIG. 2A decodes a video stream of two or more layers, the image decoder 500 may be included for each layer.

Figure 13:
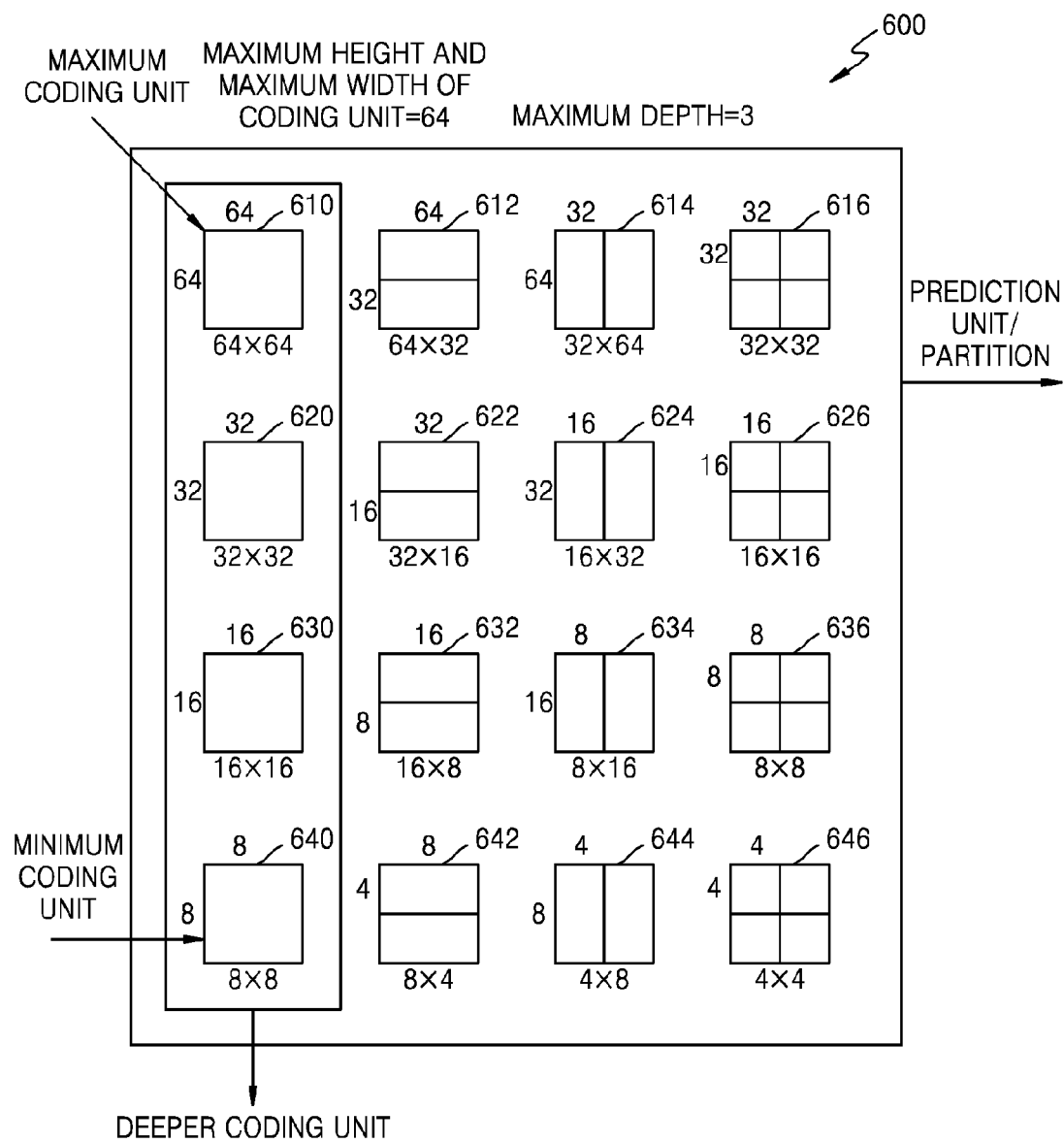
FIG. 13 is a diagram illustrating deeper coding units according to depths, and partitions, according to an exemplary embodiment.

FIG. 13 is a diagram illustrating deeper coding units according to depths, and partitions, according to an exemplary embodiment.

The video encoding apparatus 100 and the video decoding apparatus 200 use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the predetermined maximum size of the coding unit.

In a hierarchical structure 600 of coding units, according to an exemplary embodiment, the maximum height and the maximum width of the coding units are each 64, and the maximum depth is 3. In this case, the maximum depth refers to a total number of times the coding unit is split from a maximum coding unit to the minimum coding unit. Since a depth deepens along a vertical axis of the hierarchical structure 600, a height and a width of the deeper coding unit are each split. Also, a prediction unit and partitions, which are bases for prediction encoding of each deeper coding unit, are shown along a horizontal axis of the hierarchical structure 600.

In other words, a coding unit 610 is a maximum coding unit in the hierarchical structure 600, wherein a depth is 0 and a size, i.e., a height by width, is 64×64. The depth deepens along the vertical axis, and a coding unit 620 having a size of 32×32 and a depth of 1, a coding unit 630 having a size of 16×16 and a depth of 2, and a coding unit 640 having a size of 8×8 and a depth of 3. The coding unit 640 having a size of 8×8 and a depth of 3 is a minimum coding unit.

The prediction unit and the partitions of a coding unit are arranged along the horizontal axis according to each depth. In other words, if the coding unit 610 having a size of 64×64 and a depth of 0 is a prediction unit, the prediction unit may be split into partitions include in the encoding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

In order to determine a coded depth of the maximum coding unit 610, the coding unit determiner 120 of the video encoding apparatus 100 according to an exemplary embodiment performs encoding for each of coding units corresponding to each depth included in the maximum coding unit 610.

A number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 are each encoded.

In order to perform encoding for a current depth from among the depths, a least encoding error may be selected for the current depth by performing encoding for each prediction unit in the coding units corresponding to the current depth, along the horizontal axis of the hierarchical structure 600. Alternatively, the minimum encoding error may be searched for by comparing the least encoding errors according to depths, by performing encoding for each depth as the depth deepens along the vertical axis of the hierarchical structure 600. A depth and a partition having the minimum encoding error in the coding unit 610 may be selected as the coded depth and a partition type of the coding unit 610.

Figure 14:
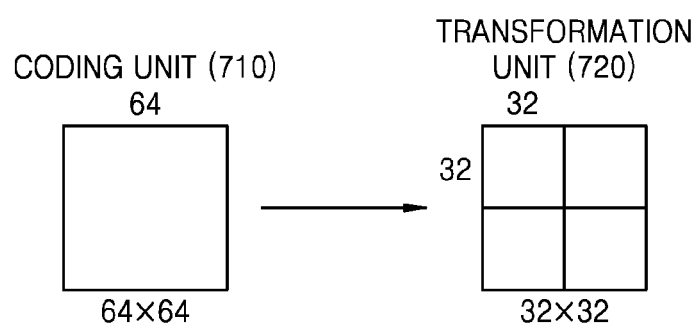
FIG. 14 is a diagram for describing a relationship between a coding unit and transformation units, according to an exemplary embodiment.

FIG. 14 is a diagram for describing a relationship between a coding unit and transformation units, according to an exemplary embodiment.

The video encoding apparatus 100 according to an exemplary embodiment or the video decoding apparatus 200 according to an exemplary embodiment encodes or decodes an image according to coding units having sizes smaller than or equal to a maximum coding unit for each maximum coding unit. Sizes of transformation units for transformation during encoding may be selected based on data units that are not larger than a corresponding coding unit.

For example, in the video encoding apparatus 100 according to an exemplary embodiment or the video decoding apparatus 200 according to an exemplary embodiment, if a size of the current coding unit 710 is 64×64, transformation may be performed by using the transformation units 720 having a size of 32×32.

Also, data of the coding unit 710 having the size of 64×64 may be encoded by performing the transformation on each of the transformation units having the size of 32×32, 16×16, 8×8, and 4×4, which are smaller than 64×64, and then a transformation unit having the least coding error with respect to the original may be selected.

Figure 15:
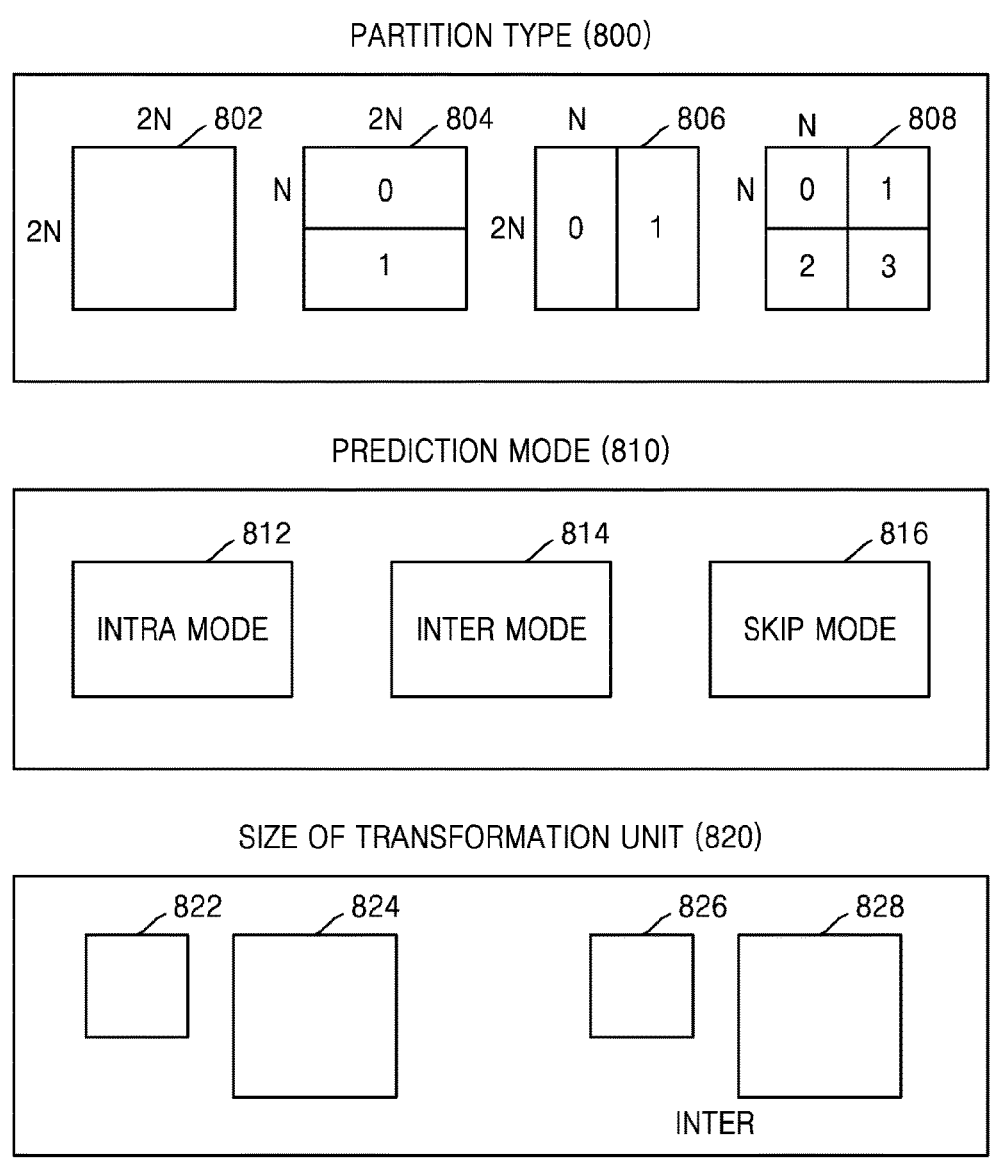
FIG. 15 is a diagram for describing encoding information according to depths, according to an exemplary embodiment.

FIG. 15 is a diagram for describing encoding information of coding units according to depths, according to an exemplary embodiment.

The outputter 130 of the video encoding apparatus 100 according to an exemplary embodiment may encode and transmit information 800 about a partition type, information 810 about a prediction mode, and information 820 about a size of a transformation unit for each coding unit corresponding to a coded depth, as information about an encoding mode.

The information 800 indicates information about a type of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about the partition type is set to indicate one of the partition 804 having a size of 2N×N, the partition 806 having a size of N×2N, and the partition 808 having a size of N×N.

The information 810 indicates a prediction mode of each partition. For example, the information 810 may indicate a mode of prediction encoding performed on a partition indicated by the information 800, i.e., an intra mode 812, an inter mode 814, or a skip mode 816.

The information 820 indicates a transformation unit to be based on when transformation is performed on a current coding unit. For example, the transformation unit may be a first intra transformation unit 822, a second intra transformation unit 824, a first inter transformation unit 826, or a second inter transformation unit 828.

The image data and encoding information extractor 210 of the video decoding apparatus 200 according to an exemplary embodiment may extract and use the information 800, 810, and 820 for decoding, according to each deeper coding unit.

Figure 16:
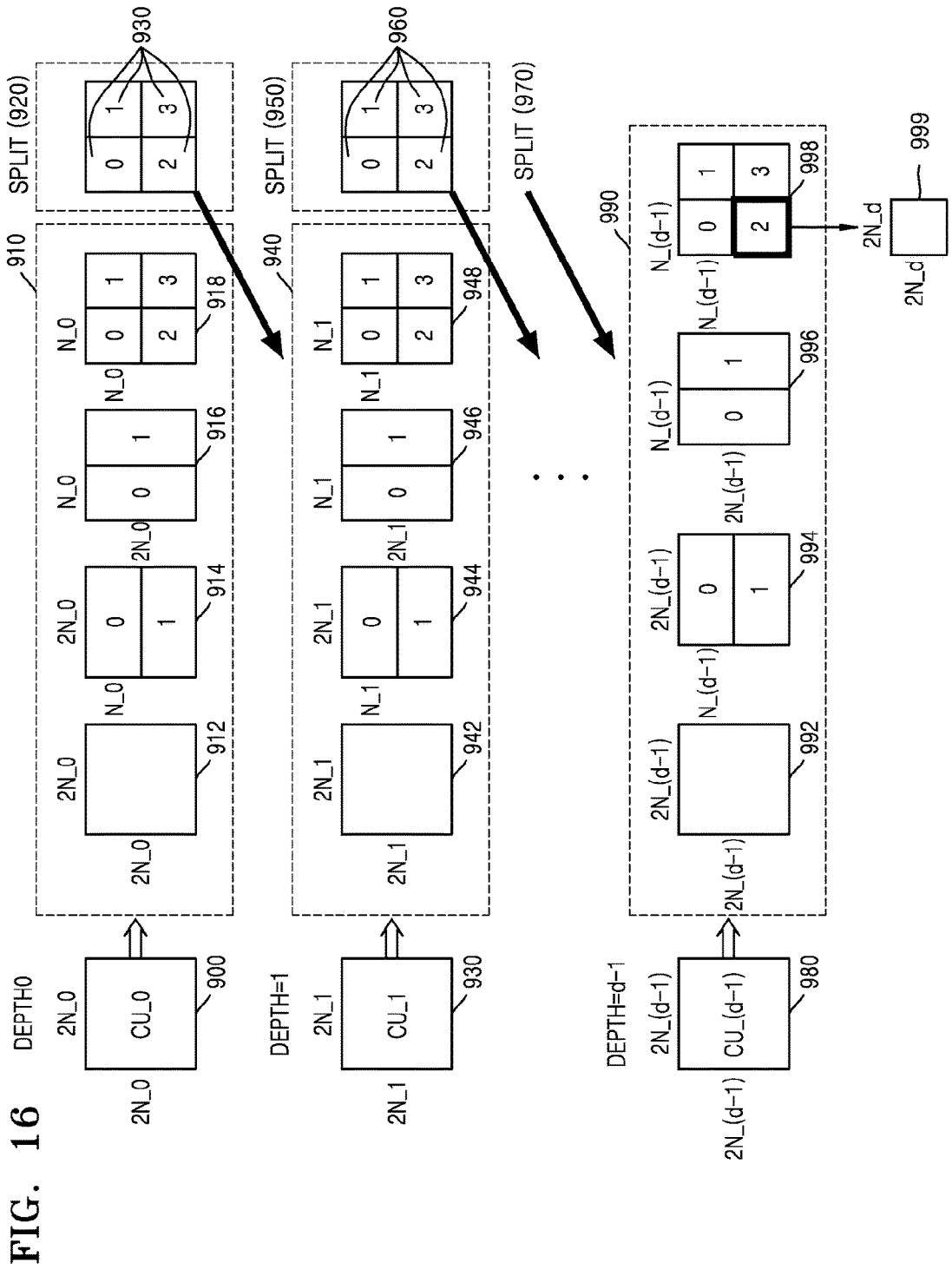
FIG. 16 is a diagram of deeper coding units according to depths, according to an exemplary embodiment.

FIG. 16 is a diagram of deeper coding units according to depths, according to an exemplary embodiment.

Splitting information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 16 only illustrates the partition types 912 through 918 which are obtained by symmetrically splitting the prediction unit, but a partition type is not limited thereto, and the partitions of the prediction unit may include asymmetrical partitions, partitions having a predetermined shape, and partitions having a geometrical shape.

Prediction encoding is repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode is performed only on the partition having the size of 2N_0×2N_0.

If an encoding error is smallest in one of the partition types 912 through 916 having sizes of 2N_0×2N_0, 2N_0×N_0, and N_0×2N_0, the prediction unit 910 may not be split into a lower depth.

If the encoding error is the smallest in the partition type 918, a depth is changed from 0 to 1 to split the partition type 918 in operation 920, and encoding is repeatedly performed on coding units 930 having a depth of 2 and a size of N_0×N_0 to search for a minimum encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having a size of N_1×N_1, a depth is changed from 1 to 2 to split the partition type 948 in operation 950, and encoding is repeatedly performed on coding units 960, which have a depth of 2 and a size of N_2×N_2 to search for a minimum encoding error.

When a maximum depth is d, a split operation according to each depth may be performed up to when a depth becomes d−1, and splitting information may be encoded as up to when a depth is one of 0 to d−2. In other words, when encoding is performed up to when the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types to search for a partition type having a minimum encoding error.

Even when the partition type 998 has the minimum encoding error, since a maximum depth is d, a coding unit CU_(d−1) having a depth of d−1 is no longer split to a lower depth, and a coded depth for the coding units constituting a current maximum coding unit 900 is determined to be d−1 and a partition type of the current maximum coding unit 900 may be determined to be n_(d−1)×n_(d−1). Also, since the maximum depth is d, splitting information is not set with respect to the coding unit 952 of a depth of d−1.

A data unit 999 may be a 'minimum unit' for the current maximum coding unit. A minimum unit according to an exemplary embodiment may be a square data unit obtained by splitting a minimum coding unit, which is a lowermost coded depth, by 4. By performing the encoding repeatedly, the video encoding apparatus 100 according to an exemplary embodiment may select a coded depth having the least encoding error by comparing encoding errors according to depths of the coding unit 900 to determine a depth, and set a corresponding partition type and a prediction mode as an encoding mode of the coded depth.

As such, the minimum encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Also, since a coding unit is split from a depth of 0 to a coded depth, only splitting information of the coded depth is set to 0, and splitting information of depths excluding the coded depth is set to 1.

The image data and encoding information extractor 220 of the video decoding apparatus 200 according to an exemplary embodiment may extract and use the information about the coded depth and the prediction unit of the coding unit 900 to decode the partition 912. The video decoding apparatus 200 according to an exemplary embodiment may determine a depth, in which splitting information is 0, as a coded depth by using splitting information according to depths, and use information about an encoding mode of the corresponding depth for decoding.

Figure 17:
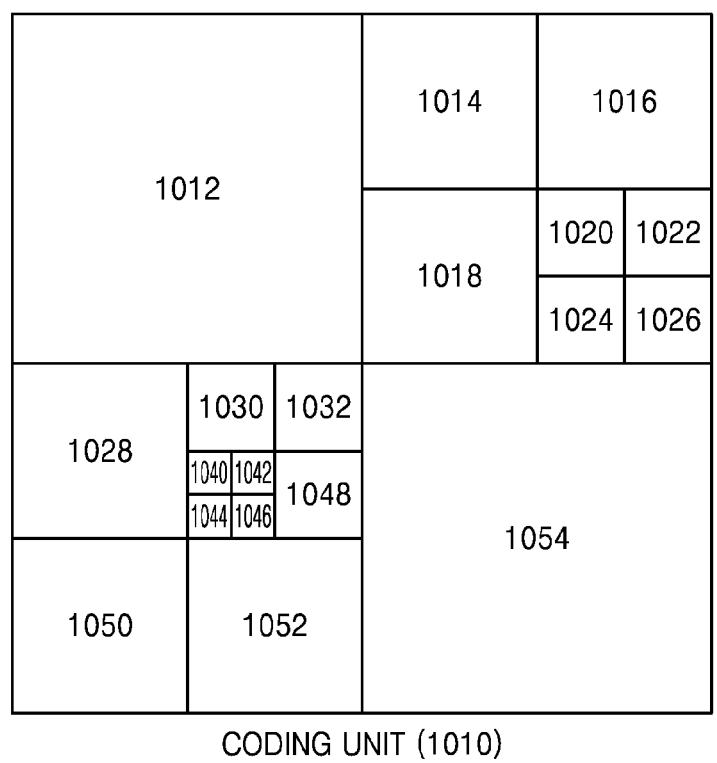
FIGS. 17 through 19 are diagrams for describing a relationship between coding units, prediction units, and transformation units, according an exemplary embodiment.
Figure 18:
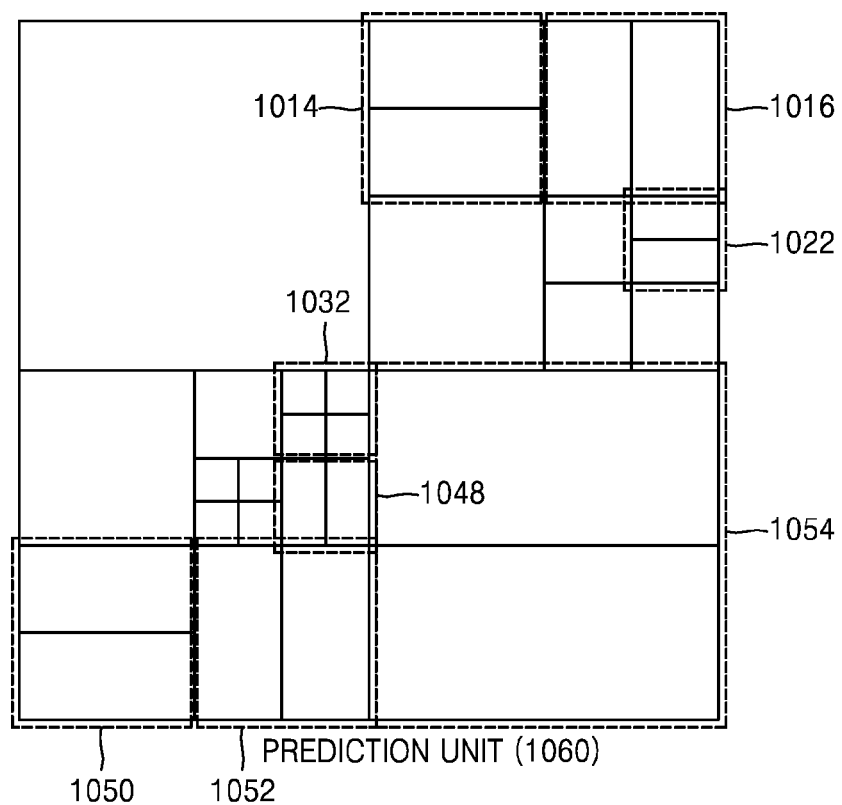
Figure 19:
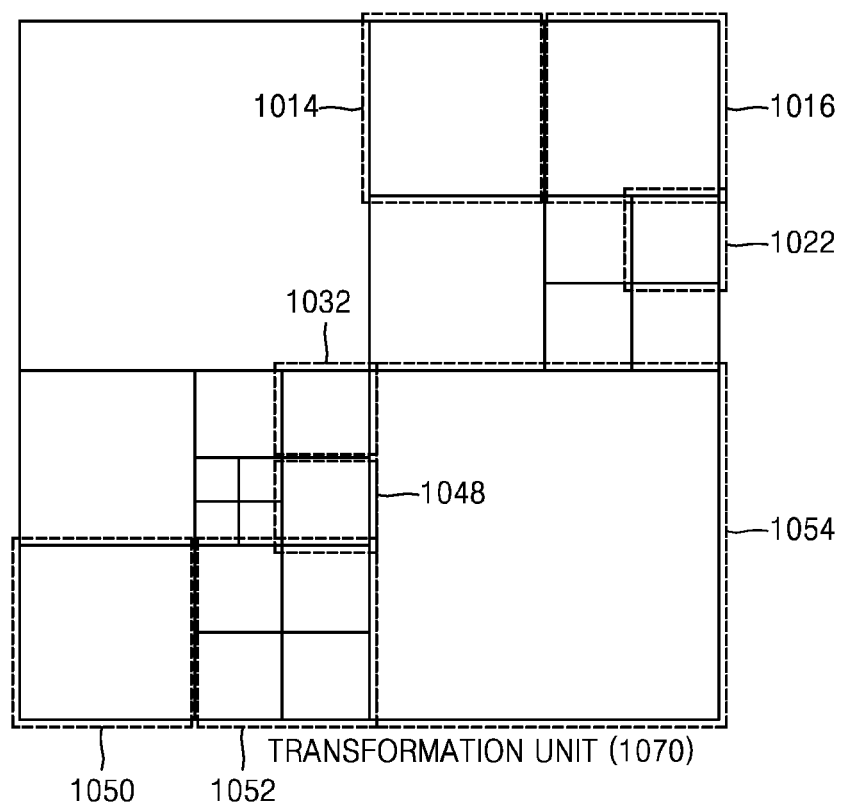

FIGS. 17 through 19 are diagrams for describing a relationship between coding units, prediction units, and transformation units, according to an exemplary embodiment.

The coding units 1010 are coding units corresponding to coded depths determined by the video encoding apparatus 100 according to an exemplary embodiment, in a maximum coding unit. The prediction units 1060 are partitions of prediction units of each of the coding units 1010 corresponding to coded depths, and the transformation units 1070 are transformation units of each of the coding units corresponding to coded depths.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some partitions 1014, 1016, 1022, 1032, 1048, 1050, 1052, and 1054 are obtained by splitting the coding units. In other words, partition types in the partitions 1014, 1022, 1050, and 1054 have a size of 2N×N, partition types in the partitions 1016, 1048, and 1052 have a size of N×2N, and a partition type of the partition 1032 has a size of N×N. Prediction units and partitions of the coding units 1010 are smaller than or equal to each coding unit.

Frequency transformation or inverse frequency transformation is performed on image data of the transformation unit 1052 in the transformation units 1070 in a data unit that is smaller than the transformation unit 1052. Also, the transformation units 1014, 1016, 1022, 1032, 1048, 1050, 1052, and 1054 are different from those in the prediction units 1060 in terms of sizes or shapes. In other words, the video encoding apparatus 100 according to an exemplary embodiment and the video decoding apparatus 200 according to an exemplary embodiment may perform intra prediction/motion estimation/motion compensation, and frequency transformation/inverse frequency transformation individually on a data unit even in the same coding unit.

Accordingly, encoding may be recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 8 shows the encoding information that may be set by the video encoding apparatus 100 according to an exemplary embodiment and the video decoding apparatus 200 according to an exemplary embodiment.

TABLE 8

Split Information 0
(Encoding on Coding Unit having Size of 2N × 2N and Current Depth of d)

| | | | Size of Transformation Unit | | |
|---|---|---|---|---|---|
| | Partition Type | | Split | Split | |
| Prediction Mode | Symmetrical Partition Type | Asymmetrical Partition Type | Information 0 of Transformation Unit | Information 1 of Transformation Unit | Split Information 1 |
| Intra Inter Skip (Only 2N × 2N) | 2N × 2N 2N × N N × 2N N × N | 2N × nU2 2N × nD nL × 2N nR × 2N | 2N × 2N | N × N (Symmetrical Type) N/2 × N/2 (Asymmetrical Type) | Repeatedly Encode Coding Units having Lower Depth of d + 1 |

The output unit 130 of the video encoding apparatus 100 according to an exemplary embodiment may output the encoding information about the coding units having the tree structure, and the encoding information extractor 220 of the video decoding apparatus 200 according to an exemplary embodiment may extract the encoding information about the coding units having the tree structure from a received bitstream.

Split information indicates whether a current coding unit is split into coding units of a lower depth. If split information of a current depth d is 0, a depth, in which a current coding unit is no longer split to a lower depth, is a coded depth, and thus information about a partition type, a prediction mode, and a size of a transformation unit may be defined for the coded depth. If the current coding unit is further split according to the split information, encoding has to be independently performed on four split coding units of a lower depth.

A prediction mode may be one of an intra mode, an inter mode, and a skip mode. The intra mode and the inter mode may be defined in all partition types, and the skip mode may be defined only in a partition type having a size of 2N×2N.

The information about the partition type may indicate symmetrical partition types having sizes of 2N×2N, 2N×N, N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD are respectively obtained by splitting the height of the prediction unit in 1:3 and 3:1, and the asymmetrical partition types having the sizes of nL×2N and nR×2N are respectively obtained by splitting the width of the prediction unit in 1:3 and 3:1.

The size of the transformation unit may be set to be two types in the intra mode and two types in the inter mode. In other words, if split information of the transformation unit is 0, the size of the transformation unit is set to 2N×2N, which is the size of the current coding unit. If split information of the transformation unit is 1, the transformation units may be obtained by splitting the current coding unit. Also, if a partition type of the current coding unit having the size of 2N×2N is a symmetrical partition type, a size of a transformation unit may be set to N×N, and if the partition type of the current coding unit is an asymmetrical partition type, the size of the transformation unit may be set to N/2×N/2.

The encoding information about coding units according to a tree structure, according to an exemplary embodiment, may be assigned to at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. Also, a corresponding coding unit corresponding to a coded depth is determined by using encoding information of a data unit, and thus a distribution of coded depths in a maximum coding unit may be determined.

Accordingly, if a current coding unit is predicted based on encoding information of adjacent data units, encoding information of data units in deeper coding units adjacent to the current coding unit may be directly referred to and used.

Alternatively, if a current coding unit is predicted based on encoding information of adjacent data units, data units adjacent to the current coding unit are searched using encoded information of the data units, and the searched adjacent coding units may be referred to for predicting the current coding unit.

Figure 20:
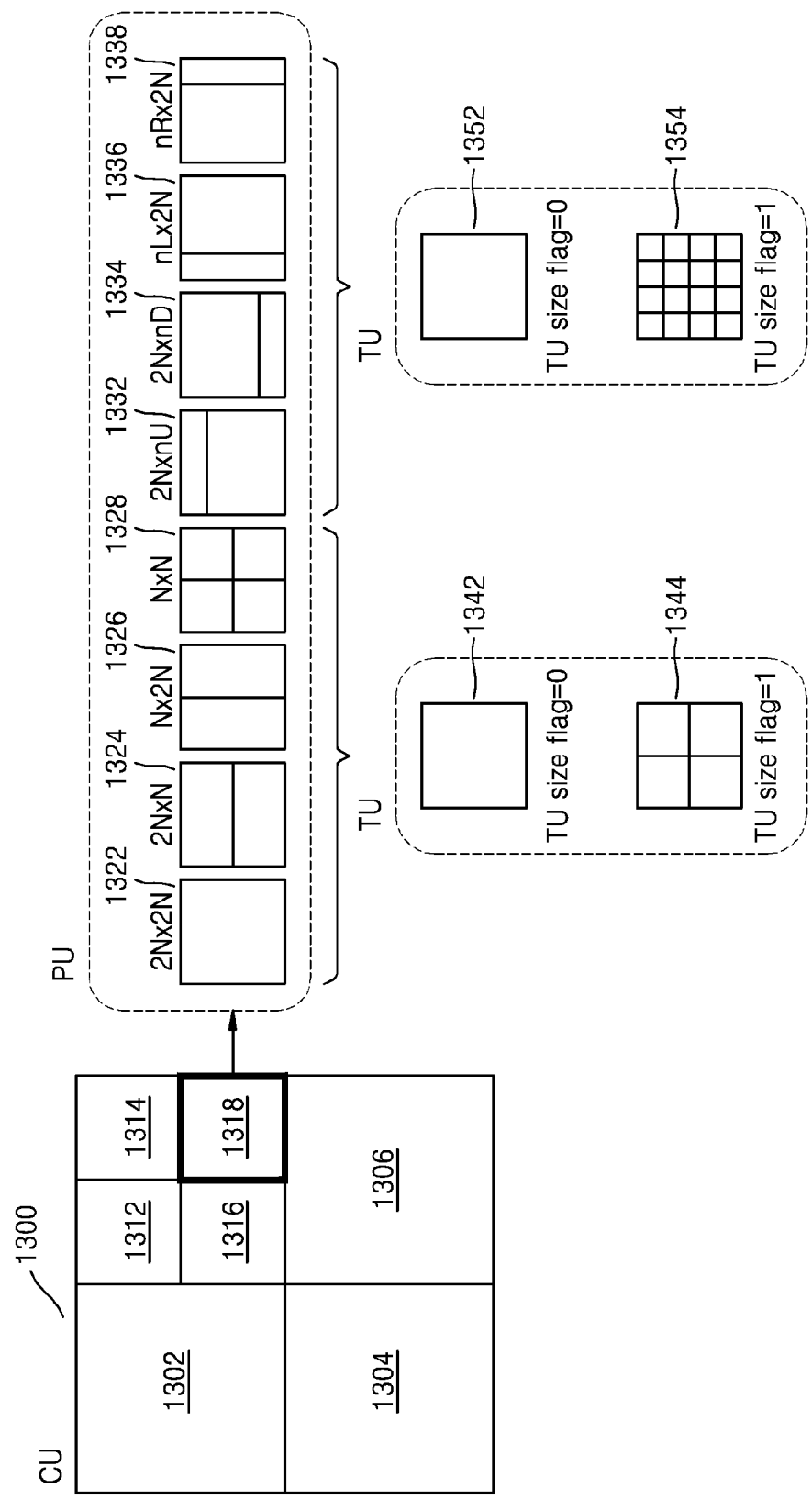
FIG. 20 is a diagram for describing a relationship between a coding unit, a prediction unit, and a transformation unit, according to encoding mode information of Table 8.

FIG. 20 is a diagram for describing a relationship between a coding unit, a prediction unit, and a transformation unit, according to encoding mode information of Table 8.

A maximum coding unit 1300 includes coding units 1302, 1304, 1306, 1312, 1314, 1316, and 1318 of depths. Here, since the coding unit 1318 is a coding unit of a coded depth, splitting information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

Splitting information (TU size flag) of a transformation unit is a type of a transformation index. The size of the transformation unit corresponding to the transformation index may be changed according to a prediction unit type or partition type of the coding unit.

For example, when the partition type is set to be symmetrical, i.e. the partition type 1322, 1324, 1326, or 1328, a transformation unit 1342 having a size of 2N×2N is set if split information (TU size flag) of a transformation unit is 0, and a transformation unit 1344 having a size of N×N is set if a TU size flag is 1.

When the partition type is set to be asymmetrical, i.e., the partition type 1332, 1334, 1336, or 1338, a transformation unit 1352 having a size of 2N×2N is set if a TU size flag is 0, and a transformation unit 1354 having a size of N/2×N/2 is set if a TU size flag is 1.

Referring to FIG. 20, the TU size flag is a flag having a value or 0 or 1, but the TU size flag is not limited to 1 bit, and a transformation unit may be hierarchically split according to a tree structure while the TU size flag increases from 0. Splitting information (TU size flag) of a transformation unit may be an example of a transformation index.

In this case, the size of a transformation unit that has been actually used may be expressed by using a TU size flag of a transformation unit, according to an exemplary embodiment, together with a maximum size and minimum size of the transformation unit. The video encoding apparatus 100 is capable of encoding maximum transformation unit size information, minimum transformation unit size information, and a maximum TU size flag. The result of encoding the maximum transformation unit size information, the minimum transformation unit size information, and the maximum TU size flag may be inserted into an SPS. The video decoding apparatus 200 may decode video by using the maximum transformation unit size information, the minimum transformation unit size information, and the maximum TU size flag.

For example, (a) if the size of a current coding unit is 64×64 and a maximum transformation unit size is 32×32, (a-1) then the size of a transformation unit may be 32×32 when a TU size flag is 0, (a-2) the size of a transformation unit may be 16×16 when the TU size flag is 1, and (a-3) the size of a transformation unit may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag cannot be set to a value other than 0, since the size of the transformation unit cannot be less than 32×32.

As another example, (c) if the size of the current coding unit is 64×64 and a maximum TU size flag is 1, then the TU size flag may be 0 or 1. Here, the TU size flag cannot be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that can be determined in a current coding unit, may be defined by Equation (1):

$$CurrMinTuSize = \max(MinTransformSize, RootTuSize/(2^{MaxTransformSizeIndex})) \quad (1)$$

Compared to the current minimum transformation unit size 'CurrMinTuSize' that can be determined in the current coding unit, a transformation unit size 'RootTuSize' when the TU size flag is 0 may denote a maximum transformation unit size that can be selected in the system. In Equation (1), 'RootTuSize/(2^MaxTransformSizeIndex)' denotes a transformation unit size when the transformation unit size 'RootTuSize', when the TU size flag is 0, is split a number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that can be determined in the current coding unit.

According to an exemplary embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$RootTuSize = \min(MaxTransformSize, PUSize) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$RootTuSize = \min(MaxTransformSize, PartitionSize) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an example and the embodiments are not limited thereto.

According to the video encoding method based on coding units according to a tree structure as described with reference to FIGS. 8 through 20, image data of the spatial domain is encoded for each coding unit of a tree structure. According to the video decoding method based on coding units according to a tree structure, decoding is performed for each maximum coding unit to reconstruct image data of the spatial domain. Thus, a picture and a video that is a picture sequence may be reconstructed. The reconstructed video may be reproduced by a reproducing apparatus, stored in a storage medium, or transmitted through a network.

The embodiments of the inventive concept can be written as computer programs and can be implemented in general-use digital computers that execute the programs using a computer readable recording medium. Examples of the computer readable recording medium include storage media such as magnetic storage media (e.g., ROM, floppy disks, hard disks, etc.) or optical reading media (e.g., CD-ROMs, or DVDs).

For convenience of description, the video encoding method according to the multilayer video prediction method and the multilayer video decoding method, which is described above with reference to FIGS. 1A through 20, will be referred to as a 'video encoding method according to the embodiments'. In addition, the video decoding method according to adjustment of a sample offset, which is described above with reference to FIGS. 1A through 20, will be referred to as a 'video decoding method according to the embodiments'.

Also, a video encoding apparatus including the multilayer video encoding apparatus 10, the multilayer video decoding apparatus 20, the video encoding apparatus 100, or the image encoder 400, which is described above with reference to FIGS. 1A through 20, will be referred to as a 'video encoding apparatus according to the embodiments'. In addition, a video decoding apparatus including the multilayer video decoding apparatus 20, the video decoding apparatus 200, or the image decoder 500, which is described above with reference to FIGS. 1A through 20, will be referred to as a 'video decoding apparatus according to the embodiments'.

A computer-readable recording medium storing a program, e.g., a disc 26000, according to embodiments will now be described in detail.

Figure 21:
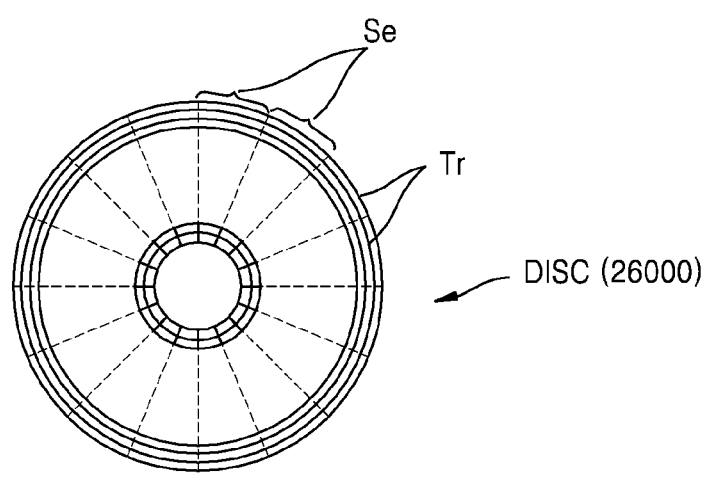
FIG. 21 is a diagram of a physical structure of a disc in which a program is stored, according to an exemplary embodiment.

FIG. 21 is a diagram of a physical structure of the disc 26000 in which a program is stored, according to an exemplary embodiment. The disc 26000, which is a storage medium, may be a hard drive, a compact disc-read only memory (CD-ROM) disc, a Blu-ray disc, or a digital versatile disc (DVD). The disc 26000 includes a plurality of concentric tracks Tr that are each divided into a specific number of sectors Se in a circumferential direction of the disc 26000. In a specific region of the disc 26000, a program that executes the quantization parameter determination method, the video encoding method, and the video decoding method described above may be assigned and stored.

A computer system embodied using a storage medium that stores a program for executing the video encoding method and the video decoding method as described above will now be described with reference to FIG. 22.

Figure 22:
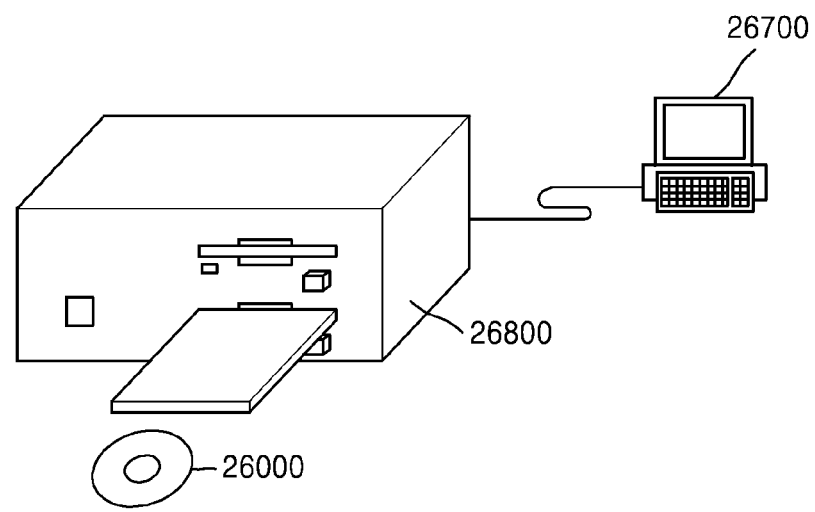
FIG. 22 is a diagram of a disc drive for recording and reading a program by using a disc.

FIG. 22 is a diagram of a disc drive 26800 for recording and reading a program by using the disc 26000. A computer system 26700 may store a program that executes at least one of a video encoding method and a video decoding method according to an exemplary embodiment, in the disc 26000 via the disc drive 26800. To run the program stored in the disc 26000 in the computer system 26700, the program may be read from the disc 26000 and be transmitted to the computer system 26700 by using the disc drive 26700.

The program that executes at least one of a video encoding method and a video decoding method according to an exemplary embodiment may be stored not only in the disc 26000 illustrated in FIG. 21 or 22 but also in a memory card, a ROM cassette, or a solid state drive (SSD).

A system to which the video encoding method and a video decoding method described above are applied will be described below.

Figure 23:
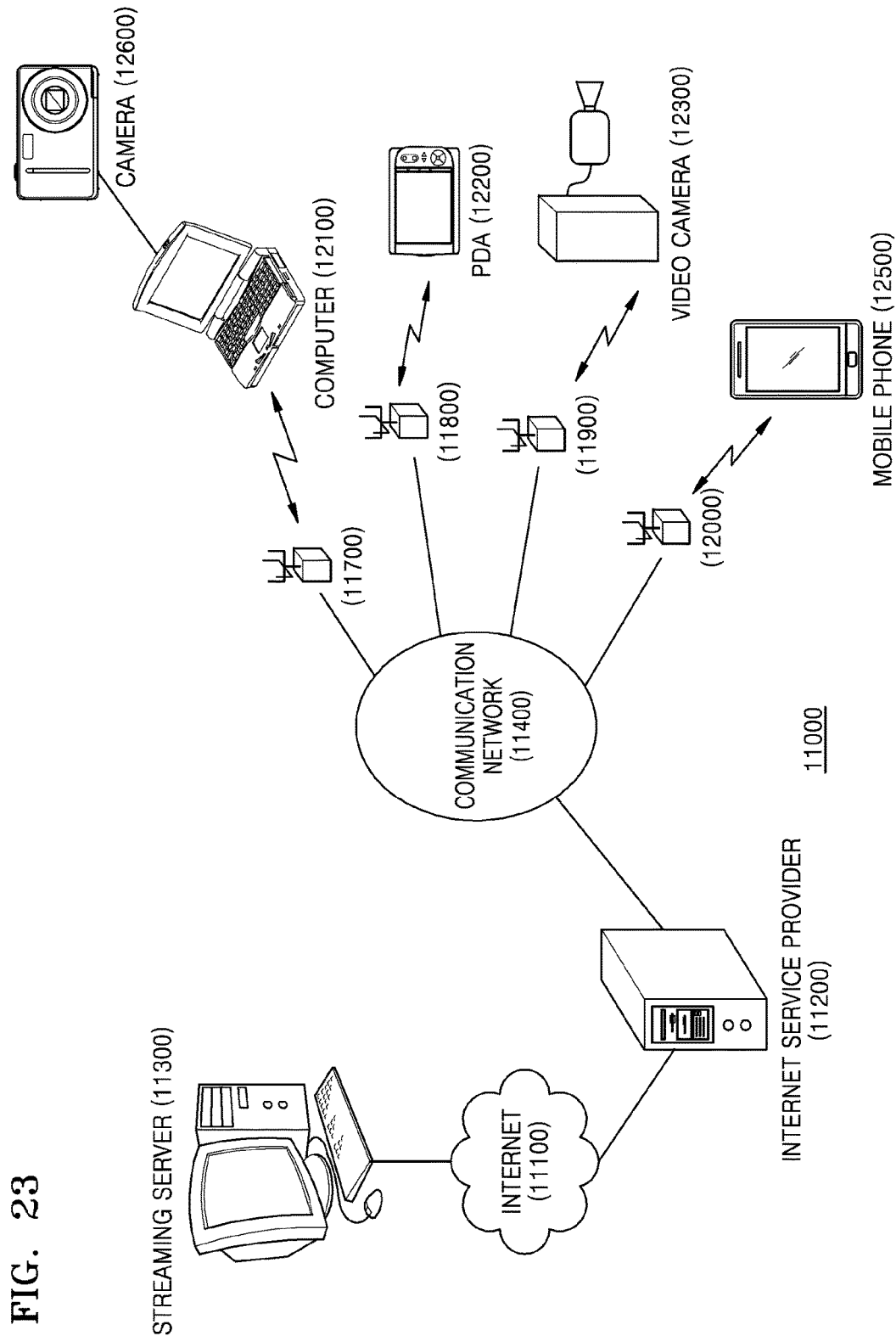
FIG. 23 is a diagram of an overall structure of a content supply system for providing a content distribution service.

FIG. 23 is a diagram of an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

Figure 24:
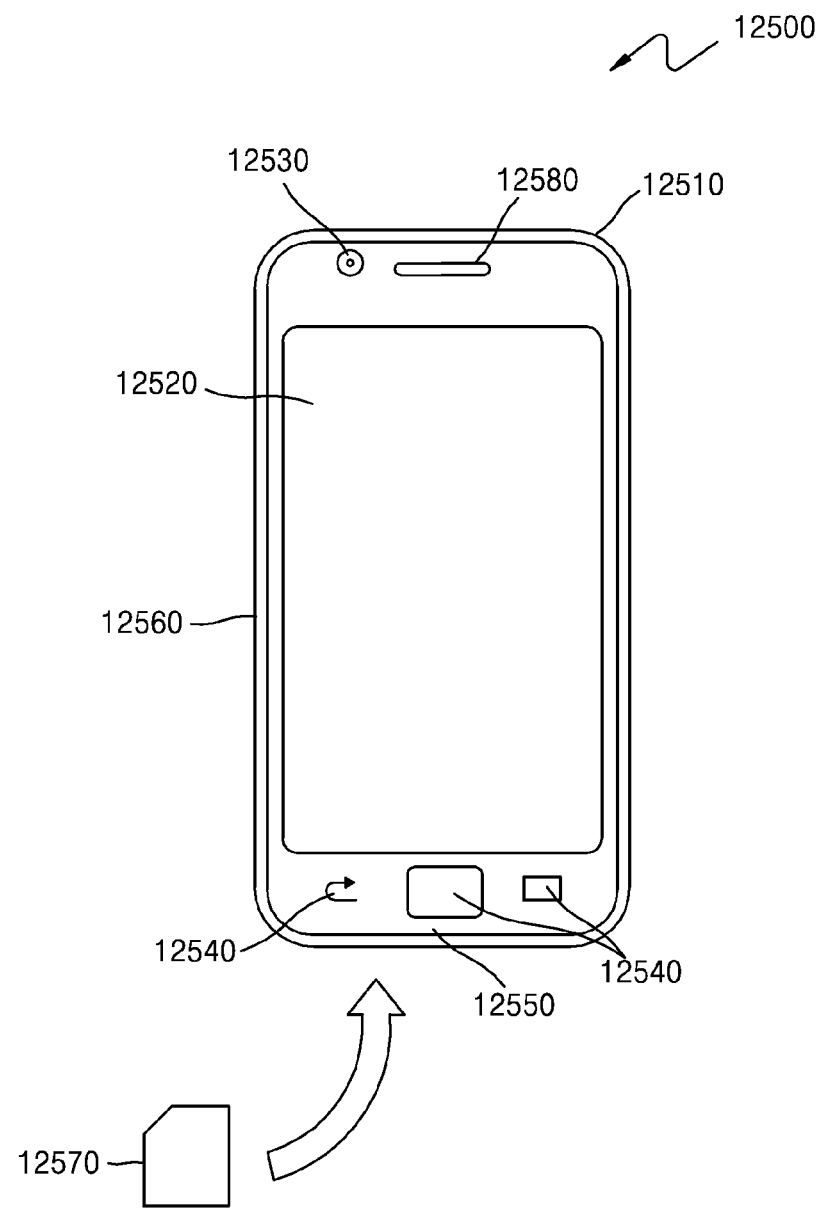
FIGS. 24 and 25 respectively illustrate an external structure and an internal structure of a mobile phone to which a video encoding method and a video decoding method are applied, according to an exemplary embodiment.

However, the content supply system 11000 is not limited to as illustrated in FIG. 24, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded using the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disc, a floppy disc, a hard disc drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to an exemplary embodiment.

The mobile phone 12500 included in the content supply system 11000 according to an exemplary embodiment will now be described in greater detail with referring to FIGS. 24 and 25.

FIG. 24 illustrates an external structure of the mobile phone 12500 to which a video encoding method and a video decoding method are applied, according to an exemplary embodiment. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000 of FIG. 21, and includes a display screen 12520 for displaying images captured by a camera 12530 or images that are received via the antenna 12510 and decoded, e.g., a liquid crystal display (LCD) or an organic light-emitting diode (OLED) screen. The smartphone 12510 includes an operation panel 12540 including a control button and a touch panel. If the display screen 12520 is a touch screen, the operation panel 12540 further includes a touch sensing panel of the display screen 12520. The smartphone 12510 includes a speaker 12580 for outputting voice and sound or another type of sound outputter, and a microphone 12550 for inputting voice and sound or another type sound inputter. The smartphone 12510 further includes the camera 12530, such as a charge-coupled device (CCD) camera, to capture video and still images. The smartphone 12510 may further include a storage medium 12570 for storing encoded/decoded data, e.g., video or still images captured by the camera 12530, received via email, or obtained according to various ways; and a slot 12560 via which the storage medium 12570 is loaded into the mobile phone 12500. The storage medium 12570 may be a flash memory of another type, e.g., a secure digital (SD) card or an electrically erasable and programmable read only memory (EEPROM) included in a plastic case.

Figure 25:
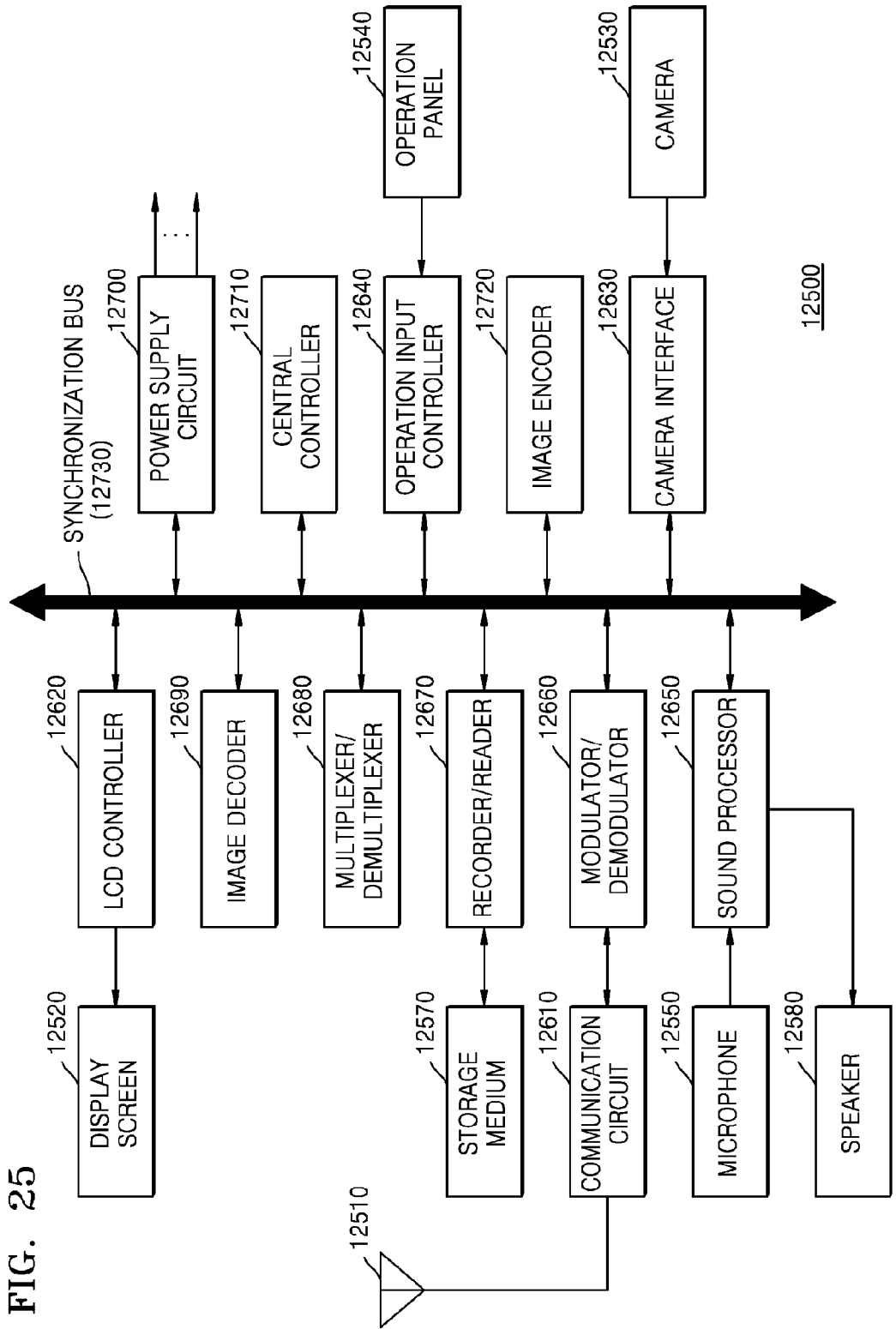

FIG. 25 illustrates an internal structure of the mobile phone 12500. To systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer 12680, a recorder/reader 12670, a modulator/demodulator 12660, and a sound processor 12650 are connected to a central controller 12710 via an alignment bus 12730. In an exemplary embodiment, the mobile phone 12500 and the individual elements therein maybe implemented in hardware including a circuit.

If a user operates a power button and sets from a 'power off' state to a 'power on' state, the power supply circuit 12700 supplies power to all the parts of the mobile phone 12500 from a battery pack, thereby setting the mobile phone 12500 in an operation mode.

The central controller 12710 includes a central processing unit (CPU), a ROM, and a RAM.

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulator/demodulator 12660 under control of the central controller 12710, the modulator/demodulator 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a conversation mode, a sound signal obtained via the microphone 12550 is transformed into a digital sound signal by the sound processor 12650, under control of the central controller 12710. The digital sound signal may be transformed into a transformation signal via the modulator/demodulator 12660 and the communication circuit 12610, and may be transmitted via the antenna 12510.

When a text message, e.g., email, is transmitted in a data communication mode, text data of the text message is input via the operation panel 12540 and is transmitted to the central controller 12710 via the operation input controller 12640. Under control of the central controller 12610, the text data is transformed into a transmission signal via the modulator/demodulator 12660 and the communication circuit 12610 and is transmitted to the wireless base station 12000 via the antenna 12510.

To transmit image data in the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the above-described video encoding method according to the one or more embodiments. The image encoder 12720 may transform the image data received from the camera 12530 into compressed and encoded image data based on the above-described video encoding method according to the one or more embodiments, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulator/demodulator 12660 and the communication circuit 12610, and may then be transmitted via the antenna 12510.

While the mobile phone 12500 receives communication data from the outside, frequency recovery and ADC are performed on a signal received via the antenna 12510 to transform the signal into a digital signal. The modulator/demodulator 12660 modulates a frequency band of the digital signal. The frequency-band modulated digital signal is transmitted to the video decoder 12690, the sound processor 12650, or the LCD controller 12620, according to the type of the digital signal.

In the conversation mode, the mobile phone 12500 amplifies a signal received via the antenna 12510, and obtains a digital sound signal by performing frequency conversion and ADC on the amplified signal. A received digital sound signal is transformed into an analog sound signal via the modulator/demodulator 12660 and the sound processor 12650, and the analog sound signal is output via the speaker 12580, under control of the central controller 12710.

When in the data communication mode, data of a video file accessed at an Internet website is received, a signal received from the wireless base station 12000 via the antenna 12510 is output as multiplexed data via the modulator/demodulator 12660, and the multiplexed data is transmitted to the multiplexer/demultiplexer 12680.

To decode the multiplexed data received via the antenna 12510, the multiplexer/demultiplexer 12680 demultiplexes the multiplexed data into an encoded video data stream and an encoded audio data stream. Via the alignment bus 12730, the encoded video data stream and the encoded audio data stream are provided to the video decoder 12690 and the sound processor 12650, respectively.

A structure of the image decoder 12690 may correspond to that of the above-described video decoding method according to the one or more embodiments. The image decoder 12690 may decode the encoded video data to obtain reconstructed video data and provide the reconstructed video data to the display screen 12520 via the LCD controller 12620, by using the above-described video decoding method according to the one or more embodiments.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an exemplary embodiment, may be a transceiving terminal including only the video encoding apparatus, or may be a transceiving terminal including only the video decoding apparatus.

Figure 26:
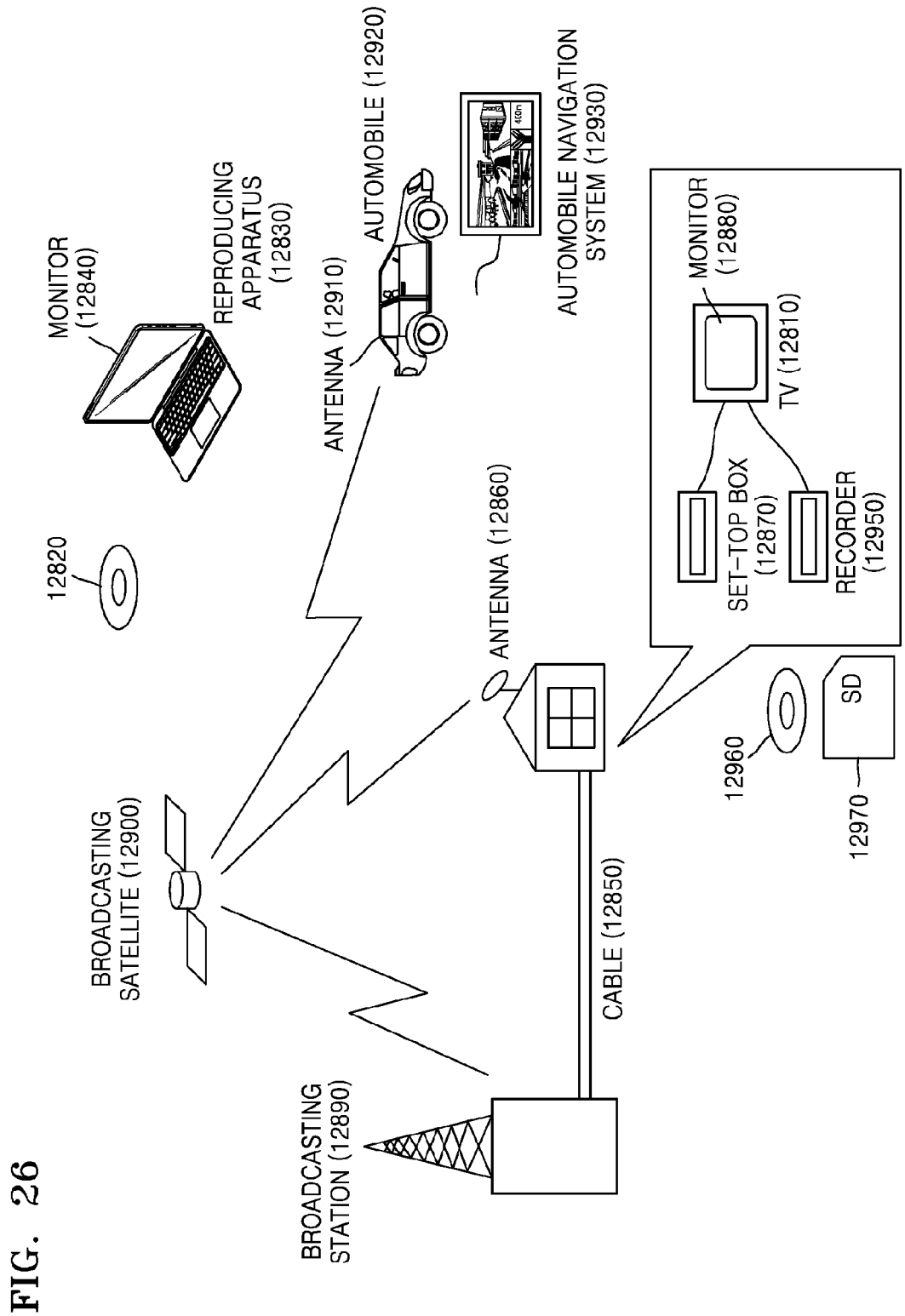
FIG. 26 is a diagram of a digital broadcast system to which a communication system is applied, according to the inventive concept.

A communication system according to the one or more embodiments is not limited to the communication system described above with reference to FIG. 24. For example, FIG. 26 illustrates a digital broadcasting system employing a communication system, according to the inventive concept. The digital broadcasting system of FIG. 26 according to an exemplary embodiment may receive a digital broadcast transmitted via a satellite or a terrestrial network by using a video encoding apparatus and a video decoding apparatus according to an exemplary embodiment.

Specifically, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When a video decoding apparatus according to an exemplary embodiment is implemented in a reproducing apparatus 12830, the reproducing apparatus 12830 may parse and decode an encoded video stream recorded on a storage medium 12820, such as a disc or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, a video decoding apparatus according to an exemplary embodiment may be installed. Data output from the set-top box 12870 may also be reproduced on a TV monitor 12880.

As another example, a video decoding apparatus according to an exemplary embodiment may be installed in the TV receiver 12810 instead of the set-top box 12870.

An automobile 12920 that has an appropriate antenna 12910 may receive a signal transmitted from the satellite 12900 or the wireless base station 11700 of FIG. 21. A decoded video may be reproduced on a display screen of an automobile navigation system 12930 installed in the automobile 12920.

A video signal may be encoded by a video encoding apparatus according to an exemplary embodiment and may then be stored in a storage medium. Specifically, an image signal may be stored in a DVD disc 12960 by a DVD recorder or may be stored in a hard disc by a hard disc recorder 12950. As another example, the video signal may be stored in an SD card 12970. If the hard disc recorder 12950 includes a video decoding apparatus according to an exemplary embodiment, a video signal recorded on the DVD disc 12960, the SD card 12970, or another storage medium may be reproduced on the TV monitor 12880.

The automobile navigation system 12930 may not include the camera 12530 of FIG. 32, and the camera interface 12630 and the image encoder 12720 of FIG. 32. For example, the computer 12100 and the TV receiver 12810 may not include the camera 12530, the camera interface 12630, and the image encoder 12720.

Figure 27:
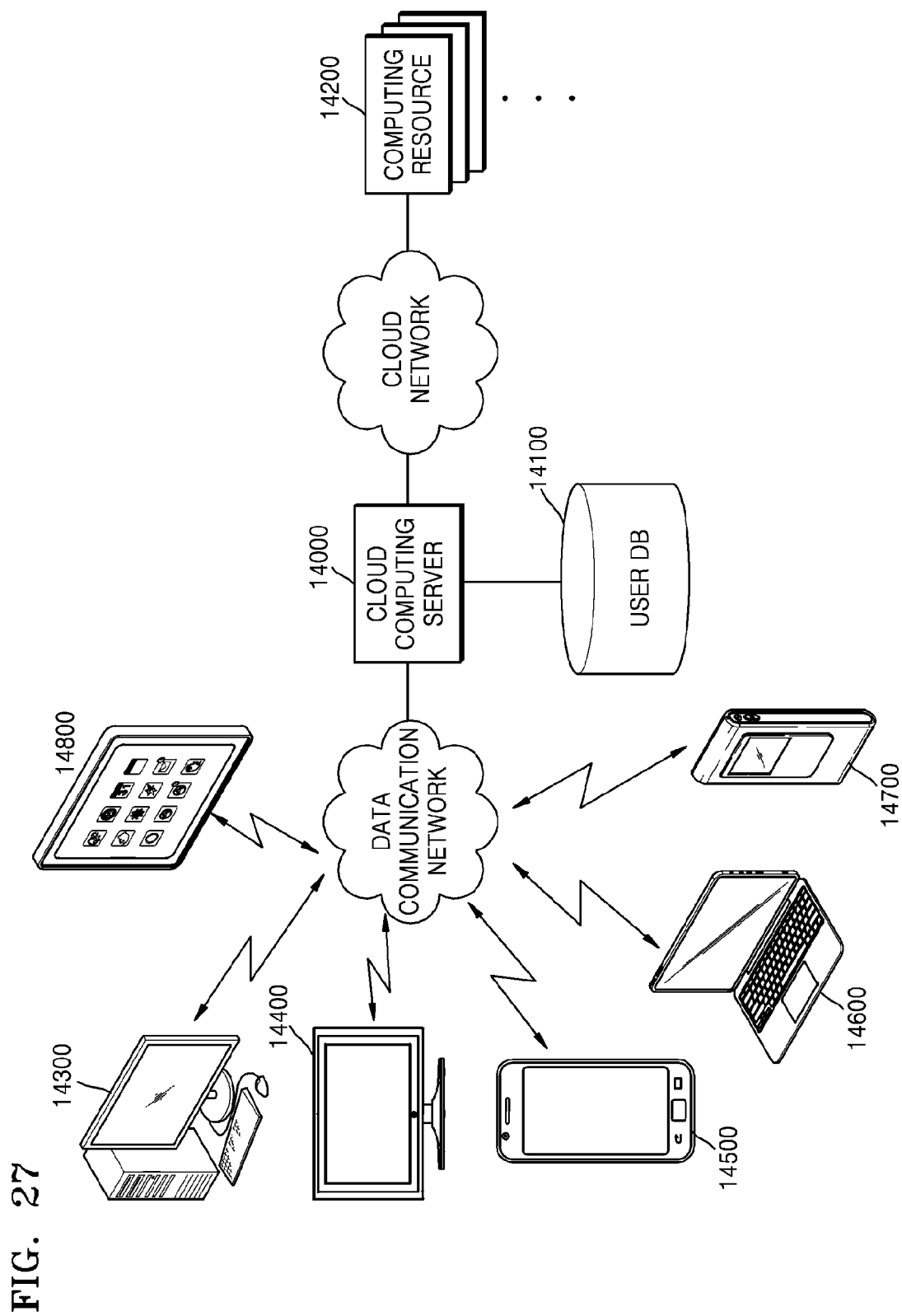
FIG. 27 is a diagram illustrating a network structure of a cloud computing system using a video encoding apparatus and a video decoding apparatus according to an exemplary embodiment.

FIG. 27 is a diagram illustrating a network structure of a cloud computing system using a video encoding apparatus and a video decoding apparatus, according to an exemplary embodiment.

The cloud computing system may include a cloud computing server 14100, a user database (DB) 14100, a plurality of computing resources 14200, and a user terminal.

The cloud computing system provides an on-demand outsourcing service of the plurality of computing resources via a data communication network, e.g., the Internet, in response to a request from the user terminal. Under a cloud computing environment, a service provider provides users with desired services by combining computing resources at data centers located at physically different locations by using virtualization technology. A service user does not have to install computing resources, e.g., an application, a storage, an operating system (OS), and security, into his/her own terminal in order to use them, but may select and use desired services from among services in a virtual space generated through the virtualization technology, at a desired point in time.

A user terminal of a specified service user is connected to the cloud computing server 14100 via a data communication network including the Internet and a mobile telecommunication network. User terminals may be provided cloud computing services, and particularly video reproduction services, from the cloud computing server 14100. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14100 may combine the plurality of computing resources 14200 distributed in a cloud network and provide user terminals with a result of combining. The plurality of computing resources 14200 may include various data services, and may include data uploaded from user terminals. As described above, the cloud computing server 14100 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce this video service is received from the smart phone 14500, the cloud computing server 14100 searches for and reproduces this video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14100 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14100, may vary according to the request from the user terminal, i.e., according to whether the video will be reproduced, starting from a start thereof or a pausing point thereof. For example, if the user terminal requests to reproduce the video, starting from the start thereof, the cloud computing server 14100 transmits streaming data of the video starting from a first frame thereof to the user terminal. If the user terminal requests to reproduce the video, starting from the pausing point thereof, the cloud computing server 14100 transmits streaming data of the video starting from a frame corresponding to the pausing point, to the user terminal.

In this case, the user terminal may include a video decoding apparatus as described above with reference to FIGS. 1A through 20. As another example, the user terminal may include a video encoding apparatus as described above with reference to FIGS. 1A through 20. Alternatively, the user terminal may include both the video decoding apparatus and the video encoding apparatus as described above with reference to FIGS. 1A through 20.

Various applications of a video encoding method, a video decoding method, a video encoding apparatus, and a video decoding apparatus according to the one or more embodiments described above with reference to FIGS. 1A through 20 have been described above with reference to FIGS. 21 to 27. However, methods of storing the video encoding method and the video decoding method in a storage medium or methods of implementing the video encoding apparatus and the video decoding apparatus in a device, according to various exemplary embodiments, are not limited to the embodiments described above with reference to FIGS. 21 to 27.

While the inventive concept has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the inventive concept.

The invention claimed is:

1. A video decoding method performed by a video decoding apparatus, the method comprising:
   obtaining Random Access Point (RAP) picture information of a plurality of layers comprising a base layer and an enhancement layer, from a bitstream, the RAP picture information indicating whether RAP pictures of the base layer and RAP pictures of the enhancement layer are aligned with the same POC (Picture Order Count) order;
   decoding the RAP pictures of the base layer based on a POC order of the base layer; when the RAP picture information indicates that the RAP pictures of the base layer and the RAP pictures of the enhancement layer are aligned with the same POC order, decoding the RAP pictures of the enhancement layer based on the POC order of the base layer; and
   when the RAP picture information indicates that the RAP pictures of the base layer and the RAP pictures of the enhancement layer are not aligned with the same POC order, decoding the RAP pictures of the enhancement layer independently from the POC order of the base layer.

2. The method of claim 1, wherein the decoding the RAP pictures of the enhancement layer based on the RAP picture information comprises, when a picture of the enhancement layer at a Picture Order Count (POC) which is a random access point, is a non-RAP picture, decoding a RAP picture that occurs after the non-RAP picture in a POC order.

3. The method of claim 1, wherein the RAP picture information comprises an identifier indicating a type of a RAP picture at the same Picture Order Count (POC) of the plurality of layers.

4. The method of claim 1, wherein the RAP picture information is included in one of a parameter set, an Access Unit Delimiter (AUD), and Supplemental Enhancement Information (SEI).

5. The method of claim 1, wherein the decoding the RAP pictures of the enhancement layer based on the RAP picture information comprises, when a Random Access Skip Leading (RASL) picture of a reference layer is not decoded, not decoding a picture that refers to the RASL picture.

6. The method of claim 1, wherein a temporal identifier of a picture included in the enhancement layer has a value greater than or equal to a temporal identifier of a reference picture included in the base layer.

7. The method of claim 1, wherein at least one from among Instantaneous Decoding Refresh (IDR), Clean Random Access (CRA), and Broken Link Access (BLA) pictures of the base layer is used as the RAP picture of the base layer.

8. The method of claim 1, wherein at least one from among Instantaneous Decoding Refresh (IDR), Clean Random Access (CRA), and Broken Link Access (BLA) pictures of the enhancement layer is used as at least one from among a bit stream extraction point picture and a layer switching point picture.

9. The method of claim 1, further comprising splicing one of the plurality of layers independently from the other layers in the plurality of layers.

10. A video encoding method, comprising:
    when RAP pictures of a base layer and RAP pictures of an enhancement layer are aligned with the same POC order, determining RAP picture information to indicate that the RAP pictures of the enhancement layer encoded based on a POC order of the base layer; and
    when the RAP pictures of the base layer and the RAP pictures of the enhancement layer are not aligned with the same POC order, determining the RAP picture information to indicate that the RAP pictures of the enhancement layer independently encoded from the POC order of the base layer,
    encoding pictures of an image sequence to a plurality of layers comprising the base layer and the enhancement layer to generate Random Access Point (RAP) picture information about the plurality of layers, the RAP picture information indicating whether RAP pictures of the base layer and RAP pictures of the enhancement layer are aligned with the same POC (Picture Order Count) order; and
    generating a bitstream comprising the RAP picture information.

11. The method of claim 10, wherein the RAP picture information includes an identifier indicating a type of a RAP picture existing at a same Picture Order Count (POC) of the plurality of layers.

12. A video decoding apparatus, comprising:
    a receiver configured to receive a bitstream; and
    a decoder configured to:
    obtain, from the bitstream, Random Access Point (RAP) picture information of a plurality of layers comprising a base layer and an enhancement layer the RAP picture information indicating whether RAP pictures of the base layer and RAP pictures of the enhancement layer are aligned with the same POC (Picture Order Count) order,
    decode the RAP pictures of the base layer based on a POC order of the base layer, decode the RAP pictures of the enhancement layer based on the POC order of the base layer, when the RAP picture information indicates that the RAP pictures of the base layer and the RAP pictures of the enhancement layer are aligned with the same POC order, and
    decode the RAP pictures of the enhancement layer independently from the POC order of the base layer, when the RAP picture information indicates that the RAP pictures of the base layer and the RAP pictures of the enhancement layer are not aligned with the same POC order.

13. A video encoding apparatus, comprising:
    an encoder configured to:
    when RAP pictures of a base layer and RAP pictures of an enhancement layer are aligned with the same POC order, determine RAP picture information to indicate that the RAP pictures of the enhancement layer encoded based on a POC order of the base layer,
    when the RAP pictures of the base layer and the RAP pictures of the enhancement layer are not aligned with the same POC order, determine the RAP picture information to indicate that the RAP pictures of the enhancement layer independently encoded from the POC order of the base layer, and
    encode pictures of an image sequence to a plurality of layers comprising the base layer and the enhancement layer to generate Random Access Point (RAP) picture information about the plurality of layers, the RAP picture information indicating whether RAP pictures of the base layer and RAP pictures of the enhancement layer are aligned with the same POC (Picture Order Count) order; and an output unit configured to generate a bitstream comprising the RAP picture information.

14. A non-transitory computer readable recording medium having recorded thereon a program for implementing the method of claim 1.

* * * * *